US008675031B2

(12) United States Patent
Nakamura et al.

(10) Patent No.: US 8,675,031 B2
(45) Date of Patent: Mar. 18, 2014

(54) LIQUID CRYSTAL DISPLAY DEVICE

(75) Inventors: Kohzoh Nakamura, Osaka (JP); Shun Ueki, Osaka (JP); Kazunari Tomizawa, Osaka (JP); Tomohiko Mori, Osaka (JP); Yuichi Yoshida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 128 days.

(21) Appl. No.: 13/503,421

(22) PCT Filed: Oct. 26, 2010

(86) PCT No.: PCT/JP2010/069011
§ 371 (c)(1),
(2), (4) Date: Apr. 23, 2012

(87) PCT Pub. No.: WO2011/052612
PCT Pub. Date: May 5, 2011

(65) Prior Publication Data
US 2012/0206326 A1    Aug. 16, 2012

(30) Foreign Application Priority Data
Oct. 29, 2009   (JP) ................................. 2009-249545

(51) Int. Cl.
*G09G 5/02*    (2006.01)
(52) U.S. Cl.
USPC ........................................... 345/698; 345/88
(58) Field of Classification Search
USPC ............... 345/87, 88, 204, 690, 698
See application file for complete search history.

(56) References Cited

U.S. PATENT DOCUMENTS

| | | | |
|---|---|---|---|
| 4,800,375 A | 1/1989 | Silverstein et al. | |
| 7,268,757 B2 | 9/2007 | Ben-David et al. | |
| 7,483,095 B2 | 1/2009 | Roth et al. | |
| 2004/0174389 A1 | 9/2004 | Ben-David et al. | |
| 2005/0122294 A1 | 6/2005 | Ben-David et al. | |
| 2007/0063946 A1 | 3/2007 | Nakamura et al. | |
| 2009/0115952 A1 | 5/2009 | Nakamura et al. | |
| 2010/0066956 A1 | 3/2010 | Nakamura et al. | |
| 2010/0238102 A1 | 9/2010 | Nakamura et al. | |

FOREIGN PATENT DOCUMENTS

| | | |
|---|---|---|
| JP | 9-251160 A | 9/1997 |
| JP | 2001-209047 A | 8/2001 |
| JP | 2001-306023 A | 11/2001 |
| WO | 2007/034770 A1 | 3/2007 |
| WO | 2007/148519 A1 | 12/2007 |
| WO | 2008/114695 A1 | 9/2008 |

OTHER PUBLICATIONS

English translation of Official Communication issued in corresponding International Application PCT/JP2010/069011, mailed on Jun. 21, 2012.

(Continued)

*Primary Examiner* — Ricardo L Osorio
(74) *Attorney, Agent, or Firm* — Keating & Bennett, LLP

(57) ABSTRACT

A liquid crystal display device according to the present invention comprises a pixel including a plurality of sub pixels. The plurality of sub pixels include a red sub pixel (R), a green sub pixel (G), a blue sub pixel (B), a yellow sub pixel (Ye) and a cyan sub pixel (C). The aperture area size of one of the cyan sub pixel (C) and the blue sub pixel (B) is larger than the aperture area size of any of the other of the cyan (C) and blue (B) sub pixels, the green sub pixel (G) and the yellow sub pixel (Ye); and the aperture area size of the red sub pixel (R) is larger than the aperture area size of any of the other of the cyan (C) and blue (B) sub pixels, the green sub pixel (G), and the yellow sub pixel (Ye).

3 Claims, 13 Drawing Sheets

(56) References Cited

OTHER PUBLICATIONS

Official Communication issued in International Patent Application No. PCT/JP2010/069011, mailed on Nov. 30, 2010.

Yang et al.; "31.1: Development of Six Primary-Color LCD"; Society for Information Display, 2005 International Symposium Digest of Technical Papers; vol. XXXVI, Book II; May 25-27, 2005; pp. 1210-1213.

Chino et al.; "25.1: Invited Paper: Development of Wide-Color-Gamut Mobile Displays With Four-Primary-Color LCDS"; Society for Information Display, 2006 International Symposium Digest of Technical Papers; vol. XXXVII, Book II; Jun. 7-9, 2006; pp. 1221-1224.

Ben-Chorin; "Improving LCD TV Color Using Multi-Primary Technology"; FPD International 2005 Forum; Oct. 19, 2005; Total of 66 pages.

(a)

(b)

(a)

(b)

(a)

(b)

(a)

(b)

(a)

(b)

(a)

(b)

(a)

(b)

LIQUID CRYSTAL DISPLAY DEVICE

TECHNICAL FIELD

The present invention relates to a liquid crystal display device.

BACKGROUND ART

Liquid crystal display devices have advantages of, for example, being lightweight, thin and of low power consumption, and are used for display devices of large-sized TVs in addition to small display devices of display sections of mobile phones and the like. In color liquid crystal display devices widely used today, one pixel is formed of sub pixels corresponding to three primary colors of light, i.e., red (R), green (G) and blue (B). Typically, the color difference among red, green and blue is realized by color filters.

Recently, instead of general display devices using the three primary colors, display devices using multiple, i.e., four or more, primary colors by additive mixture of color stimuli have been proposed (see, for example, Patent Documents 1 through 3). A display device providing display by use of four or more primary colors is also referred to as a "multiple primary color display device".

Patent Document 1 discloses a liquid crystal display device providing display with four primary colors of red, green, blue and yellow, and a liquid crystal display device providing display with five primary colors of red, green, blue, yellow and cyan. Patent Document 1 also discloses a liquid crystal display device providing display with six primary colors of red, green, blue, yellow, cyan and magenta.

When the number of primary colors is increased to more than three, the area size of each of apertures of red, green and blue sub pixels is decreased. In this case, especially red, which has a relatively high lightness, cannot be fully represented. As a result, the display quality of red may be reduced. Therefore, Patent Document 2 discloses a multiple primary color display device in which one pixel includes two red sub pixels. In the multiple primary color display device disclosed in Patent Document 2, the sum of the aperture area sizes of the red sub pixels is made larger than the aperture area size of each of the other colors, so that the display quality of red is improved.

Patent Document 3 discloses a display device of four primary colors in which the aperture area sizes of red and blue sub pixels are larger than the aperture area sizes of green and yellow sub pixels. In the display device disclosed in Patent Document 3, the aperture area size of the red sub pixel is made larger to improve the display quality of red. The aperture area size of the blue sub pixel, which has a relatively low transmittance of the color filter is also made larger. Therefore, the transmittance of the entire color filters is decreased. However, even when the amount of a blue component of a backlight, which has a relatively low light emission efficiency among color components of the backlight, is decreased, the liquid crystal display device can realize a prescribed color temperature. Therefore, white, which has a high lightness (luminance), can be efficiently realized.

CITATION LIST

Patent Literature

Patent Document 1: U.S. Pat. No. 7,268,757
Patent Document 2: WO2007/034770
Patent Document 3: WO2007/148519

SUMMARY OF INVENTION

Technical Problem

As described above, Patent Document 3 describes that the display device of four primary colors improves display quality and efficiently realizes a high luminance, but does not provide a similar discussion on a display device of five primary colors. In the case of a display device of five primary colors, merely designing the sub pixels as described above may not result in efficient realization of a high luminance or may result in reduction of the display quality.

The present invention, made in light of the above-described problems, has an object of providing a five primary color liquid crystal display device for improving the display quality and efficiently realizing a high luminance.

Solution to Problem

A liquid crystal display device according to the present invention comprises a pixel including a plurality of sub pixels. The plurality of sub pixels include a red sub pixel, a green sub pixel, a blue sub pixel, a yellow sub pixel and a cyan sub pixel; and one of the blue sub pixel and the cyan sub pixel has an aperture area size which is larger than an aperture area size of any of the other of the blue and cyan sub pixels, the green sub pixel and the yellow sub pixel; and the aperture area size of the red sub pixel is larger than the aperture area size of any of the other of the blue and cyan sub pixels, the green sub pixel, and the yellow sub pixel.

In one embodiment, when a chromaticity of the cyan sub pixel represented by x, y is within a first range which is enclosed by a chromaticity of a white point, a chromaticity of a main wavelength of 490 nm and a color purity of 40%, a chromaticity of a main wavelength of 485 nm and a color purity of 60%, and a chromaticity of a main wavelength of 470 nm and a color purity of 100% and is outside a color reproduction range defined by the EBU format, the aperture area size of each of the red sub pixel and the cyan sub pixel is larger than the aperture area size of any of the green sub pixel, the blue sub pixel and the yellow sub pixel; and when the chromaticity of the cyan sub pixel represented by x, y is within a second range which corresponds to a main wavelength of 470 nm or longer and 520 nm or shorter, is outside the first range and is outside the color reproduction range defined by the EBU format, the aperture area size of each of the red sub pixel and the blue sub pixel is larger than the aperture area size of any of the green sub pixel, the cyan sub pixel and the yellow sub pixel.

In one embodiment, the chromaticity of the white point is (0.3333, 0.3333).

Advantageous Effects of Invention

According to the present invention, a five primary color liquid crystal display device for improving the display quality and efficiently realizing a high luminance can be provided.

BRIEF DESCRIPTION OF DRAWINGS

FIG. 11 is a graph showing how the relative luminance and the luminance ratio of a red sub pixel change in accordance with the change of the ratios of the aperture area sizes of the sub pixels in liquid crystal display devices in comparative example 3a and example 1a.

DESCRIPTION OF EMBODIMENTS

Hereinafter, embodiments of a liquid crystal display device according to the present invention will be described with reference to the drawings. The present invention is not limited to the following embodiments.

Embodiment 1

Figure 1:
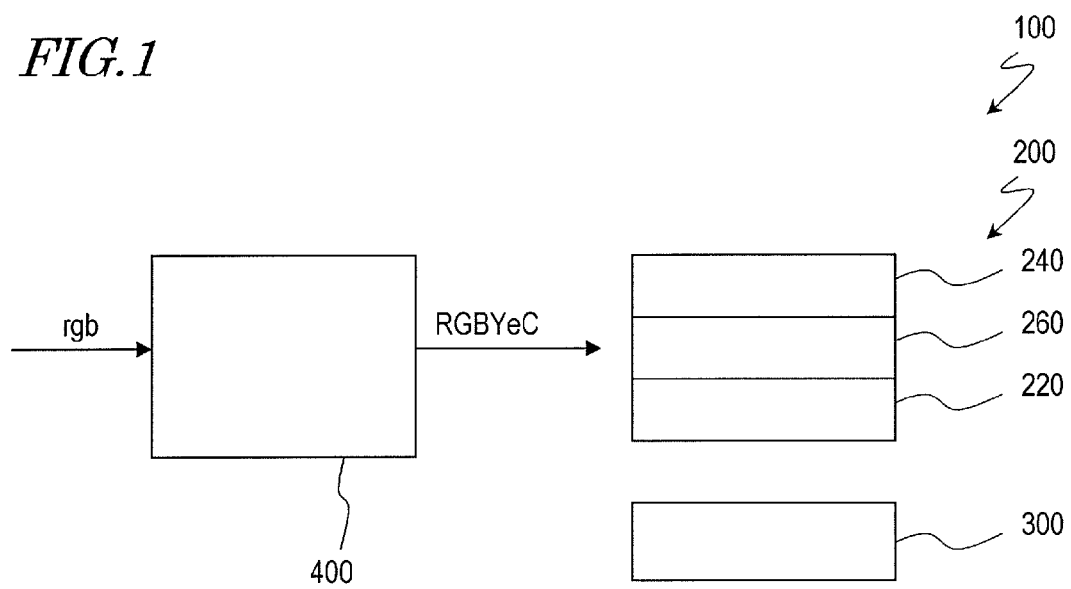
FIG. 1 is a schematic view showing a liquid crystal display device in Embodiment 1 according to the present invention.

Hereinafter, a liquid crystal display device in Embodiment 1 according to the present invention will be described. FIG. 1 shows a schematic view of a liquid crystal display device 100 in this embodiment. The liquid crystal display device 100 includes a liquid crystal panel 200, a backlight 300, and a multiple primary color conversion section 400. The liquid crystal panel 200 includes an active matrix substrate 220, a counter substrate 240, and a liquid crystal layer 260 provided between the active matrix substrate 220 and the counter substrate 240. The active matrix substrate 220 and the counter substrate 240 each include a polarizing plate (not shown), and transmission axes of the polarizing plates are located in crossed Nicols. For example, the active matrix substrate 220 includes lines, an insulating layer, pixel electrodes and the like (not shown), and the counter substrate 240 includes a counter electrode, a color filter layer and the like (not shown). The liquid crystal display device 260 has a generally uniform thickness.

The liquid crystal panel 200 includes a plurality of pixels arrayed in a matrix of a plurality of rows and a plurality of columns. Each of the pixels includes a plurality of sub pixels. The plurality of sub pixels are red, green, blue, yellow and cyan sub pixels. Each of the sub pixels has a luminance which is independently controllable. In the liquid crystal panel 200, each pixel provides display with five primary colors, namely, red, green, blue, yellow and cyan.

In the liquid crystal panel 200, each sub pixel includes a transmission area, and the liquid crystal panel 200 is of a transmissive type. Light emitted from the backlight 300 is modified by the liquid crystal panel 200 so that a desired image is displayed. In the liquid crystal panel 200, each sub pixel may include a reflection area in addition to the transmission area, and the liquid crystal panel 200 may be of a transreflective type.

The multiple primary color conversion section 400 converts gray scale levels rgb of an input signal into gray scale levels RGBYeC. In the following description of this specification, the gray scale levels of the red sub pixel R, the green sub pixel G, the blue sub pixel B, the yellow sub pixel Ye, and the cyan sub pixel C will also be represented as R, G, B, Ye and C. In FIG. 1, the gray scale levels R, G, B, Ye and C are collectively represented as RGBYeC. Each of the gray scale levels R, G, B, Ye and C can have a value of 0 through 255. The multiple primary color conversion section 400 have, for example, a lookup table (not shown), and the lookup table has data which represents the gray scale levels of the red, green, blue, yellow and cyan sub pixels corresponding to the gray scale levels r, g and b of the three primary colors. Fundamentally, a color specified by the gray scale levels RGBYeC is the same as a color specified by the gray scale levels rgb, but may be different when necessary. The multiple primary color conversion section 400 generates a multiple primary color signal based on the input signal representing the gray scale levels rgb. The multiple primary color signal represents the gray scale levels RGBYeC respectively corresponding to the sub pixels included in a pixel of the liquid crystal panel 200.

In the following description, the luminance level of a sub pixel corresponding to the minimum gray scale level (e.g., gray scale level 0) will be represented as "0", and the luminance level of a sub pixel corresponding to the maximum gray scale level (e.g., gray scale level 255) will be represented as "1", for the sake of convenience. Even having the same luminance level, the red, green and blue sub pixels actually have different luminances, and a "luminance level" represents a ratio with respect to the maximum luminance of each sub pixel. For example, when a pixel represents black in the input signal, the gray scale levels r, g and b represented by the input signal are all the minimum gray scale level (e.g., gray scale level 0). When a pixel represents white in the input signal, the gray scale levels r, g and b represented by the input signal are all the maximum gray scale level (e.g., gray scale level 255). In the following description, the gray scale levels may be normalized by the maximum gray scale level so that the gray scale levels are represented in the range of "0" through "1".

In the liquid crystal display device 100, the color temperature is set to a desired value. For example, the color temperature is 9900 K, which corresponds to the chromaticity of the white point (x, y)=(0.281, 0.288).

Figure 2:
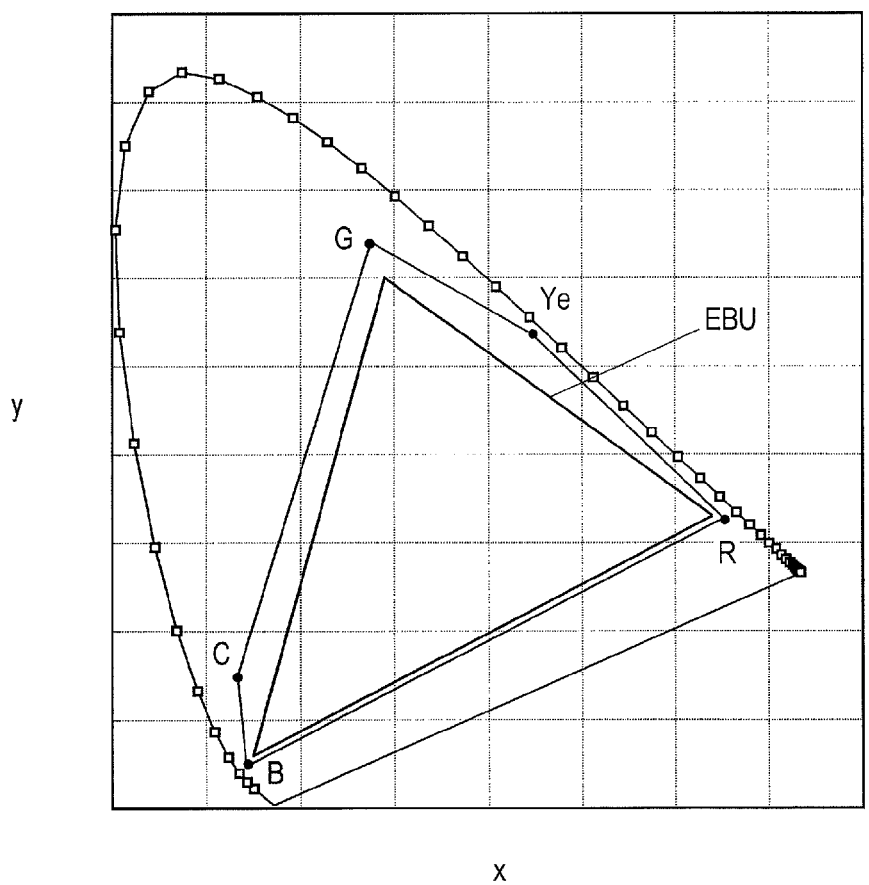
FIG. 2 is an xy chromaticity diagram schematically showing a color reproduction range of the liquid crystal display device shown in FIG. 1.

FIG. 2 shows an xy chromaticity diagram which schematically represents a color reproduction range of the liquid crystal display device 100. In FIG. 2, R, G, B, Ye and C respectively represent the chromaticity of the corresponding sub pixels. For example, R represents the chromaticity of the liquid crystal display device 100 in the case where the gray scale level of the red sub pixel is maximum and the gray scale levels of the other sub pixels are minimum. A color reproduction range of the liquid crystal display device 100 may be represented by a pentagon having R, G, B, Ye and C of the sub pixels as apexes. The chromaticity of each sub pixel is outside the color reproduction range defined by the European Broadcasting Union (EBU) format.

In FIG. 2, the chromaticity of the cyan sub pixel is located relatively close to the chromaticity of the blue sub pixel, but the chromaticity of the cyan sub pixel may be located closer to the green sub pixel than the blue sub pixel. RGBYe are also called "unique colors". When the chromaticity of each of the red, green, blue and yellow is outside a relatively narrow range, the display quality is reduced. By contrast, when the chromaticity of cyan is within a relatively wide range, the display quality is not liable to be reduced.

In the liquid crystal display device 100 in this embodiment, the relationship among the ratios of the aperture area sizes of the sub pixels is set in accordance with the chromaticity of the cyan sub pixel. The "aperture area size" of each sub pixel is an area size of an area in which the aperture of the color filter (area with no blocking film such as a black matrix) overlaps and the aperture of the active matrix substrate 220 as seen in the normal direction to the display screen of the liquid crystal display device 100.

Specifically, the relationship among the ratios of the aperture area sizes is set such that the aperture area size of one of the blue sub pixel and the cyan sub pixel is larger than the other of the blue and cyan sub pixels, the green sub pixel and the yellow sub pixel, and the aperture area size of the red sub pixel is larger than the above other sub pixel, the green sub pixel and the yellow sub pixel, in accordance with the chromaticity of the cyan sub pixel. The "chromaticity of the cyan sub pixel" is the chromaticity of the liquid crystal display device 100 in the case where the gray scale level of the cyan sub pixel is maximum and the gray scale levels of the other sub pixels are minimum.

When the chromaticity of the cyan sub pixel represents a certain value, as shown in FIG. 3(a), the aperture area size of each of the red sub pixel and the cyan sub pixel is larger than the aperture area size of each of the green, blue and yellow sub pixels. Specifically, when the chromaticity of the cyan sub pixel is outside the color reproduction range of the EBU format and is relatively close to the chromaticity of the white point and also relatively close to the chromaticity of the blue sub pixel, the aperture area size of each of the red sub pixel and the cyan sub pixel is larger than the aperture area size of each of the green, blue and yellow sub pixels. For example, where the ratio of the aperture area size of each of the green, blue and yellow sub pixels is 1.0, the ratio of the aperture area size of each of the red sub pixel and the cyan sub pixel is 1.8.

By contrast, when the chromaticity of the cyan sub pixel represents another value, as shown in FIG. 3(b), the aperture area size of each of the red sub pixel and the blue sub pixel is larger than the aperture area size of each of the green, cyan and yellow sub pixels. Specifically, when the chromaticity of the cyan sub pixel is relatively far from the chromaticity of the white point or is relatively close to the chromaticity of the green sub pixel, the aperture area size of each of the red sub pixel and the blue sub pixel is larger than the aperture area size of each of the green, cyan and yellow sub pixels. For example, where the ratio of the aperture area size of each of the green, cyan and yellow sub pixels is 1.0, the ratio of the aperture area size of each of the red sub pixel and the blue sub pixel is 1.8.

In the following description, a liquid crystal panel in which the aperture area sizes of the red sub pixel and the cyan sub pixel are large will be referred to as the "liquid crystal panel 200A", and a liquid crystal panel in which the aperture area sizes of the red sub pixel and the blue sub pixel are large will be referred to as the "liquid crystal panel 200B". In the liquid crystal display device 100 in this embodiment, the aperture area sizes the red and cyan sub pixels, or the aperture area sizes the red and blue sub pixels, are relatively large in accordance with the chromaticity of the cyan sub pixel. Therefore, the lightness of red is improved and a high luminance is efficiently realized.

Hereinafter, advantages of the liquid crystal display device 100 in this embodiment will be described as compared with liquid crystal display devices in comparative examples 1 and 2. First, the liquid crystal display device in comparative example 1 will be described.

Figure 4:
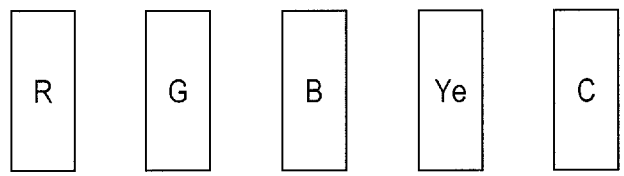
FIG. 4 is a schematic view showing a liquid crystal panel of a liquid crystal display device in comparative example 1.

FIG. 4 shows a schematic view of sub pixels included in one pixel in a liquid crystal panel of the liquid crystal display device in comparative example 1. In the liquid crystal display device in comparative example 1 also, the five sub pixels included in one pixel are red, green, blue, yellow and cyan sub pixels, but the sub pixels have a generally equal aperture area size to each other. In the liquid crystal display device in comparative example 1, each pixel includes five sub pixels. Therefore, as compared with a three primary color liquid crystal display device having an equal pixel size to the liquid crystal display device in comparative example 1, the aperture area size of one sub pixel in the liquid crystal display device in comparative example 1 is relatively small. In such a liquid crystal display device in comparative example 1, especially the reproduceable lightness of red is relatively low and thus a part of colors of an object cannot be represented. When the lightness (Y value) is decreased by an increase of the number of primary colors to be used in this manner, red becomes murky (i.e., dark), and red, which has a high lightness, cannot be fully reproduced. As a result, the display quality of red is reduced.

Figure 5:
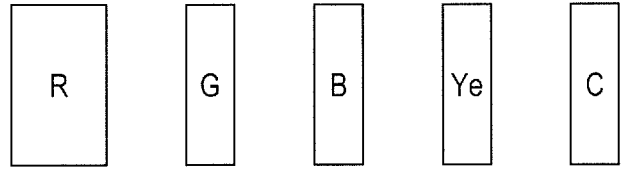
FIG. 5 is a schematic view showing a liquid crystal panel of a liquid crystal display device in comparative example 2.

Now, the liquid crystal display device in comparative example 2 will be described. FIG. 5 shows a schematic view of sub pixels included in one pixel in a liquid crystal panel of the liquid crystal display device in comparative example 2. In the liquid crystal display device in comparative example 2, the aperture area size of the red sub pixel is larger than the aperture area size of each of the other sub pixels, and the green, blue, yellow and cyan sub pixels have a generally equal aperture area size to each other. For example, the aperture area size of the red sub pixel is 1.8 times the aperture area size of each of the green, blue, yellow and cyan sub pixels.

In the liquid crystal display device in comparative example 2, as compared with the liquid crystal display device in comparative example 1, the aperture area size of the red sub pixel is larger and thus the luminance ratio of the red sub pixel is relatively high. Therefore, red, which has a high lightness, can be fully reproduced, and the reduction of the display quality of red is suppressed. However, in the liquid crystal display device in comparative example 2, the ratio of the aperture area size of the red sub pixel having a relatively low transmittance is increased. Therefore, the transmittance of the color filter layer is decreased. Unless the strength of light emitted from the backlight is increased, a high luminance cannot be realized.

By contrast, in the liquid crystal display device 100 in this embodiment, the aperture area size of the red sub pixel is relatively large, and thus red, which has a high lightness, can be fully reproduced. Also in the liquid crystal display device 100, the aperture area size of the cyan or blue sub pixel is relatively large in accordance with the chromaticity of the cyan sub pixel. Owing to this, a high luminance can be efficiently realized.

As described above, in the liquid crystal display device 100, which sub pixel has a larger aperture area size varies in accordance with the chromaticity of the cyan sub pixel. Hereinafter, with reference to FIG. 6, the relationship between the chromaticity of the cyan sub pixel and the aperture area sizes of the sub pixels will be described. As described above, the chromaticity of the cyan sub pixel is outside the color reproduction range defined by the EBU format, and the liquid crystal display device 100 can realize a wide color reproduction range.

The chromaticity of the cyan sub pixel can be specified by the main wavelength and the color purity of the cyan sub pixel. Here, the main wavelength and the color purity of the cyan sub pixel are determined with respect to the chromaticity of the white point, which is the reference. The chromaticity of the white point (x, y) is (0.3333, 0.3333).

The main wavelength of the cyan sub pixel is defined by an intersection of a line connecting the chromaticity of the cyan sub pixel and the chromaticity of the white point, and a locus of the spectrum. As the chromaticity of the cyan sub pixel is closer to the chromaticity of the blue sub pixel, the main wavelength of the cyan sub pixel is shorter; whereas as the chromaticity of the cyan sub pixel is closer to the chromaticity of the green sub pixel, the main wavelength of the cyan sub pixel is longer.

The color purity of the cyan sub pixel is determined by the ratio of the length of a line segment connecting the chromaticity of the white point and the chromaticity of the cyan sub pixel with respect to the length of a line segment extending from the chromaticity of the white point to an intersection thereof with the locus of the spectrum via the chromaticity of the cyan sub pixel. As the chromaticity of the cyan sub pixel is closer to the chromaticity of the white point, the color purity of the cyan sub pixel is lower; whereas as the chromaticity of the cyan sub pixel is closer to the locus of spectrum, the color purity of the cyan sub pixel is higher.

Figure 6:
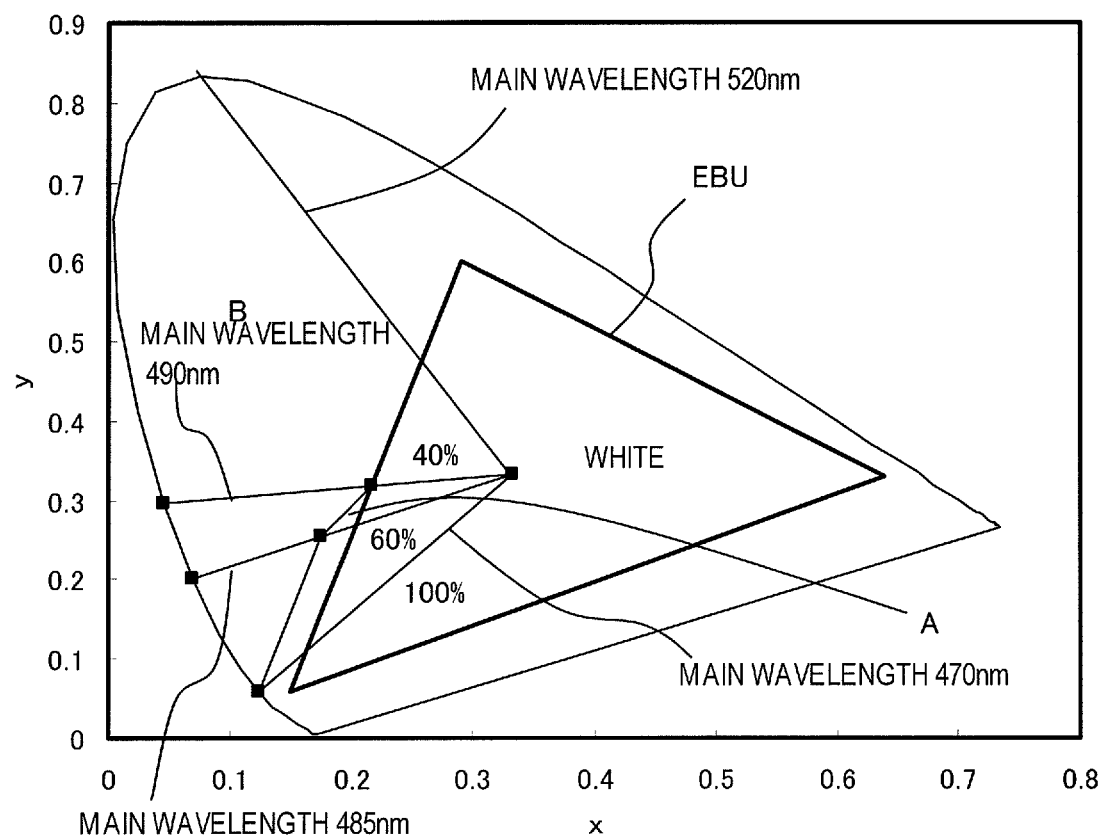
FIG. 6 is an xy chromaticity diagram showing a range A and a range B of the chromaticity of the cyan sub pixel.

As shown in FIG. 6, when the color purity of the cyan sub pixel is relatively low and the main wavelength of the cyan sub pixel is relatively close to the main wavelength of the blue sub pixel, namely, when the chromaticity of the cyan sub pixel is within the range A shown in FIG. 6, the aperture area size of each of the red sub pixel and the cyan sub pixel is larger than the aperture area size of each of the green, blue and yellow sub pixels.

By contrast, when the color purity of the cyan sub pixel is relatively high or when the main wavelength of the cyan sub pixel is relatively close to the main wavelength of the green sub pixel, namely, when the chromaticity of the cyan sub pixel is within the range B shown in FIG. 6, the aperture area size of each of the red sub pixel and the blue sub pixel is larger than the aperture area size of each of the green, cyan and yellow sub pixels.

Specifically, the range A of the cyan sub pixel (x, y) is enclosed by the chromaticity of the white point, the chromaticity of a main wavelength of 490 nm and a color purity of 40%, the chromaticity of a main wavelength of 485 nm and a color purity of 60%, and the chromaticity of a main wavelength of 470 nm and a color purity of 100%, and is outside the color reproduction range defined by the EBU format. The range B corresponds to a main wavelength of 470 nm or longer and 520 nm or shorter, is outside the range A, and is outside the color reproduction range defined by the EBU format. In the following description of this specification, the range A and range B may be referred to as the "first range" and "second range", respectively.

When the liquid crystal panels 200A and 200B are combined with the same backlight, the chromaticity of the white point is changed and thus the color temperature is shifted. Therefore, in the liquid crystal display device 100, in order to realize a prescribed color temperature, a backlight 300 having a different emission spectrum is used for a different color filter of the liquid crystal panel 200. For example, the color temperature is set to about 9900 K. When the emission spectrum of the backlight 300 is changed, the light emission efficiency of the backlight 300 is changed.

In the following description, the backlight for realizing a prescribed color temperature for the liquid crystal panel 200A in which the aperture area sizes of the red sub pixel and the cyan sub pixel are large will be referred to as the "backlight 300A", and the liquid crystal display device including the liquid crystal panel 200A and the backlight 300A will be referred to as the "liquid crystal display device 100A". The backlight for realizing a prescribed color temperature for the liquid crystal panel 200B in which the aperture area sizes of the red sub pixel and the blue sub pixel are large will be referred to as the "backlight 300B", and the liquid crystal display device including the liquid crystal panel 200B and the backlight 300B will be referred to as the "liquid crystal display device 100B".

Figure 7:
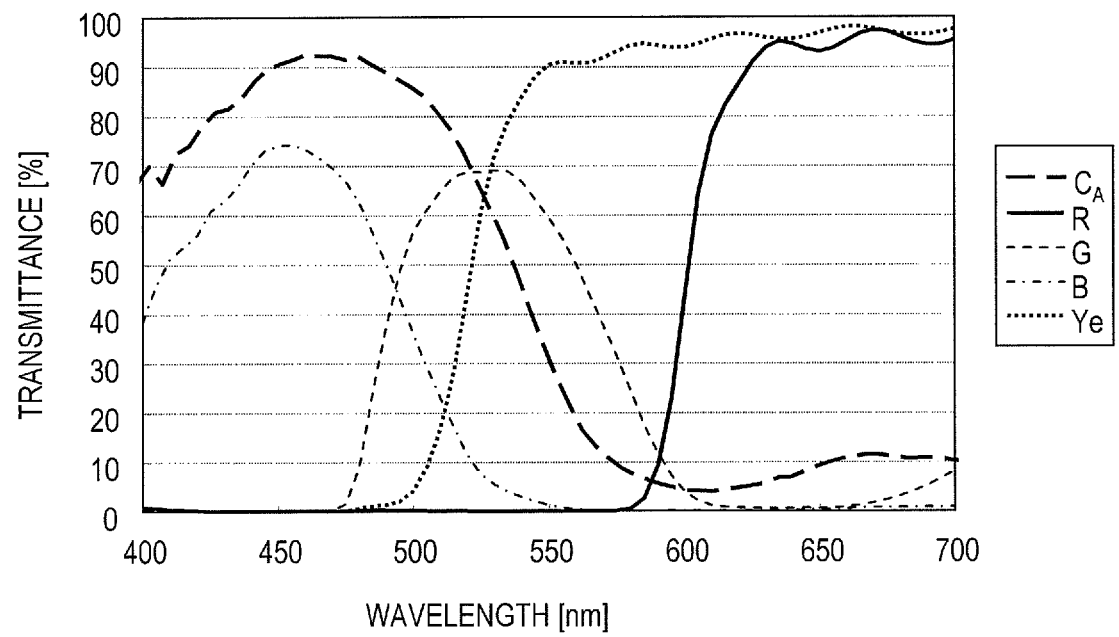
FIG. 7(a) is a graph showing spectra of color filters of a liquid crystal panel of the liquid crystal display device shown in FIG. 1 when the chromaticity of the cyan sub pixel is within the range A.
FIG. 7(b) is a graph showing spectra of color filters of a liquid crystal panel of the liquid crystal display device shown in FIG. 1 when the chromaticity of the cyan sub pixel is within the range B.
Figure 7:
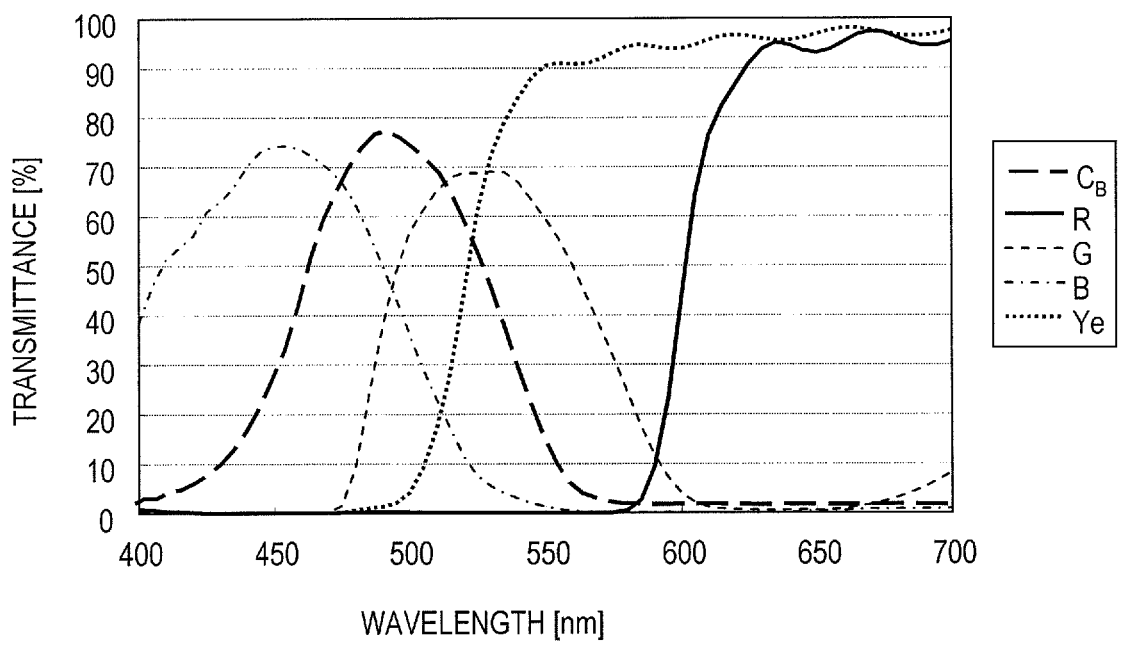

FIG. 7(a) shows transmission spectra of color filters corresponding to the respective sub pixels in the liquid crystal panel 200A, and FIG. 7(b) shows transmission spectra of color filters corresponding to the respective sub pixels in the liquid crystal panel 200B. In FIG. 7(a) and FIG. 7(b), the red, green, blue and yellow color filters used for the liquid crystal panels 200A and 200B are represented as R, G, B and Ye. In FIG. 7(a) and FIG. 7(b), the cyan color filter used for the liquid crystal panel 200A is represented as $C_A$, and the cyan color filter used for the liquid crystal panel 200B is represented as $C_B$.

The transmission spectrum of each of the red, green, blue and yellow color filters in the liquid crystal panel 200A is generally equal to that in the liquid crystal panel 200B. The transmittance of the blue color filter has a peak at around a wavelength of 450 nm. The transmittance of the green color filter has a peak at around a wavelength of 530 nm. The yellow color filter exhibits a transmittance of 90% or higher at a wavelength of 550 nm or longer and 700 nm or shorter. The red color filter exhibits a transmittance of 90% or higher at a wavelength of 630 nm or longer and 700 nm or shorter.

By contrast, the transmission spectrum of the cyan color filter in the liquid crystal panel 200A is different from the transmission spectrum of the cyan color filter in the liquid crystal panel 200B. In the transmission spectrum of the cyan color filter $C_A$, the transmittance of the wavelength corresponding to blue is relatively high; whereas in the transmission spectrum of the cyan color filter $C_B$, the transmittance of the wavelength corresponding to blue is relatively low.

Figure 8:
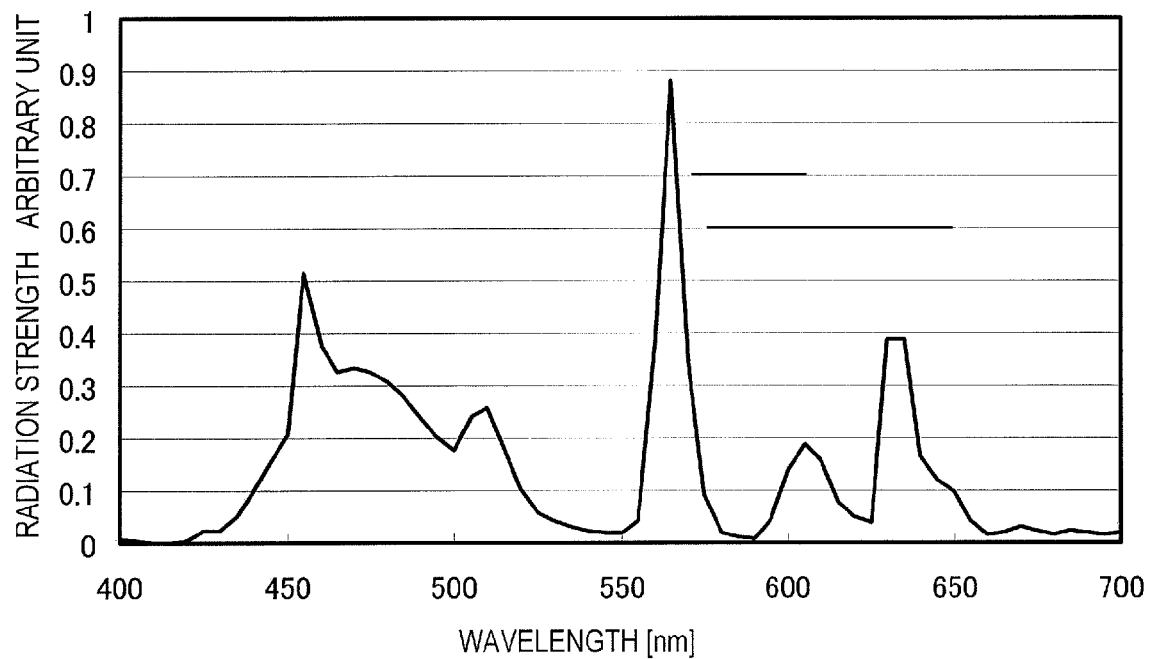
FIG. 8(a) is a graph showing an emission spectrum of a backlight of the liquid crystal display device shown in FIG. 1 when the chromaticity of the cyan sub pixel is within the range A.
FIG. 8(b) is a graph showing an emission spectrum of the backlight of the liquid crystal display device shown in FIG. 1 when the chromaticity of the cyan sub pixel is within the range B.
Figure 8:
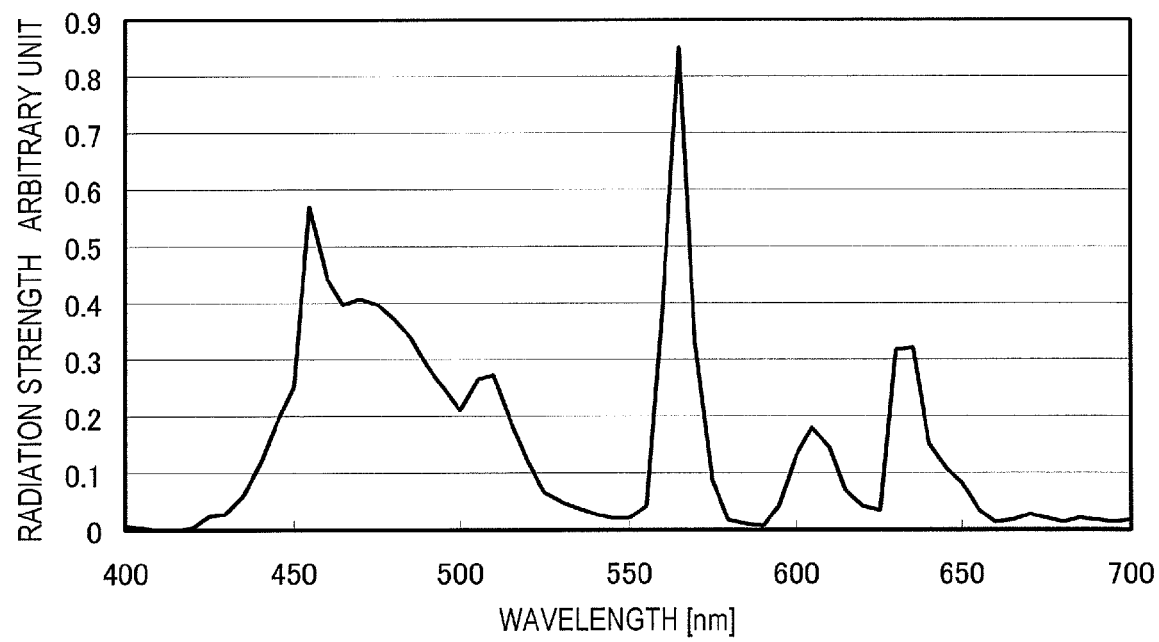

FIG. 8(a) shows an emission spectrum of the backlight 300A, and FIG. 8(b) shows an emission spectrum of the backlight 300B. The backlights 300A and 300B are both a cold cathode fluorescent lamp (CCFL). In both of the backlights 300A and 300B, the radiation strength of the wavelength corresponding to green is higher than the radiation strength of the wavelength corresponding to each of red and blue, and the radiation strength of the wavelength corresponding to blue is higher than the radiation strength of the wavelength corresponding to red. Comparing the emission spectra of the backlights 300A and 300B, the radiation strength of the wavelength corresponding to red is relatively high in the backlight 300A, and the radiation strength of the wavelength corresponding to blue is relatively high in the backlight 300B.

In the xy chromaticity diagram, the distance between main wavelengths in an area corresponding to cyan is longer than the distance between main wavelengths in an area corresponding to each of red, green, blue and yellow. Therefore, the chromaticity of the cyan sub pixel can vary relatively significantly as the color filter, the ratios of the aperture area sizes, and the emission spectrum from the backlight vary.

Now, FIG. 3 will be referred to again. In the liquid crystal panel 200A shown in FIG. 3(a), the five sub pixels included in one pixel, namely, the red sub pixel R, the green sub pixel G, the blue sub pixel B, the yellow sub pixel Ye and the cyan sub pixel C are arrayed in the row direction. Here, the red, green, blue, yellow and cyan sub pixels have a generally equal length (distance in a y direction) to each other. However, regarding the width (distance in an x direction), the width of each of the red and cyan sub pixels is larger than the width of each of the green, blue and yellow sub pixels. As can be seen, in the liquid crystal panel 200A, the aperture area size of each of the red sub pixel and the cyan sub pixel is larger than the aperture area size of each of the green, blue and yellow sub pixels.

In the liquid crystal panel 200A, two sub pixels which have an aperture area size larger than that of the other three sub pixels are the red sub pixel and the cyan sub pixel. Here, the red sub pixel and the cyan sub pixel have a generally equal aperture area size to each other, which is larger than the aperture area size of each of the remaining three sub pixels. The present invention is not limited to this. For example, in the liquid crystal panel 200A, the aperture area size of the red sub pixel may be largest, and the aperture area size of the cyan sub pixel may be second largest. Alternatively, the aperture area size of the cyan sub pixel may be largest, and the aperture area size of the red sub pixel may be second largest.

In the liquid crystal panel 200B shown in FIG. 3(b), regarding the width (distance in the x direction), the width of each of the red and blue sub pixels is larger than the width of each of the green, yellow and cyan sub pixels. As can be seen, in the liquid crystal panel 200B, the aperture area size of each of the red sub pixel and the blue sub pixel is larger than the aperture area size of each of the green, yellow and cyan sub pixels.

In the liquid crystal panel 200B, two sub pixels which have an aperture area size larger than that of the other three sub pixels are the red sub pixel and the blue sub pixel. Here, the red sub pixel and the blue sub pixel have a generally equal aperture area size to each other, which is larger than the aperture area size of each of the remaining three sub pixels. The present invention is not limited to this. For example, in the liquid crystal panel 200B, the aperture area size of the red sub pixel may be largest, and the aperture area size of the blue sub pixel may be second largest. Alternatively, the aperture area size of the blue sub pixel may be largest, and the aperture area size of the red sub pixel may be second largest.

As described above, in the liquid crystal display device 100 in this embodiment, the aperture area size of each of the red and cyan sub pixels, or the aperture area size of each of the red and blue sub pixels, is set to be larger than the aperture area size of each of the other sub pixels in accordance with the chromaticity of the cyan sub pixel. Owing to this, the lightness of red is improved and a high luminance is efficiently realized. Here, in order to efficiently realize a high luminance, the light emission efficiency of the backlight and the transmittance of the color filter layer are paid attention to. When the light emission efficiency of the backlight and the transmittance of the color filter layer are both relatively high, a high luminance white color is efficiently realized. When the ratio of the aperture area size of the green or yellow sub pixel is increased in addition to that of the red sub pixel, the transmittance of the color filter layer can be increased but the light emission efficiency of the backlight is significantly decreased. As a result, a high luminance cannot be efficiently realized.

Now, how the light emission efficiency of the backlight and the transmittance of the color filter layer change will be discussed in the case where the ratios of the aperture area sizes of the red, blue and cyan sub pixels are varied while a prescribed color temperature is realized.

When the ratio of the aperture area size of the red sub pixel is increased, the amount of a red component transmitted through the color filter is increased and the amounts of green and blue components transmitted through the color filters are decreased. In this case, in order to suppress the change of the color temperature, the amount of the red component of the light emitted from the backlight needs to be decreased and the amounts of the green and blue components of the light emitted from the backlight need to be increased. The light emission efficiency of the blue component is relatively low, whereas the light emission efficiency of the green component is relatively high. However, the contribution of the green component is larger than that of the blue component. As a result, the light emission efficiency of the backlight is improved. The transmittance of the red color filter per unit area size is relatively low. Therefore, when the ratio of the aperture area size of the red sub pixel is increased, the transmittance of the color filter layer is decreased. As can be seen, when the ratio of the aperture area size of the red sub pixel is increased, the light emission efficiency of the backlight is improved and the transmittance of the color filter layer is decreased. In this case, a decrease component caused by the decrease of the transmittance of the color filter layer is larger than an increase component of luminance caused by the improvement of the light emission efficiency of the backlight. As a result, the relative luminance is decreased.

When the ratio of the aperture area size of the blue sub pixel is increased, the amount of the blue component transmitted through the color filter is increased and the amounts of the red and green components transmitted through the color filters are decreased. In this case, in order to suppress the change of the color temperature, the amount of the blue component of the light emitted from the backlight needs to be decreased and the amounts of the red and green components of the light emitted from the backlight need to be increased. Since the light emission efficiency of the blue component is relatively low and the light emission efficiency of the green component is relatively high, the light emission efficiency of the backlight is improved.

The transmittance of the blue color filter per unit area size is relatively low. Therefore, when the ratio of the aperture area size of the blue sub pixel is increased, the transmittance of the color filter layer is decreased. However, when the color purity of the cyan sub pixel is relatively low, the transmittance of the color filter layer is relatively high. Therefore, the transmittance of the color filter layer is significantly decreased as the ratio of the aperture area size of the blue sub pixel is increased. By contrast, when the color purity of the cyan sub pixel is relatively high, the transmittance of the color filter layer is relatively low. Therefore, the decrease of the transmittance of the color filter layer caused by the increase of the ratio of the aperture area size of the blue sub pixel is relatively small.

As can be seen, when the ratio of the aperture area size of the blue sub pixel is increased, the light emission efficiency of the backlight is improved and the transmittance of the color filter layer is decreased. By contrast, when the ratio of the aperture area size of the blue sub pixel is decreased, the light emission efficiency of the backlight is decreased and the transmittance of the color filter layer is increased.

Which of the increase component of luminance caused by the improvement of the light emission efficiency of the backlight and the decrease component of luminance caused by the decrease of the transmittance of the color filter layer is larger varies in accordance with the chromaticity of the cyan sub pixel. Accordingly, the change of the relative luminance also varies in accordance with the chromaticity of the cyan sub pixel. For example, when the chromaticity of the cyan sub pixel is relatively close to the chromaticity of the blue sub pixel, the amount of the blue component of the light from the backlight is relatively small. Therefore, even when the ratio of the aperture area size of the blue sub pixel is increased, the light emission efficiency of the backlight is not increased much. As a result, the relative luminance is decreased.

By contrast, when the chromaticity of the cyan sub pixel is relatively close to the chromaticity of the green sub pixel, the amount of the blue component of the light from the backlight is relatively large. Therefore, when the ratio of the aperture area size of the blue sub pixel is increased, the increase component of luminance caused by the improvement of the light emission efficiency of the backlight is larger than the decrease component of luminance caused by the decrease of the transmittance of the color filter layer. As a result, the relative luminance is increased. However, when the ratio of the aperture area size of the blue sub pixel is increased to a certain level, the ratio at which the amount of the blue sub pixel of the light emitted from the backlight is decreased is lowered. Therefore, the increase component of luminance caused by the improvement of the light emission efficiency of the backlight becomes smaller than the decrease component of luminance caused by the decrease of the transmittance of the color filter layer. As a result, the relative luminance is decreased. In this manner, the relative luminance varies in accordance with the chromaticity of the cyan sub pixel.

As described above, the chromaticity of the cyan sub pixel is represented by the main wavelength and the color purity of the cyan sub pixel. When the ratio of the aperture area size of the cyan sub pixel is increased, the light emission efficiency of the backlight and the transmittance of the color filter layer vary in accordance with the chromaticity of the cyan sub pixel. Specifically, the light emission efficiency of the backlight varies in accordance with the main wavelength of the cyan sub pixel. The transmittance of the color filter layer varies in accordance with the color purity of the cyan sub pixel.

When the main wavelength of the cyan sub pixel is relatively short, the chromaticity of the cyan sub pixel is relatively close to the chromaticity of the blue sub pixel. When the ratio of the aperture area size of the cyan sub pixel in such a state is increased, the amount of the blue component transmitted through the color filter is increased, and the amounts of the red and green components transmitted through the color filters are decreased. In this case, in order to suppress the change of the color temperature, the amount of the blue component of the light emitted from the backlight needs to be decreased and the amounts of the red and green components of the light emitted from the backlight need to be increased. Since the light emission efficiency of the blue component is relatively low and the light emission efficiency of the green component is relatively high, the light emission efficiency of the backlight is improved.

By contrast, when the main wavelength of the cyan sub pixel is relatively long, the chromaticity of the cyan sub pixel is relatively close to the chromaticity of the green sub pixel. When the ratio of the aperture area size of the cyan sub pixel in such a state is increased, the amounts of the green and blue components transmitted through the color filters are increased, and the amount of the red component transmitted through the color filter is decreased. In this case, in order to suppress the change of the color temperature, the amounts of the green and blue components of the light emitted from the backlight need to be decreased and the amount of the red component of the light emitted from the backlight needs to be increased. The light emission efficiency of the blue component is relatively low, whereas the light emission efficiency of the green component is relatively high. However, the contribution of the green component is larger than that of the blue component. As a result, the light emission efficiency of the backlight is decreased.

In the case where the color purity of the cyan sub pixel is relatively low, namely, in the case where the transmittance of the cyan color filter is relatively high, when the ratio of the aperture area size of the cyan sub pixel is increased, the transmittance of the color filter layer is increased. By contrast, in the case where the color purity of the cyan sub pixel is relatively high, namely, in the case where the transmittance of the cyan color filter is relatively low, when the ratio of the aperture area size of the cyan sub pixel is increased, the transmittance of the color filter layer is decreased.

Figure 9:
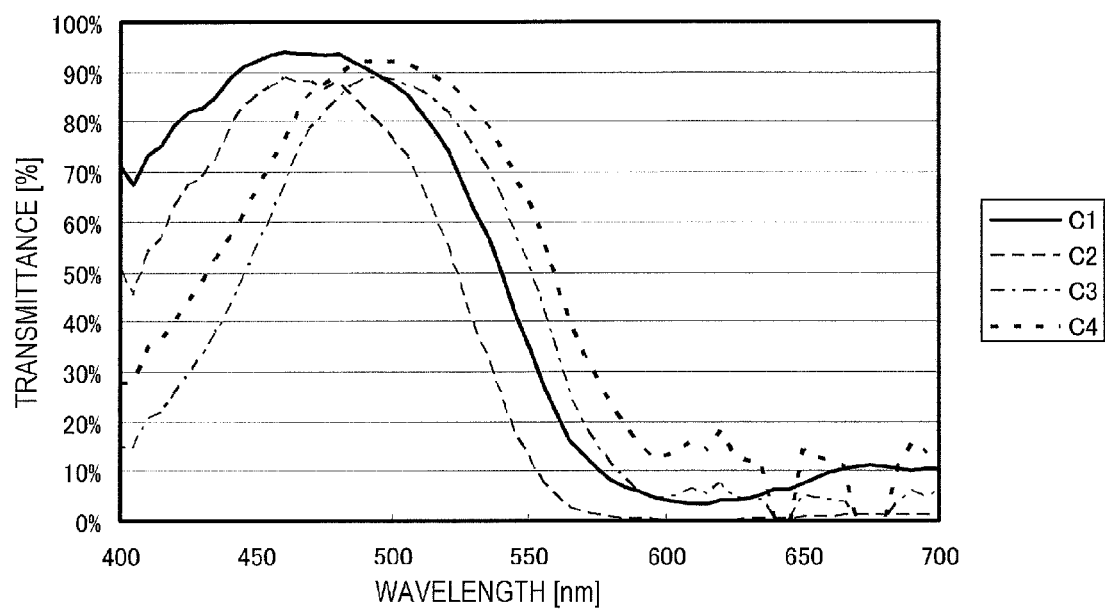
FIG. 9(a) is a graph showing transmission spectra of cyan color filters of a liquid crystal panel of the liquid crystal display device shown in FIG. 1 when the chromaticity of the cyan sub pixel is within the range A.
FIG. 9(b) is a graph showing transmission spectra of cyan color filters of a liquid crystal panel of the liquid crystal display device shown in FIG. 1 when the chromaticity of the cyan sub pixel is within the range B.
Figure 9:
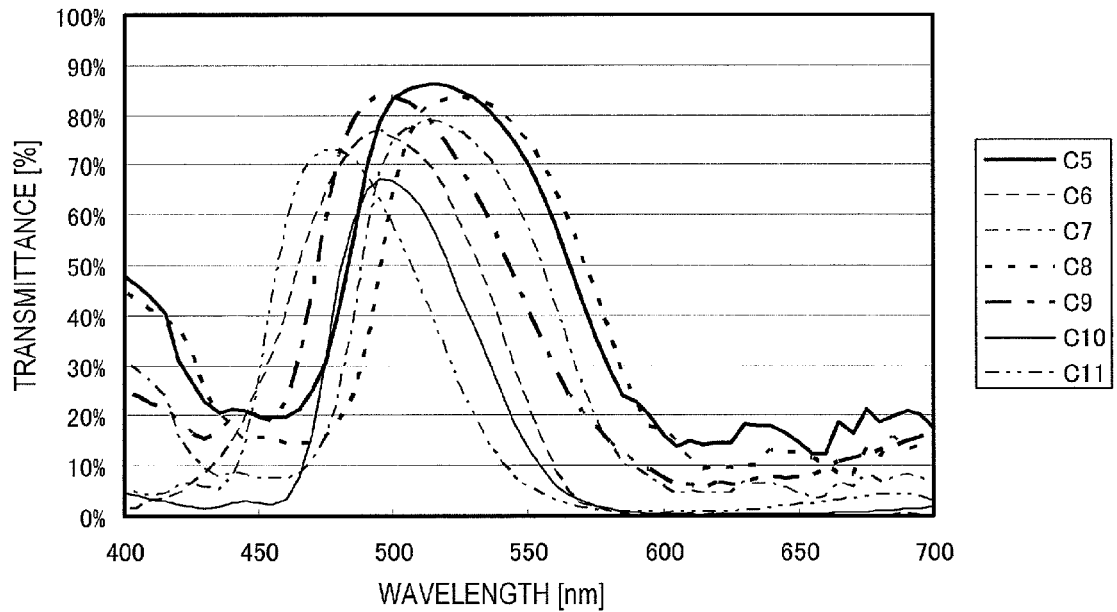
Figure 10:
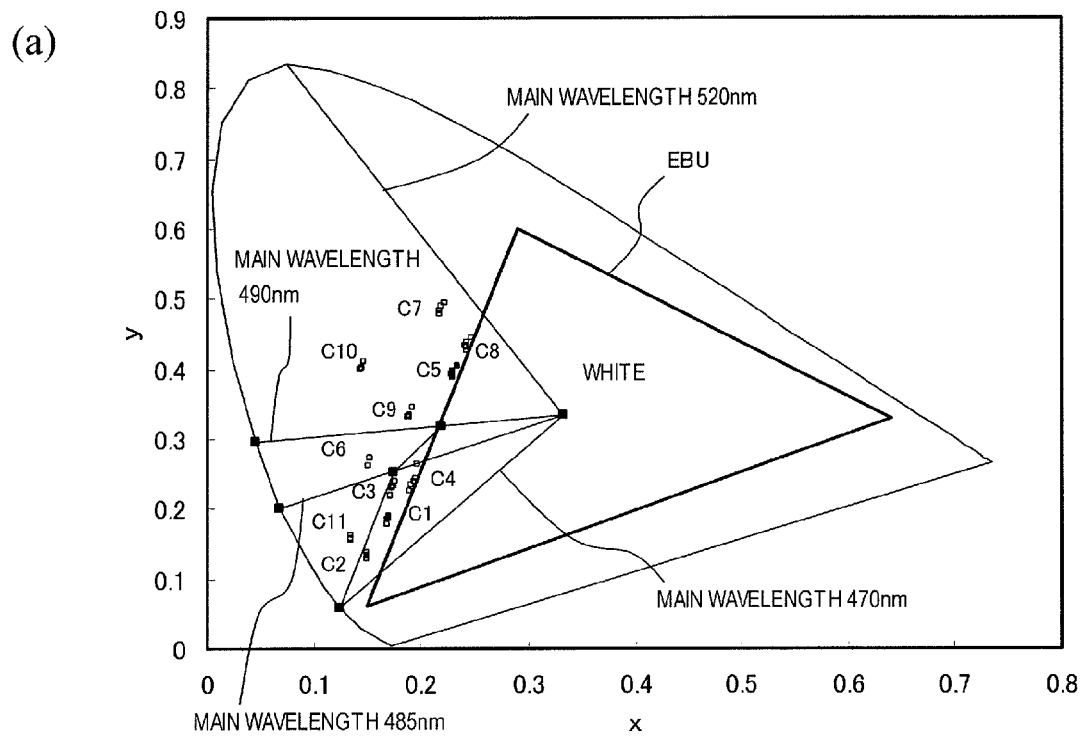
FIG. 10(a) is an xy chromaticity diagram showing the range A and the range B of the cyan sub pixel.
FIG. 10(b) is a partial enlarged view of FIG. 10(a).
Figure 10:
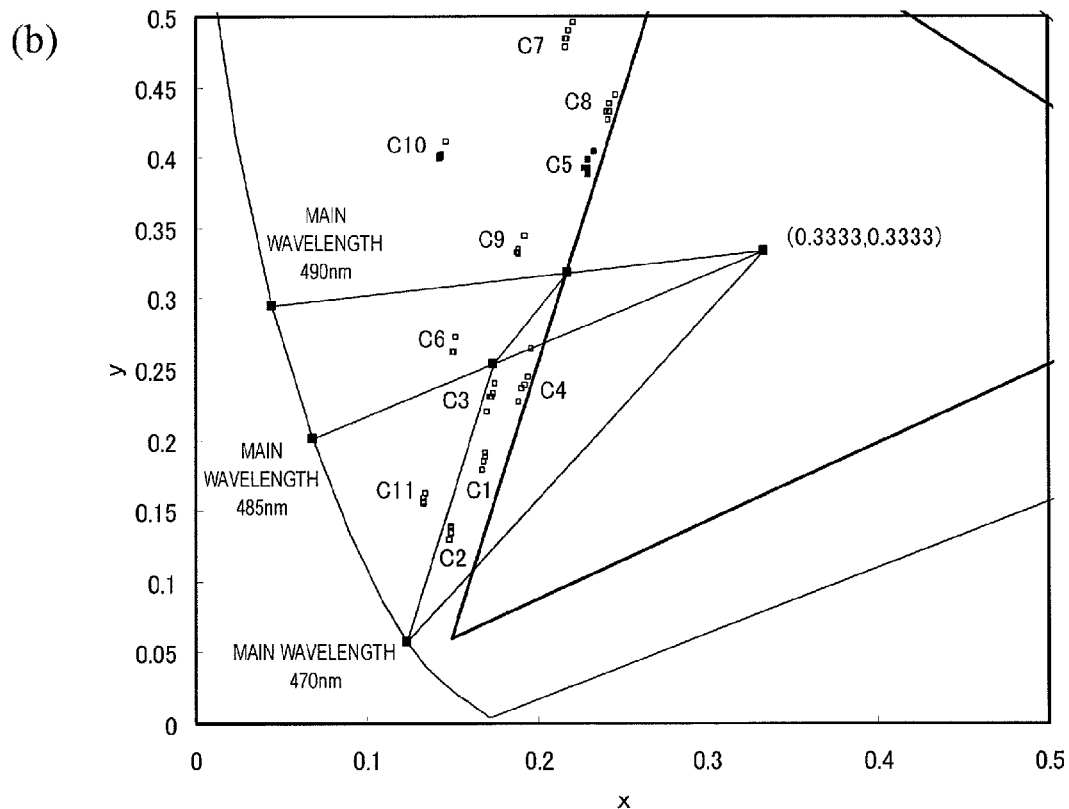

As described above, color filters having different transmission spectra can be used as cyan color filters. FIG. 9(a) shows transmission spectra of cyan color filters C1 through C4, and FIG. 9(b) shows transmission spectra of cyan color filters C5 through C11. FIG. 10(a) and FIG. 10(b) each show a chromaticity diagram of the cyan sub pixel in the case where the color filters C1 through C11 shown in FIG. 9(a) and FIG. 9(b) are used as cyan color filters and also the red, green, blue and yellow color filters shown in FIG. 6 are used. In FIG. 10(a) and FIG. 10(b), a plurality of chromaticity points are shown for each of the cyan color filters C1 through C11, for the following reason. The spectrum of the backlight is adjusted in accordance with the difference of the ratio of the aperture area size, and as a result, the chromaticity of the cyan sub pixel is changed.

As understood from FIG. 10(a) and FIG. 10(b), when the cyan color filter is any one of the color filters C1 through C4 shown in FIG. 9(a), the chromaticity of the cyan sub pixel is within the range A (first range). Therefore, as in the liquid crystal panel 200A shown in FIG. 3(a), the aperture area size of each of the red and cyan sub pixels is made larger than that of each of the other sub pixels. When the cyan color filter is any one of the color filters C5 through C11 shown in FIG. 9(b), the chromaticity of the cyan sub pixel is within the range B (second range). Therefore, as in the liquid crystal panel 200B shown in FIG. 3(b), the aperture area size of each of the red and blue sub pixels is made larger than that of each of the other sub pixels.

In the liquid crystal panel 200A shown in FIG. 3(a), the red and cyan sub pixels have a generally equal aperture area size to each other, and the green, blue and yellow sub pixels have a generally equal aperture area size to each other. The present invention is not limited to this. Similarly, in the liquid crystal panel 200B shown in FIG. 3(b), the red and blue sub pixels have a generally equal aperture area size to each other, and the green, cyan and yellow sub pixels have a generally equal aperture area size to each other. The present invention is not limited to this.

Hereinafter, advantages of the liquid crystal display device 100A as compared with liquid crystal display devices in comparative examples 1 through 3 will be described. In the following description, as the liquid crystal display device 100A, liquid crystal display devices in examples 1 through 5 will be described. In any of the liquid crystal display devices in comparative examples 1 through 3 and the liquid crystal display devices in examples 1 through 5, each pixel includes red, green, blue, yellow and cyan sub pixels. In any of the liquid crystal display devices in comparative examples 1 through 3 and the liquid crystal display devices in examples 1 through 5, the color temperature is about 9900 K, specifically 9865 to 9910 K.

As described above, in the liquid crystal display device in comparative example 1, the red, green, blue, yellow and cyan sub pixels have a generally equal aperture area size to each other. By contrast, in the liquid crystal display device in comparative example 2, the aperture area size of the red sub pixel is larger than the aperture area size of each of the green, blue, yellow and cyan sub pixels. Here, the aperture area size of the red sub pixel is 1.8 times the aperture area size of each of the green, blue, yellow and cyan sub pixels. In the liquid crystal display device in comparative example 3, the aperture area size of each of the red sub pixel and the blue sub pixel is larger than the aperture area size of each of the other sub pixels. Here, the aperture area size of each of the red and blue sub pixels is 1.8 times the aperture area size of each of the green, yellow and cyan sub pixels.

In the liquid crystal display devices in examples 1 through 5, the aperture area size of each of the red sub pixel and the cyan sub pixel is larger than the aperture area size of each of the other sub pixels. In the liquid crystal display device in example 1, the aperture area size of each of the red sub pixel and the cyan sub pixel is 1.8 times the aperture area size of each of the green, blue and yellow sub pixels.

In the liquid crystal display device in example 2, the aperture area size of the red sub pixel is larger than the aperture area size of the cyan sub pixel. The aperture area size of the red sub pixel is 2.0 times the aperture area size of each of the green, blue and yellow sub pixels. The aperture area size of the cyan sub pixel is 1.8 times the aperture area size of each of the green, blue and yellow sub pixels.

In the liquid crystal display device in example 3, the aperture area size of the cyan sub pixel is larger than the aperture area size of the red sub pixel. The aperture area size of the cyan sub pixel is 2.0 times the aperture area size of each of the green, blue and yellow sub pixels. The aperture area size of the red sub pixel is 1.8 times the aperture area size of each of the green, blue and yellow sub pixels.

In the liquid crystal display device in example 4, the aperture area size of the blue sub pixel is smaller than the aperture area size of each of the green and yellow sub pixels. The aperture area size of each of the red and cyan sub pixels is 1.8 times the aperture area size of each of the green and yellow sub pixels. The aperture area size of the blue sub pixel is 0.8 times the aperture area size of each of the green and yellow sub pixels.

In the liquid crystal display device in example 5, the aperture area size of the blue sub pixel is larger than the aperture area size of each of the green and yellow sub pixels. The aperture area size of each of the red and cyan sub pixels is 1.8 times the aperture area size of each of the green and yellow sub pixels. The aperture area size of the blue sub pixel is 1.2 times the aperture area size of each of the green and yellow sub pixels.

First, with reference to Tables 1 through 8, liquid crystal display devices in comparative examples 1a through 3a and liquid crystal display devices in examples 1a through 5a using the color filter C1 shown in FIG. 9(a) as the cyan color filter will be described.

Table 1 shows the aperture area size, the chromaticity and the luminance ratio of each of the red (R), green (G), blue (B), cyan (C1) and yellow (Ye) sub pixels, the light emission efficiency of the backlight, the transmittance of the color filter layer, and the relative luminance of the liquid crystal display device in comparative example 1a. In Table 1, the "aperture area size" of each sub pixel represents the ratio of the aperture area size of each sub pixel. The "luminance ratio" represents the ratio of the luminance obtained when the gray scale level of each sub pixel is maximum with respect to the luminance obtained when the gray scale level of all the sub pixels is maximum. The luminance ratio is represented to the first decimal point as a result of the second decimal point being rounded off. The "light emission efficiency" represents the ratio of the output luminance with respect to the unit power consumption of the backlight, and is normalized such that the light emission efficiency of the liquid crystal display device in comparative example 1a is 100%. The "transmittance" represents the transmittance of the color filter layer per pixel obtained when the backlight and the color filter layer are combined. The transmittance is provided with no consideration of the light blocking area such as a black matrix. The "relative luminance" represents the relative luminance of white color in the liquid crystal display device. The relative luminance corresponds to the logical product of the light emission efficiency and the transmittance, and is normalized such that the relative luminance of the liquid crystal display device in comparative example 1a is 100%.

TABLE 1

|   | Aperture area size | x, y | Luminance ratio | Light emission efficiency | Transmittance | Relative luminance |
|---|---|---|---|---|---|---|
| R | 1.0 | 0.666, 0.323 | 8.4 | | | |
| G | 1.0 | 0.261, 0.649 | 23.1 | | | |
| B | 1.0 | 0.146, 0.057 | 4.5 | 100.0% | 35.8% | 100.0% |
| C1 | 1.0 | 0.166, 0.164 | 20.2 | | | |
| Ye | 1.0 | 0.466, 0.524 | 44.2 | | | |

As described above, in the liquid crystal display device in comparative example 1a, each pixel includes five sub pixels. Therefore, as compared with a three primary color liquid crystal display device having an equal pixel size to the liquid crystal display device in comparative example 1a, the area size of one sub pixel in the liquid crystal display device in comparative example 1a is relatively small. In the liquid crystal display device in comparative example 1a, the aperture area size of each sub pixel is decreased. Especially the luminance ratio of the red sub pixel is relatively low, and the reproduceable lightness of red is decreased. Thus, a part of colors of an object cannot be represented.

Table 2 shows the aperture area size, the chromaticity and the luminance ratio of each of the red (R), green (G), blue (B), cyan (C1) and yellow (Ye) sub pixels, the light emission efficiency of the backlight, the transmittance of the color filter layer, and the relative luminance of the liquid crystal display device in comparative example 2a.

TABLE 2

|   | Aperture area size | x, y | Luminance ratio | Light emission efficiency | Transmittance | Relative luminance |
|---|---|---|---|---|---|---|
| R | 1.8 | 0.670, 0.323 | 11.4 | | | |
| G | 1.0 | 0.257, 0.654 | 22.9 | | | |
| B | 1.0 | 0.145, 0.056 | 4.4 | 104.8% | 32.7% | 95.9% |
| C1 | 1.0 | 0.164, 0.163 | 20.1 | | | |
| Ye | 1.0 | 0.444, 0.546 | 41.2 | | | |

In the liquid crystal display device in comparative example 2a, the aperture area size of the red sub pixel is increased, and the luminance ratio thereof is raised. Thus, red, which has a high lightness, can be fully reproduced. In the liquid crystal display device in comparative example 2a, as compared with the liquid crystal display device in comparative example 1a, the aperture area size of the red sub pixel is increased, and thus the light emission efficiency of the backlight is improved as described above. In the liquid crystal display device in comparative example 2a, as compared with the liquid crystal display device in comparative example 1a, the aperture area size of the red sub pixel is increased, and the transmittance of the color filter layer is decreased. In this case, the decrease component of luminance caused by the decrease of the transmittance of the color filter layer is larger than the increase component of luminance caused by the improvement of the light emission efficiency of the backlight. As a result, the relative luminance is decreased. Therefore, in the liquid crystal display device in comparative example 2a, red, which has a high lightness, can be reproduced but a high luminance cannot be efficiently realized.

Table 3 shows the aperture area size, the chromaticity and the luminance ratio of each of the red (R), green (G), blue (B), cyan (C1) and yellow (Ye) sub pixels, the light emission efficiency of the backlight, the transmittance of the color filter layer, and the relative luminance of the liquid crystal display device in comparative example 3a.

TABLE 3

|   | Aperture area size | x, y | Luminance ratio | Light emission efficiency | Transmittance | Relative luminance |
|---|---|---|---|---|---|---|
| R | 1.8 | 0.671, 0.324 | 11.3 | | | |
| G | 1.0 | 0.263, 0.658 | 22.4 | | | |
| B | 1.8 | 0.144, 0.061 | 6.5 | 114.0% | 29.8% | 94.9% |
| C1 | 1.0 | 0.170, 0.192 | 18.7 | | | |
| Ye | 1.0 | 0.445, 0.546 | 41.1 | | | |

In the liquid crystal display device in comparative example 3a also, the aperture area size of the red sub pixel is increased, and the luminance ratio thereof is raised. Thus, red, which has a high lightness, can be fully reproduced. In the liquid crystal display device in comparative example 3a, as compared with the liquid crystal display device in comparative example 1a, the aperture area size of each of the red and blue sub pixels is increased, and thus the light emission efficiency of the backlight is improved as described above. In the liquid crystal display device in comparative example 3a, as compared with the liquid crystal display device in comparative example 1a, the aperture area size of each of the red and blue sub pixels is increased, and the transmittance of the color filter layer is decreased. In this case, the decrease component of luminance caused by the decrease of the transmittance of the color filter layer is larger than the increase component of luminance caused by the improvement of the light emission efficiency of the backlight. As a result, the relative luminance is decreased. Therefore, in the liquid crystal display device in comparative example 3a, red, which has a high lightness, can be reproduced but a high luminance cannot be efficiently realized.

Table 4 shows the aperture area size, the chromaticity and the luminance ratio of each of the red (R), green (G), blue (B), cyan (C1) and yellow (Ye) sub pixels, the light emission efficiency of the backlight, the transmittance of the color filter layer, and the relative luminance of the liquid crystal display device in example 1a.

TABLE 4

|    | Aperture area size | x, y            | Luminance ratio | Light emission efficiency | Transmittance | Relative luminance |
|----|--------------------|-----------------|-----------------|---------------------------|---------------|--------------------|
| R  | 1.8                | 0.672, 0.324    | 11.3            |                           |               |                    |
| G  | 1.0                | 0.263, 0.656    | 19.4            |                           |               |                    |
| B  | 1.0                | 0.145, 0.059    | 3.2             | 108.4%                    | 33.3%         | 100.9%             |
| C1 | 1.8                | 0.169, 0.184    | 29.4            |                           |               |                    |
| Ye | 1.0                | 0.457, 0.535    | 36.6            |                           |               |                    |

In the liquid crystal display device in example 1a, as compared with the liquid crystal display device in comparative example 1a, the aperture area size of the red sub pixel is increased, and luminance ratio thereof is raised. Thus, red, which has a high lightness, can be fully reproduced.

In the liquid crystal display device in example 1a, as compared with the liquid crystal display device in comparative example 2a, the aperture area size of the cyan sub pixel is increased. The chromaticity of the cyan sub pixel is relatively close to the chromaticity of the blue sub pixel, and the main wavelength of the cyan sub pixel is relatively short. Therefore, in the liquid crystal display device in example 1a, the light emission efficiency of the backlight is improved as compared with the liquid crystal display device in comparative example 2a. When the aperture area size of the cyan sub pixel is thus increased, the transmittance of the cyan color filter C1 per unit area size is relatively high and the color purity of the cyan sub pixel is relatively low. Thus, in the liquid crystal display device in example 1a, the transmittance of the color filter layer is increased as compared with the liquid crystal display device in comparative example 2a. Therefore, in the liquid crystal display device in example 1a, the relative luminance is increased as compared with the liquid crystal display device in comparative example 2a.

In the liquid crystal display device in example 1a, as compared with the liquid crystal display device in comparative example 3a, the aperture area size of the cyan sub pixel, instead of the blue sub pixel, is increased. When the aperture area size of the cyan sub pixel, instead of the blue sub pixel, is thus increased, in order to suppress the change of the color temperature, the amount of the blue component, which has a relatively low light emission efficiency among the color components of the light emitted from the backlight, needs to be increased, and the amount of the green component, which has a relatively high light emission efficiency, needs to be decreased. Therefore, in the liquid crystal display device in example 1a, the light emission efficiency of the backlight is decreased. Since the transmittance of the cyan color filter C1 per unit area size is higher than that of the blue color filter, the transmittance of the color filter layer is increased in the liquid crystal display device in example 1a. In this case, the increase component of luminance caused by the increase of the transmittance of the color filter layer is larger than the decrease component of luminance caused by the decrease of the light emission efficiency of the backlight. As a result, the relative luminance is increased.

As understood from the comparison among Tables 2, 3 and 4, in the liquid crystal display device in comparative example 3a, as compared with the liquid crystal display device in comparative example 2a, the decrease component of luminance caused by the decrease of the transmittance of the color filter layer is larger than the increase component of luminance caused by the improvement of the light emission efficiency of the backlight. Thus, the relative luminance is not improved. By contrast, in the liquid crystal display device in example 1a, as compared with the liquid crystal display device in comparative example 2a, the light emission efficiency of the backlight is improved and also the transmittance of the color filter layer is increased. As a result, the relative luminance is increased.

Table 5 shows the aperture area size, the chromaticity and the luminance ratio of each of the red (R), green (G), blue (B), cyan (C1) and yellow (Ye) sub pixels, the light emission efficiency of the backlight, the transmittance of the color filter layer, and the relative luminance of the liquid crystal display device in example 2a.

TABLE 5

|    | Aperture area size | x, y            | Luminance ratio | Light emission efficiency | Transmittance | Relative luminance |
|----|--------------------|-----------------|-----------------|---------------------------|---------------|--------------------|
| R  | 2.0                | 0.671, 0.324    | 11.9            |                           |               |                    |
| G  | 1.0                | 0.263, 0.657    | 19.4            |                           |               |                    |
| B  | 1.0                | 0.145, 0.060    | 3.2             | 109.5%                    | 32.8%         | 100.2%             |
| C1 | 1.8                | 0.169, 0.184    | 29.4            |                           |               |                    |
| Ye | 1.0                | 0.453, 0.539    | 36.1            |                           |               |                    |

In the liquid crystal display device in example 2a, as compared with the liquid crystal display device in example 1a, the aperture area size of the red sub pixel is further increased, the luminance ratio thereof is further raised, and the display quality of red is further improved. In the liquid crystal display device in example 2a, as compared with the liquid crystal display device in example 1a, the aperture area size of the red sub pixel is increased, the light emission efficiency of the backlight is improved, and the transmittance of the color filter layer is decreased. In this case, the decrease component of luminance caused by the decrease of the transmittance of the color filter layer is larger than the increase component of luminance caused by the improvement of the light emission efficiency of the backlight. As a result, the relative luminance is decreased.

Table 6 shows the aperture area size, the chromaticity and the luminance ratio of each of the red (R), green (G), blue (B), cyan (C1) and yellow (Ye) sub pixels, the light emission efficiency of the backlight, the transmittance of the color filter layer, and the relative luminance of the liquid crystal display device in example 3a.

TABLE 6

| | Aperture area size | x, y | Luminance ratio | Light emission efficiency | Transmittance | Relative luminance |
|---|---|---|---|---|---|---|
| R | 1.8 | 0.672, 0.324 | 11.3 | | | |
| G | 1.0 | 0.265, 0.657 | 18.7 | | | |
| B | 1.0 | 0.145, 0.060 | 3.0 | 108.7% | 33.4% | 101.3% |
| C1 | 2.0 | 0.170, 0.188 | 31.3 | | | |
| Ye | 1.0 | 0.460, 0.532 | 35.7 | | | |

In the liquid crystal display device in example 3a, as compared with the liquid crystal display device in example 1a, the aperture area size of the cyan sub pixel is increased. As described above, the main wavelength of the cyan sub pixel using the cyan color filter C1 is relatively short. Thus, the light emission efficiency of the backlight is improved. When the aperture area size of the cyan sub pixel is thus increased, the transmittance of the cyan color filter C1 per unit area size is relatively high and the color purity of the cyan sub pixel is relatively low. Thus, in the liquid crystal display device in example 3a, the transmittance of the color filter layer is increased as compared with the liquid crystal display device in example 1a. Therefore, in the liquid crystal display device in example 3a, the relative luminance is increased as compared with the liquid crystal display device in example 1a.

Table 7 shows the aperture area size, the chromaticity and the luminance ratio of each of the red (R), green (G), blue (B), cyan (C1) and yellow (Ye) sub pixels, the light emission efficiency of the backlight, the transmittance of the color filter layer, and the relative luminance of the liquid crystal display device in example 4a.

TABLE 7

| | Aperture area size | x, y | Luminance ratio | Light emission efficiency | Transmittance | Relative luminance |
|---|---|---|---|---|---|---|
| R | 1.8 | 0.671, 0.324 | 11.4 | | | |
| G | 1.0 | 0.262, 0.655 | 19.5 | | | |
| B | 0.8 | 0.145, 0.058 | 2.7 | 106.6% | 34.1% | 101.7% |
| C1 | 1.8 | 0.168, 0.178 | 29.8 | | | |
| Ye | 1.0 | 0.457, 0.534 | 36.6 | | | |

In the liquid crystal display device in example 4a, as compared with the liquid crystal display device in example 1a, the aperture area size of the blue sub pixel is decreased, and the light emission efficiency of the backlight is decreased. The transmittance of the blue color filter per unit area size is lowest, and thus the transmittance of the color filter layer is increased in the liquid crystal display device in example 4a. In this case, the increase component of luminance caused by the increase of the transmittance of the color filter layer is larger than the decrease component of luminance caused by the decrease of the light emission efficiency of the backlight. As a result, the relative luminance is increased.

Table 8 shows the aperture area size, the chromaticity and the luminance ratio of each of the red (R), green (G), blue (B), cyan (C1) and yellow (Ye) sub pixels, the light emission efficiency of the backlight, the transmittance of the color filter layer, and the relative luminance of the liquid crystal display device in example 5a.

TABLE 8

| | Aperture area size | x, y | Luminance ratio | Light emission efficiency | Transmittance | Relative luminance |
|---|---|---|---|---|---|---|
| R | 1.8 | 0.672, 0.324 | 11.4 | | | |
| G | 1.0 | 0.265, 0.657 | 19.3 | | | |
| B | 1.2 | 0.145, 0.061 | 3.7 | 109.8% | 32.5% | 99.9% |
| C1 | 1.8 | 0.170, 0.190 | 29.0 | | | |
| Ye | 1.0 | 0.458, 0.534 | 36.6 | | | |

In the liquid crystal display device in example 5a, as compared with the liquid crystal display device in example 1a, the aperture area size of the blue sub pixel is increased. Thus, in the liquid crystal display device in example 5a, the light emission efficiency of the backlight is improved as compared with the liquid crystal display device in example 1a as described above. In the liquid crystal display device in example 5a, as compared with the liquid crystal display device in example 1a, the aperture area size of the blue sub pixel is increased, and the transmittance of the color filter layer is decreased. In this case, the decrease component of luminance caused by the decrease of the transmittance of the color filter layer is larger than the increase component of luminance caused by the improvement of the light emission efficiency of the backlight. As a result, the relative luminance is decreased. In the liquid crystal display devices in examples 2a through 5a, as compared with the liquid crystal display devices in comparative examples 2a and 3a, the light emission efficiency of the backlight and the transmittance of the color filter layer are both maintained higher, and thus the relative luminance is higher.

As the cyan color filter, the color filter C2 shown in FIG. 9(a) may be used. Hereinafter, with reference to Tables 9 through 16, liquid crystal display devices in comparative examples 1b through 3b and liquid crystal display devices in examples 1b through 5b using the color filter C2 as the cyan color filter will be described.

Table 9 shows the aperture area size, the chromaticity and the luminance ratio of each of the red (R), green (G), blue (B), cyan (C2) and yellow (Ye) sub pixels, the light emission efficiency of the backlight, the transmittance of the color filter layer, and the relative luminance of the liquid crystal display device in comparative example 1b.

TABLE 9

| | Aperture area size | x, y | Luminance ratio | Light emission efficiency | Transmittance | Relative luminance |
|---|---|---|---|---|---|---|
| R | 1.0 | 0.666, 0.323 | 8.6 | | | |
| G | 1.0 | 0.261, 0.651 | 25.9 | | | |
| B | 1.0 | 0.145, 0.058 | 4.8 | 100.0% | 32.6% | 100.0% |

TABLE 9-continued

| | Aperture area size | x, y | Luminance ratio | Light emission efficiency | Transmittance | Relative luminance |
|---|---|---|---|---|---|---|
| C2 | 1.0 | 0.149, 0.116 | 12.5 | | | |
| Ye | 1.0 | 0.458, 0.532 | 48.6 | | | |

In the liquid crystal display device in comparative example 1b, as compared with a three primary color liquid crystal display device, the area size of each sub pixel is decreased. Thus, the luminance ratio of the red sub pixel is relatively low, and red, which has a high lightness, cannot be fully reproduced.

Table 10 shows the aperture area size, the chromaticity and the luminance ratio of each of the red (R), green (G), blue (B), cyan (C2) and yellow (Ye) sub pixels, the light emission efficiency of the backlight, the transmittance of the color filter layer, and the relative luminance of the liquid crystal display device in comparative example 2b.

TABLE 10

| | Aperture area size | x, y | Luminance ratio | Light emission efficiency | Transmittance | Relative luminance |
|---|---|---|---|---|---|---|
| R | 1.8 | 0.670, 0.323 | 11.5 | | | |
| G | 1.0 | 0.257, 0.656 | 25.7 | | | |
| B | 1.0 | 0.144, 0.057 | 4.7 | 104.9% | 29.7% | 95.7% |
| C2 | 1.0 | 0.148, 0.116 | 12.5 | | | |
| Ye | 1.0 | 0.436, 0.554 | 45.5 | | | |

In the liquid crystal display device in comparative example 2b, as the aperture area size of the red sub pixel is increased, the luminance ratio thereof is raised. Thus, red, which has a high lightness, can be fully reproduced. In the liquid crystal display device in comparative example 2b, as compared with the liquid crystal display device in comparative example 1b, the light emission efficiency of the backlight is improved, and the transmittance of the color filter layer is decreased. In this case, the decrease component of luminance caused by the decrease of the transmittance of the color filter layer is larger than the increase component of luminance caused by the improvement of the light emission efficiency of the backlight. As a result, the relative luminance is decreased. Therefore, in the liquid crystal display device in comparative example 2a, red, which has a high lightness, can be reproduced but a high luminance cannot be efficiently realized.

Table 11 shows the aperture area size, the chromaticity and the luminance ratio of each of the red (R), green (G), blue (B), cyan (C2) and yellow (Ye) sub pixels, the light emission efficiency of the backlight, the transmittance of the color filter layer, and the relative luminance of the liquid crystal display device in comparative example 3b.

TABLE 11

| | Aperture area size | x, y | Luminance ratio | Light emission efficiency | Transmittance | Relative luminance |
|---|---|---|---|---|---|---|
| R | 1.8 | 0.671, 0.323 | 11.4 | | | |
| G | 1.0 | 0.263, 0.660 | 25.2 | | | |
| B | 1.8 | 0.144, 0.063 | 7.0 | 114.7% | 27.1% | 95.2% |
| C2 | 1.0 | 0.150, 0.136 | 11.1 | | | |
| Ye | 1.0 | 0.437, 0.554 | 45.3 | | | |

In the liquid crystal display device in comparative example 3b also, the aperture area size of the red sub pixel is increased, and the luminance ratio thereof is raised. Thus, red, which has a high lightness, can be fully reproduced. In the liquid crystal display device in comparative example 3b, as compared with the liquid crystal display device in comparative example 1b, the aperture area size of each of the red and blue sub pixels is increased, the light emission efficiency of the backlight is improved, and the transmittance of the color filter layer is decreased as described above. In this case, the decrease component of luminance caused by the decrease of the transmittance of the color filter layer is larger than the increase component of luminance caused by the improvement of the light emission efficiency of the backlight. As a result, the relative luminance is decreased. Therefore, in the liquid crystal display device in comparative example 3b, red, which has a high lightness, can be reproduced but a high luminance cannot be efficiently realized.

Table 12 shows the aperture area size, the chromaticity and the luminance ratio of each of the red (R), green (G), blue (B), cyan (C2) and yellow (Ye) sub pixels, the light emission efficiency of the backlight, the transmittance of the color filter layer, and the relative luminance of the liquid crystal display device in example 1b.

TABLE 12

| | Aperture area size | x, y | Luminance ratio | Light emission efficiency | Transmittance | Relative luminance |
|---|---|---|---|---|---|---|
| R | 1.8 | 0.671, 0.324 | 11.7 | | | |
| G | 1.0 | 0.264, 0.659 | 23.3 | | | |
| B | 1.0 | 0.144, 0.062 | 3.6 | 111.6% | 28.7% | 98.2% |
| C2 | 1.8 | 0.150, 0.134 | 18.7 | | | |
| Ye | 1.0 | 0.445, 0.547 | 42.7 | | | |

In the liquid crystal display device in example 1b, as compared with the liquid crystal display device in comparative example 1b, the aperture area size of the red sub pixel is increased, and thus red, which has a high lightness, can be reproduced. In the liquid crystal display device in example 1b, as compared with the liquid crystal display device in comparative example 2b, the aperture area size of the cyan sub pixel is increased. The chromaticity of the cyan sub pixel is relatively close to the chromaticity of the blue sub pixel, and the main wavelength of the cyan sub pixel is relatively short. Therefore, in the liquid crystal display device in example 1b, the light emission efficiency of the backlight is improved as compared with the liquid crystal display device in comparative example 2b. The transmittance of the cyan color filter C2 per unit area size is relatively low but not as low as that of the cyan color filter C1. Thus, in the liquid crystal display device in example 1b, the transmittance of the color filter layer is decreased as compared with the liquid crystal display device in comparative example 2b. In this case, the increase component of luminance caused by the improvement of the light emission efficiency of the backlight is larger than the decrease component of luminance caused by the decrease of the transmittance of the color filter layer. As a result, the relative luminance is increased.

In the liquid crystal display device in example 1b, as compared with the liquid crystal display device in comparative example 3b, the aperture area size of the cyan sub pixel, instead of the blue sub pixel, is increased, the light emission efficiency of the backlight is decreased, and the transmittance of the color filter layer is increased. In this case, the increase component of luminance caused by the increase of the transmittance of the color filter layer is larger than the decrease component of luminance caused by the decrease of the light emission efficiency of the backlight. As a result, the relative luminance is increased.

As understood from the comparison among Tables 10, 11 and 12, in the liquid crystal display device in comparative example 3b, as compared with the liquid crystal display device in comparative example 2b, the light emission efficiency of the backlight is improved, and the transmittance of the color filter layer is decreased. In this case, the increase component of luminance caused by the improvement of the light emission efficiency of the backlight generally countervails against the decrease component of luminance caused by the decrease of the transmittance of the color filter layer. Thus, the relative luminance is not improved. By contrast, in the liquid crystal display device in example 1b, as compared with the liquid crystal display device in comparative example 2b, the increase component of luminance caused by the improvement of the light emission efficiency of the backlight is larger than the decrease component of luminance caused by the decrease of the transmittance of the color filter layer. As a result, the relative luminance is increased.

Table 13 shows the aperture area size, the chromaticity and the luminance ratio of each of the red (R), green (G), blue (B), cyan (C2) and yellow (Ye) sub pixels, the light emission efficiency of the backlight, the transmittance of the color filter layer, and the relative luminance of the liquid crystal display device in example 2b.

TABLE 13

|    | Aperture area size | x, y          | Luminance ratio | Light emission efficiency | Transmittance | Relative luminance |
|----|--------------------|---------------|-----------------|---------------------------|---------------|--------------------|
| R  | 2.0                | 0.671, 0.324  | 12.3            |                           |               |                    |
| G  | 1.0                | 0.263, 0.659  | 23.3            |                           |               |                    |
| B  | 1.0                | 0.144, 0.062  | 3.6             | 112.8%                    | 28.2%         | 97.4%              |
| C2 | 1.8                | 0.149, 0.134  | 18.7            |                           |               |                    |
| Ye | 1.0                | 0.440, 0.551  | 42.2            |                           |               |                    |

In the liquid crystal display device in example 2b, the aperture area size of the red sub pixel is further increased. Thus, the luminance ratio of the red sub pixel is further raised, and the display quality of red is further improved. In the liquid crystal display device in example 2b, as compared with the liquid crystal display device in example 1b, the light emission efficiency of the backlight is improved, and the transmittance of the color filter layer is decreased. In this case, the decrease component of luminance caused by the decrease of the transmittance of the color filter layer is larger than the increase component of luminance caused by the improvement of the light emission efficiency of the backlight. As a result, the relative luminance is decreased.

Table 14 shows the aperture area size, the chromaticity and the luminance ratio of each of the red (R), green (G), blue (B), cyan (C2) and yellow (Ye) sub pixels, the light emission efficiency of the backlight, the transmittance of the color filter layer, and the relative luminance of the liquid crystal display device in example 3b.

TABLE 14

|    | Aperture area size | x, y          | Luminance ratio | Light emission efficiency | Transmittance | Relative luminance |
|----|--------------------|---------------|-----------------|---------------------------|---------------|--------------------|
| R  | 1.8                | 0.672, 0.324  | 11.7            |                           |               |                    |
| G  | 1.0                | 0.265, 0.660  | 22.8            |                           |               |                    |
| B  | 1.0                | 0.144, 0.063  | 3.4             | 112.5%                    | 28.4%         | 98.0%              |
| C2 | 2.0                | 0.150, 0.138  | 20.0            |                           |               |                    |
| Ye | 1.0                | 0.447, 0.545  | 42.1            |                           |               |                    |

In the liquid crystal display device in example 3b, as compared with the liquid crystal display device in example 1b, the aperture area size of the cyan sub pixel is increased. Thus, the light emission efficiency of the backlight is improved, and the transmittance of the color filter layer is decreased. In this case, the decrease component of luminance caused by the decrease of the transmittance of the color filter layer is larger than the increase component of luminance caused by the improvement of the light emission efficiency of the backlight. As a result, the relative luminance is slightly decreased.

Table 15 shows the aperture area size, the chromaticity and the luminance ratio of each of the red (R), green (G), blue (B), cyan (C2) and yellow (Ye) sub pixels, the light emission efficiency of the backlight, the transmittance of the color filter layer, and the relative luminance of the liquid crystal display device in example 4b.

TABLE 15

|    | Aperture area size | x, y          | Luminance ratio | Light emission efficiency | Transmittance | Relative luminance |
|----|--------------------|---------------|-----------------|---------------------------|---------------|--------------------|
| R  | 1.8                | 0.671, 0.324  | 11.7            |                           |               |                    |
| G  | 1.0                | 0.263, 0.658  | 23.4            |                           |               |                    |
| B  | 0.8                | 0.144, 0.061  | 3.0             | 109.5%                    | 29.4%         | 98.7%              |
| C2 | 1.8                | 0.149, 0.129  | 19.1            |                           |               |                    |
| Ye | 1.0                | 0.445, 0.547  | 42.8            |                           |               |                    |

In the liquid crystal display device in example 4b, as compared with the liquid crystal display device in example 1b, the aperture area size of the blue sub pixel is decreased, the light emission efficiency of the backlight is decreased, and the transmittance of the color filter layer is increased. In this case, the increase component of luminance caused by the increase of the transmittance of the color filter layer is larger than the decrease component of luminance caused by the decrease of the light emission efficiency of the backlight. As a result, the relative luminance is slightly increased.

Table 16 shows the aperture area size, the chromaticity and the luminance ratio of each of the red (R), green (G), blue (B), cyan (C2) and yellow (Ye) sub pixels, the light emission efficiency of the backlight, the transmittance of the color filter layer, and the relative luminance of the liquid crystal display device in example 5b.

TABLE 16

| | Aperture area size | x, y | Luminance ratio | Light emission efficiency | Transmittance | Relative luminance |
|---|---|---|---|---|---|---|
| R | 1.8 | 0.672, 0.324 | 11.7 | | | |
| G | 1.0 | 0.265, 0.660 | 23.2 | | | |
| B | 1.2 | 0.144, 0.064 | 4.2 | 113.1% | 28.0% | 97.2% |
| C2 | 1.8 | 0.150, 0.138 | 18.3 | | | |
| Ye | 1.0 | 0.445, 0.547 | 42.7 | | | |

In the liquid crystal display device in example 5b, as compared with the liquid crystal display device in example 1b, the aperture area size of the blue sub pixel is increased, the light emission efficiency of the backlight is improved, and the transmittance of the color filter layer is decreased. In this case, the decrease component of luminance caused by the decrease of the transmittance of the color filter layer is larger than the increase component of luminance caused by the improvement of the light emission efficiency of the backlight. As a result, the relative luminance is decreased. In the liquid crystal display devices in examples 2b through 5b described above, as compared with the liquid crystal display devices in comparative examples 2b and 3b, the light emission efficiency of the backlight and the transmittance of the color filter layer are both maintained higher, and thus the relative luminance is higher.

As the cyan color filter, the color filter C3 shown in FIG. 9(a) may be used. Hereinafter, with reference to Tables 17 through 24, liquid crystal display devices in comparative examples 1c through 3c and liquid crystal display devices in examples 1c through 5c using the color filter C3 as the cyan color filter will be described.

Tables 17 through 19 show the aperture area size, the chromaticity and the luminance ratio of each of the red (R), green (G), blue (B), cyan (C3) and yellow (Ye) sub pixels, the light emission efficiency of the backlight, the transmittance of the color filter layer, and the relative luminance of the liquid crystal display devices in comparative examples 1c through 3c, respectively.

TABLE 17

| | Aperture area size | x, y | Luminance ratio | Light emission efficiency | Transmittance | Relative luminance |
|---|---|---|---|---|---|---|
| R | 1.0 | 0.671, 0.324 | 8.6 | | | |
| G | 1.0 | 0.253, 0.644 | 21.3 | | | |
| B | 1.0 | 0.145, 0.051 | 5.0 | 100.0% | 37.0% | 100.0% |
| C3 | 1.0 | 0.171, 0.218 | 23.7 | | | |
| Ye | 1.0 | 0.477, 0.514 | 41.4 | | | |

TABLE 18

| | Aperture area size | x, y | Luminance ratio | Light emission efficiency | Transmittance | Relative luminance |
|---|---|---|---|---|---|---|
| R | 1.8 | 0.669, 0.323 | 11.8 | | | |
| G | 1.0 | 0.250, 0.646 | 21.2 | | | |
| B | 1.0 | 0.145, 0.052 | 5.1 | 103.8% | 34.0% | 95.3% |
| C3 | 1.0 | 0.169, 0.218 | 23.6 | | | |
| Ye | 1.0 | 0.454, 0.536 | 38.3 | | | |

TABLE 19

| | Aperture area size | x, y | Luminance ratio | Light emission efficiency | Transmittance | Relative luminance |
|---|---|---|---|---|---|---|
| R | 1.8 | 0.671, 0.323 | 11.5 | | | |
| G | 1.0 | 0.259, 0.654 | 20.9 | | | |
| B | 1.8 | 0.145, 0.057 | 7.0 | 117.2% | 31.2% | 98.8% |
| C3 | 1.0 | 0.179, 0.263 | 22.1 | | | |
| Ye | 1.0 | 0.453, 0.539 | 38.5 | | | |

In the liquid crystal display device in comparative example 2c, as compared with the liquid crystal display device in comparative example 1c, the aperture area size of the red sub pixel is increased, the light emission efficiency of the backlight is improved, and the transmittance of the color filter layer is decreased. In this case, the decrease component of luminance caused by the decrease of the transmittance of the color filter layer is larger than the increase component of luminance caused by the improvement of the light emission efficiency of the backlight. As a result, the relative luminance is decreased. Therefore, in the liquid crystal display device in comparative example 2c, red, which has a high lightness, can be reproduced but a high luminance cannot be efficiently realized.

In the liquid crystal display device in comparative example 3c, the aperture area size of each of the red and blue sub pixels is increased, the light emission efficiency of the backlight is improved, and the transmittance of the color filter layer is decreased. In this case, the decrease component of luminance caused by the decrease of the transmittance of the color filter layer is larger than the increase component of luminance caused by the improvement of the light emission efficiency of the backlight. As a result, the relative luminance is decreased. Therefore, in the liquid crystal display device in comparative example 3c, like in the liquid crystal display device in comparative example 2c, red, which has a high lightness, can be reproduced but a high luminance cannot be efficiently realized.

Table 20 shows the aperture area size, the chromaticity and the luminance ratio of each of the red (R), green (G), blue (B), cyan (C3) and yellow (Ye) sub pixels, the light emission efficiency of the backlight, the transmittance of the color filter layer, and the relative luminance of the liquid crystal display device in example 1c.

TABLE 20

| | Aperture area size | x, y | Luminance ratio | Light emission efficiency | Transmittance | Relative luminance |
|---|---|---|---|---|---|---|
| R | 1.8 | 0.671, 0.324 | 11.9 | | | |
| G | 1.0 | 0.255, 0.647 | 17.2 | | | |
| B | 1.0 | 0.145, 0.053 | 3.8 | 104.2% | 35.4% | 99.7% |
| C3 | 1.8 | 0.174, 0.230 | 34.0 | | | |
| Ye | 1.0 | 0.472, 0.520 | 33.1 | | | |

In the liquid crystal display device in example 1c, as compared with the liquid crystal display device in comparative example 1c, the aperture area size of the red sub pixel is increased, and the luminance ratio thereof is raised. Thus, red, which has a high lightness, can be fully reproduced.

In the liquid crystal display device in example 1c, as compared with the liquid crystal display device in comparative example 2c, the aperture area size of the cyan sub pixel is increased. The chromaticity of the cyan sub pixel is relatively close to the chromaticity of the blue sub pixel, and the main wavelength of the cyan sub pixel is relatively short. Therefore, in the liquid crystal display device in example 1c, the light emission efficiency of the backlight is improved as compared with the liquid crystal display device in comparative example 2c. When the aperture area size of the cyan sub pixel is thus increased, the transmittance of the cyan color filter C3 per unit area size is relatively high and the color purity of the cyan sub pixel is relatively low. Thus, in the liquid crystal display device in example 1c, the transmittance of the color filter layer is increased as compared with the liquid crystal display device in comparative example 2c. Therefore, in the liquid crystal display device in example 1c, the relative luminance is increased as compared with the liquid crystal display device in comparative example 2c.

In the liquid crystal display device in example 1c, as compared with the liquid crystal display device in comparative example 3c, the aperture area size of the cyan sub pixel, instead of the blue sub pixel, is increased, the light emission efficiency of the backlight is decreased, and the transmittance of the color filter layer is increased. In this case, the increase component of luminance caused by the increase of the transmittance of the color filter layer is larger than the decrease component of luminance caused by the decrease of the light emission efficiency of the backlight. As a result, the relative luminance is increased.

As understood from the comparison among Tables 18 through 20, in the liquid crystal display device in comparative example 3c, as compared with the liquid crystal display device in comparative example 2c, the light emission efficiency of the backlight is improved, and the transmittance of the color filter layer is decreased. In this case, the decrease component of luminance caused by the decrease of the transmittance of the color filter layer is relatively large. Thus, the relative luminance is not increased much. By contrast, in the liquid crystal display device in example 1c, as compared with the liquid crystal display device in comparative example 2c, the aperture area size of the cyan sub pixel is increased. Thus, although the degree of improvement of the light emission efficiency of the backlight is relatively small, the transmittance of the color filter layer is increased. Therefore, the relative luminance of the liquid crystal display device in example 1c is increased.

Tables 21 through 24 show the aperture area size, the chromaticity and the luminance ratio of each of the red (R), green (G), blue (B), cyan (C3) and yellow (Ye) sub pixels, the light emission efficiency of the backlight, the transmittance of the color filter layer, and the relative luminance of the liquid crystal display devices in examples 2c through 5c, respectively.

TABLE 21

| | Aperture area size | x, y | Luminance ratio | Light emission efficiency | Transmittance | Relative luminance |
|---|---|---|---|---|---|---|
| R | 2.0 | 0.670, 0.323 | 12.4 | | | |
| G | 1.0 | 0.255, 0.648 | 17.2 | | | |
| B | 1.0 | 0.145, 0.053 | 3.8 | 105.0% | 34.9% | 98.9% |
| C3 | 1.8 | 0.173, 0.230 | 34.0 | | | |
| Ye | 1.0 | 0.467, 0.524 | 32.6 | | | |

TABLE 22

| | Aperture area size | x, y | Luminance ratio | Light emission efficiency | Transmittance | Relative luminance |
|---|---|---|---|---|---|---|
| R | 1.8 | 0.671, 0.324 | 11.8 | | | |
| G | 1.0 | 0.257, 0.647 | 16.5 | | | |
| B | 1.0 | 0.145, 0.053 | 3.6 | 104.2% | 35.7% | 100.3% |
| C3 | 2.0 | 0.175, 0.232 | 36.0 | | | |
| Ye | 1.0 | 0.475, 0.516 | 32.1 | | | |

TABLE 23

| | Aperture area size | x, y | Luminance ratio | Light emission efficiency | Transmittance | Relative luminance |
|---|---|---|---|---|---|---|
| R | 1.8 | 0.670, 0.323 | 11.9 | | | |
| G | 1.0 | 0.253, 0.645 | 17.2 | | | |
| B | 0.8 | 0.145, 0.052 | 3.2 | 101.3% | 36.2% | 98.9% |
| C3 | 1.8 | 0.171, 0.220 | 34.5 | | | |
| Ye | 1.0 | 0.472, 0.519 | 33.1 | | | |

TABLE 24

| | Aperture area size | x, y | Luminance ratio | Light emission efficiency | Transmittance | Relative luminance |
|---|---|---|---|---|---|---|
| R | 1.8 | 0.671, 0.324 | 11.8 | | | |
| G | 1.0 | 0.257, 0.649 | 17.2 | | | |
| B | 1.2 | 0.145, 0.054 | 4.3 | 106.7% | 34.7% | 100.0% |

TABLE 24-continued

|    | Aperture area size | x, y           | Luminance ratio | Light emission efficiency | Transmittance | Relative luminance |
|----|--------------------|----------------|-----------------|---------------------------|---------------|--------------------|
| C3 | 1.8                | 0.176, 0.239   | 33.5            |                           |               |                    |
| Ye | 1.0                | 0.471, 0.520   | 33.2            |                           |               |                    |

In the liquid crystal display device in example 2c, as compared with the liquid crystal display device in example 1c, the aperture area size of the red sub pixel is further increased, the light emission efficiency of the backlight is improved, and the transmittance of the color filter layer is decreased. In this case, the increase component of luminance caused by the improvement of the light emission efficiency of the backlight is slightly smaller than the decrease component of luminance caused by the decrease of the transmittance of the color filter layer. As a result, the relative luminance is slightly lower than that in the liquid crystal display device in example 1c.

In the liquid crystal display device in example 3c, as compared with the liquid crystal display device in example 1c, the aperture area size of the cyan sub pixel is further increased. Thus, although the light emission efficiency of the backlight is generally equal to that in the liquid crystal display device in example 1c, the transmittance of the color filter layer is increased. As a result, the relative luminance is increased.

In the liquid crystal display device in example 4c, as compared with the liquid crystal display device in example 1c, the aperture area size of the blue sub pixel is decreased, the light emission efficiency of the backlight is decreased, and the transmittance of the color filter layer is increased. In this case, the decrease component of luminance caused by the decrease of the light emission efficiency of the backlight is larger than the increase component of luminance caused by the increase of the transmittance of the color filter layer. As a result, the relative luminance is slightly decreased.

In the liquid crystal display device in example 5c, as compared with the liquid crystal display device in example 1c, the aperture area size of the blue sub pixel is increased, the light emission efficiency of the backlight is improved, and the transmittance of the color filter layer is decreased. In this case, the increase component of luminance caused by the improvement of the light emission efficiency of the backlight is larger than the decrease component of luminance caused by the decrease of the transmittance of the color filter layer. As a result, the relative luminance is increased. In the liquid crystal display devices in examples 2c through 5c, as compared with the liquid crystal display devices in comparative examples 2c and 3c, the light emission efficiency of the backlight and the transmittance of the color filter layer are both maintained higher, and thus the relative luminance is higher.

As the cyan color filter, the color filter C4 shown in FIG. 9(a) may be used. Hereinafter, with reference to Tables 25 through 32, liquid crystal display devices in comparative examples 1d through 3d and liquid crystal display devices in examples 1d through 5d using the color filter C4 as the cyan color filter will be described.

Tables 25 through 27 show the aperture area size, the chromaticity and the luminance ratio of each of the red (R), green (G), blue (B), cyan (C4) and yellow (Ye) sub pixels, the light emission efficiency of the backlight, the transmittance of the color filter layer, and the relative luminance of the liquid crystal display devices in comparative examples 1d through 3d, respectively.

TABLE 25

|    | Aperture area size | x, y           | Luminance ratio | Light emission efficiency | Transmittance | Relative luminance |
|----|--------------------|----------------|-----------------|---------------------------|---------------|--------------------|
| R  | 1.0                | 0.671, 0.324   | 8.1             |                           |               |                    |
| G  | 1.0                | 0.254, 0.645   | 20.3            |                           |               |                    |
| B  | 1.0                | 0.145, 0.052   | 4.7             | 100.0%                    | 39.1%         | 100.0%             |
| C4 | 1.0                | 0.189, 0.223   | 27.7            |                           |               |                    |
| Ye | 1.0                | 0.475, 0.516   | 39.3            |                           |               |                    |

TABLE 26

|    | Aperture area size | x, y           | Luminance ratio | Light emission efficiency | Transmittance | Relative luminance |
|----|--------------------|----------------|-----------------|---------------------------|---------------|--------------------|
| R  | 1.8                | 0.669, 0.323   | 11.2            |                           |               |                    |
| G  | 1.0                | 0.250, 0.647   | 20.2            |                           |               |                    |
| B  | 1.0                | 0.145, 0.052   | 4.7             | 103.7%                    | 35.8%         | 94.9%              |
| C4 | 1.0                | 0.184, 0.222   | 27.3            |                           |               |                    |
| Ye | 1.0                | 0.453, 0.537   | 36.6            |                           |               |                    |

TABLE 27

|    | Aperture area size | x, y           | Luminance ratio | Light emission efficiency | Transmittance | Relative luminance |
|----|--------------------|----------------|-----------------|---------------------------|---------------|--------------------|
| R  | 1.8                | 0.671, 0.323   | 11.0            |                           |               |                    |
| G  | 1.0                | 0.259, 0.654   | 19.9            |                           |               |                    |
| B  | 1.8                | 0.145, 0.057   | 6.7             | 115.7%                    | 32.8%         | 97.0%              |
| C4 | 1.0                | 0.197, 0.265   | 25.8            |                           |               |                    |
| Ye | 1.0                | 0.453, 0.538   | 36.7            |                           |               |                    |

In the liquid crystal display device in comparative example 2d, as compared with the liquid crystal display device in comparative example 1d, the aperture area size of the red sub pixel is increased. Thus, red, which has a high luminance ratio, can be reproduced. In the liquid crystal display device in comparative example 2d, as compared with the liquid crystal display device in comparative example 1d, the light emission efficiency of the backlight is improved, and the transmittance of the color filter layer is decreased. In this case, the decrease component of luminance caused by the decrease of the transmittance of the color filter layer is larger than the increase component of luminance caused by the improvement of the light emission efficiency of the backlight. As a result, the relative luminance is decreased. Therefore, in the liquid crystal display device in comparative example 2d, red, which has a high lightness, can be reproduced but a high luminance cannot be efficiently realized.

In the liquid crystal display device in comparative example 3d, as compared with the liquid crystal display device in comparative example 1d, the aperture area size of each of the red and blue sub pixels is increased, the light emission efficiency of the backlight is improved, and the transmittance of the color filter layer is decreased. In this case, the decrease component of luminance caused by the decrease of the transmittance of the color filter layer is larger than the increase component of luminance caused by the improvement of the light emission efficiency of the backlight. As a result, the relative luminance is decreased. Therefore, in the liquid crystal display device in comparative example 3d, like in the liquid crystal display device in comparative example 2d, red, which has a high lightness, can be reproduced but a high luminance cannot be efficiently realized.

Table 28 shows the aperture area size, the chromaticity and the luminance ratio of each of the red (R), green (G), blue (B), cyan (C4) and yellow (Ye) sub pixels, the light emission efficiency of the backlight, the transmittance of the color filter layer, and the relative luminance of the liquid crystal display device in example 1d.

TABLE 28

|    | Aperture area size | x, y | Luminance ratio | Light emission efficiency | Transmittance | Relative luminance |
|----|--------------------|------|-----------------|---------------------------|---------------|--------------------|
| R  | 1.8 | 0.671, 0.324 | 10.8 | | | |
| G  | 1.0 | 0.256, 0.648 | 16.1 | | | |
| B  | 1.0 | 0.145, 0.053 | 3.5 | 104.4% | 38.2% | 102.1% |
| C4 | 1.8 | 0.192, 0.236 | 38.9 | | | |
| Ye | 1.0 | 0.469, 0.522 | 30.8 | | | |

In the liquid crystal display device in example 1d, as compared with the liquid crystal display device in comparative example 1d, the aperture area size of the red sub pixel is increased. Thus, the luminance ratio of the red sub pixel is increased, and red, which has a high lightness, can be fully reproduced.

In the liquid crystal display device in example 1d, as compared with the liquid crystal display device in comparative example 2d, the aperture area size of the cyan sub pixel is increased. The chromaticity of the cyan sub pixel is relatively close to the chromaticity of the blue sub pixel, and the main wavelength of the cyan sub pixel is relatively short. Therefore, in the liquid crystal display device in example 1d, the light emission efficiency of the backlight is improved as compared with the liquid crystal display device in comparative example 2d. When the aperture area size of the cyan sub pixel is thus increased, the transmittance of the cyan color filter C4 per unit area size is relatively high and the color purity of the cyan sub pixel is relatively low. Thus, in the liquid crystal display device in example 1d, the transmittance of the color filter layer is increased as compared with the liquid crystal display device in comparative example 2d. Therefore, in the liquid crystal display device in example 1d, the relative luminance is increased as compared with the liquid crystal display device in comparative example 2d.

In the liquid crystal display device in example 1d, as compared with the liquid crystal display device in comparative example 3d, the aperture area size of the cyan sub pixel, instead of the blue sub pixel, is increased, the light emission efficiency of the backlight is decreased, and the transmittance of the color filter layer is significantly increased. In this case, the increase component of luminance caused by the increase of the transmittance of the color filter layer is larger than the decrease component of luminance caused by the decrease of the light emission efficiency of the backlight. As a result, the relative luminance is increased.

As understood from the comparison among Tables 26 through 28, in the liquid crystal display device in comparative example 3d, as compared with the liquid crystal display device in comparative example 2d, the aperture area size of the blue sub pixel is increased, the light emission efficiency of the backlight is improved, and the transmittance of the color filter layer is decreased. In this case, the decrease component of luminance caused by the decrease of the transmittance of the color filter layer is relatively large. Thus, the relative luminance is not increased much. By contrast, in the liquid crystal display device in example 1d, as compared with the liquid crystal display device in comparative example 2d, the aperture area size of the cyan sub pixel is increased. Thus, although the degree of improvement of the light emission efficiency of the backlight is relatively small, the transmittance of the color filter layer is significantly increased. As a result, the relative luminance is increased.

Tables 29 through 32 show the aperture area size, the chromaticity and the luminance ratio of each of the red (R), green (G), blue (B), cyan (C4) and yellow (Ye) sub pixels, the light emission efficiency of the backlight, the transmittance of the color filter layer, and the relative luminance of the liquid crystal display devices in examples 2d through 5d, respectively.

TABLE 29

|    | Aperture area size | x, y | Luminance ratio | Light emission efficiency | Transmittance | Relative luminance |
|----|--------------------|------|-----------------|---------------------------|---------------|--------------------|
| R  | 2.0 | 0.671, 0.323 | 11.4 | | | |
| G  | 1.0 | 0.255, 0.649 | 16.1 | | | |
| B  | 1.0 | 0.145, 0.053 | 3.5 | 105.2% | 37.6% | 101.1% |
| C4 | 1.8 | 0.191, 0.236 | 38.7 | | | |
| Ye | 1.0 | 0.465, 0.526 | 30.4 | | | |

TABLE 30

|    | Aperture area size | x, y | Luminance ratio | Light emission efficiency | Transmittance | Relative luminance |
|----|--------------------|------|-----------------|---------------------------|---------------|--------------------|
| R  | 1.8 | 0.671, 0.324 | 10.7 | | | |
| G  | 1.0 | 0.257, 0.648 | 15.3 | | | |
| B  | 1.0 | 0.145, 0.053 | 3.2 | 104.3% | 38.7% | 103.2% |
| C4 | 2.0 | 0.193, 0.238 | 41.1 | | | |
| Ye | 1.0 | 0.473, 0.519 | 29.7 | | | |

TABLE 31

|    | Aperture area size | x, y | Luminance ratio | Light emission efficiency | Transmittance | Relative luminance |
|----|--------------------|------|-----------------|---------------------------|---------------|--------------------|
| R  | 1.8 | 0.670, 0.323 | 10.9 | | | |
| G  | 1.0 | 0.254, 0.646 | 16.1 | | | |

TABLE 31-continued

| Aperture area size | x, y | Luminance ratio | Light emission efficiency | Transmittance | Relative luminance |
|---|---|---|---|---|---|
| B | 0.8 | 0.145, 0.052 | 2.9 | 101.8% | 39.1% | 101.7% |
| C4 | 1.8 | 0.189, 0.226 | 39.3 | | | |
| Ye | 1.0 | 0.470, 0.521 | 30.8 | | | |

TABLE 32

| Aperture area size | x, y | Luminance ratio | Light emission efficiency | Transmittance | Relative luminance |
|---|---|---|---|---|---|
| R | 1.8 | 0.671, 0.324 | 10.8 | | | |
| G | 1.0 | 0.258, 0.650 | 16.0 | | | |
| B | 1.2 | 0.145, 0.054 | 3.9 | 106.6% | 37.4% | 102.0% |
| C4 | 1.8 | 0.195, 0.244 | 38.4 | | | |
| Ye | 1.0 | 0.469, 0.522 | 30.9 | | | |

In the liquid crystal display device in example 2d, the aperture area size of the red sub pixel is further increased. Thus, the luminance ratio of the red sub pixel is raised, and the display quality of red is further improved. In the liquid crystal display device in example 2d, as compared with the liquid crystal display device in example 1d, the light emission efficiency of the backlight is improved, and the transmittance of the color filter layer is decreased. In this case, the decrease component of luminance caused by the decrease of the transmittance of the color filter layer is larger than the increase component of luminance caused by the improvement of the light emission efficiency of the backlight. As a result, the relative luminance is decreased.

In the liquid crystal display device in example 3d, as compared with the liquid crystal display device in example 1d, the aperture area size of the cyan sub pixel is increased, the light emission efficiency of the backlight is decreased, and the transmittance of the color filter layer is increased. In this case, the increase component of luminance caused by the increase of the transmittance of the color filter layer is larger than the decrease component of luminance caused by the decrease of the light emission efficiency of the backlight. As a result, the relative luminance is increased.

In the liquid crystal display device in example 4d, as compared with the liquid crystal display device in example 1d, the aperture area size of the blue sub pixel is decreased, the light emission efficiency of the backlight is decreased, and the transmittance of the color filter layer is increased. In this case, the decrease component of luminance caused by the decrease of the light emission efficiency of the backlight is larger than the increase component of luminance caused by the increase of the transmittance of the color filter layer. As a result, the relative luminance is slightly decreased.

In the liquid crystal display device in example 5d, as compared with the liquid crystal display device in example 1d, the aperture area size of the blue sub pixel is increased, the light emission efficiency of the backlight is improved, and the transmittance of the color filter layer is decreased. In this case, the decrease component of luminance caused by the decrease of the transmittance of the color filter layer is slightly larger than the increase component of luminance caused by the improvement of the light emission efficiency of the backlight. As a result, the relative luminance is slightly decreased. In the liquid crystal display devices in examples 2d through 5d, as compared with the liquid crystal display devices in comparative examples 2d and 3d, the light emission efficiency of the backlight and the transmittance of the color filter layer are both maintained higher, and thus the relative luminance is higher.

When the chromaticity of the cyan sub pixel is within the range A, it is preferable that the ratio of the aperture area size of the red sub pixel is 1.3 or greater and less than 2.0 and that the ratio of the aperture area size of the cyan sub pixel is also 1.3 or greater and less than 2.0. The ratio of the aperture area size of the red or cyan sub pixel may be normalized such that the average of the aperture area sizes of the other three sub pixels (i.e., the green, blue and yellow sub pixels) is 1.0.

Since the ratio of the aperture area size of the red sub pixel is 1.3 or greater, the luminance ratio of the red sub pixel can be increased by 10% or higher. Thus, red, which has a high lightness, can be reproduced. When the ratio of the aperture area size of the red sub pixel is 2.0 or greater, the luminance ratio of the red sub pixel is further increased. However, when the ratio of the aperture area size of the red or blue sub pixel is 2.0 or greater, the difference among the aperture area sizes of the sub pixels is large. Therefore, the coarseness or stripes are more liable to be visually recognized and thus the display quality may be reduced.

Now, with reference to FIG. 11 through FIG. 14, the following will be described: regarding the liquid crystal display devices in comparative examples 3a through 3d, when the ratio of the aperture area size of each of the red and blue sub pixels is changed with respect to the ratio of the aperture area size of each of the green, yellow and cyan sub pixels, how the relative luminance and the luminance ratio of the red sub pixel are changed; and regarding the liquid crystal display devices in examples 1a through 1d, when the ratio of the aperture area size of each of the red and cyan sub pixels is changed with respect to the ratio of the aperture area size of each of the green, blue and yellow sub pixels, how the relative luminance and the luminance ratio of the red sub pixel are changed. In FIG. 11 through FIG. 14, the thin solid line and the thin dashed line respectively represent the relative luminance and the luminance ratio of the red sub pixel in the liquid crystal display devices in examples 1a through 1d. The thick solid line and the thick dashed line respectively represent the relative luminance and the luminance ratio of the red sub pixel in the liquid crystal display devices in comparative examples 3a through 3d.

Figure 11:
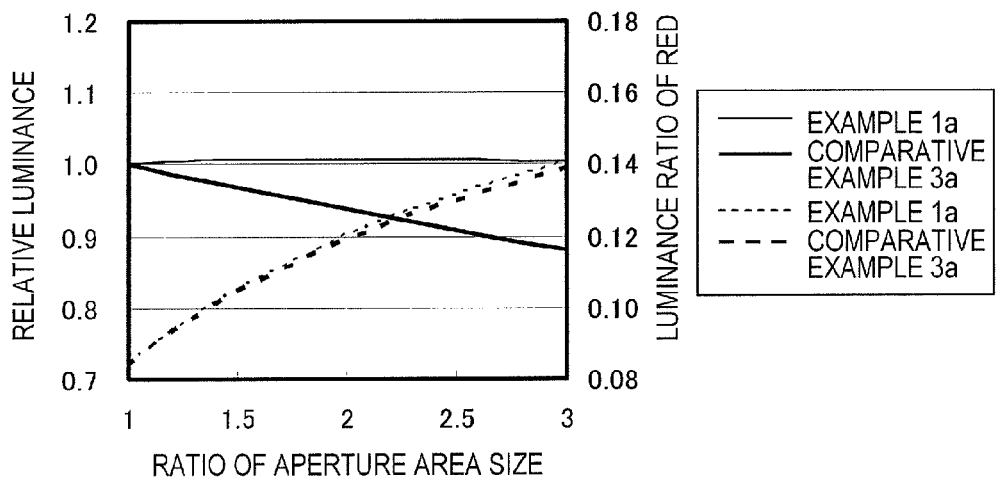

FIG. 11 shows how the relative luminance and the luminance ratio of the red sub pixel are changed in the liquid crystal display devices in comparative example 3a and example 1a. As described above, in the liquid crystal display devices in comparative example 3a and example 1a, the cyan color filter C1 is used.

When the color filter C1 is used, the main wavelength of the cyan sub pixel is relatively short, and the color purity of the cyan sub pixel is relatively low. In this case, when the ratio of the aperture area size of the blue sub pixel is increased, the light emission efficiency of the backlight is improved, the transmittance of the color filter layer is decreased, and the relative luminance is decreased. Therefore, in the liquid crystal display device in comparative example 3a, as the ratio of the aperture area size of each of the red and blue sub pixels is increased, the relative luminance is decreased.

By contrast, when the ratio of the aperture area size of the cyan sub pixel is increased, the light emission efficiency of the backlight is improved, the transmittance of the color filter layer is also increased, and the relative luminance is increased. Therefore, in the liquid crystal display device in example 1a, the decrease component of relative luminance caused by the increase of the ratio of the aperture area size of the red sub pixel generally countervails against the increase component of relative luminance caused by the increase of the ratio of the aperture area size of the cyan sub pixel. Therefore, even when the ratio of the aperture area size of each of the red and cyan sub pixels is increased, the relative luminance is not decreased and is generally constant.

Figure 12:
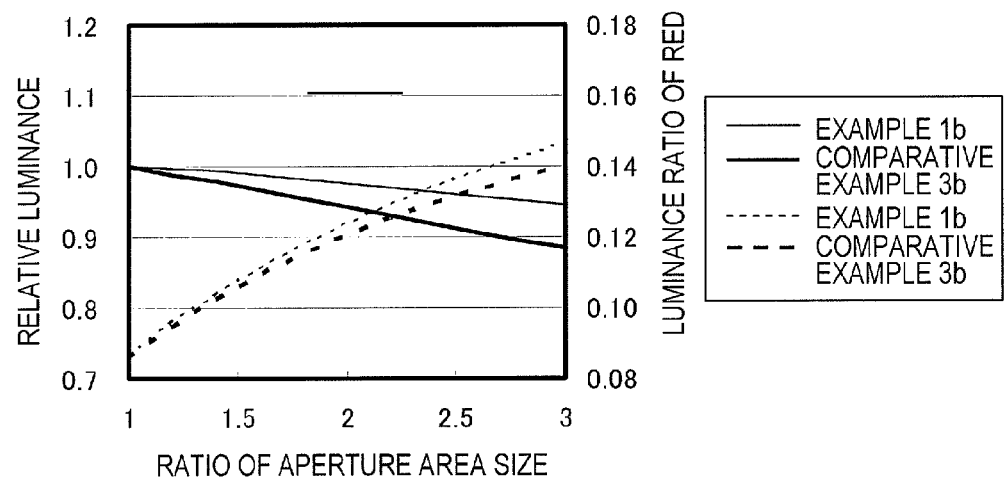
FIG. 12 is a graph showing how the relative luminance and the luminance ratio of the red sub pixel change in accordance with the change of the ratios of the aperture area sizes of the sub pixels in liquid crystal display devices in comparative example 3b and example 1b.

FIG. 12 shows how the relative luminance and the luminance ratio of the red sub pixel are changed in the liquid crystal display devices in comparative example 3b and example 1b. As described above, in the liquid crystal display devices in comparative example 3b and example 1b, the cyan color filter C2 is used.

When the color filter C2 is used, the main wavelength of the cyan sub pixel is relatively short, and the color purity of the cyan sub pixel is relatively low. In this case, when the ratio of the aperture area size of the blue sub pixel is increased, the light emission efficiency of the backlight is improved but the transmittance of the color filter layer is decreased, and the relative luminance is decreased. Therefore, in the liquid crystal display device in comparative example 3b, as the ratio of the aperture area size of each of the red and blue sub pixels is increased, the relative luminance is significantly decreased.

By contrast, when the ratio of the aperture area size of the cyan sub pixel is increased, the transmittance of the color filter layer is decreased but the light emission efficiency of the backlight is improved, and thus the decrease of the relative luminance is suppressed. In the liquid crystal display device in example 1b, a part of the decrease component of relative luminance caused by the increase of the ratio of the aperture area size of the red sub pixel countervails against the increase component of relative luminance caused by the increase of the ratio of the aperture area size of the cyan sub pixel. Therefore, the decrease of the relative luminance caused by the increase of the ratio of the aperture area size of each of the red and cyan sub pixels is relatively small.

Figure 13:
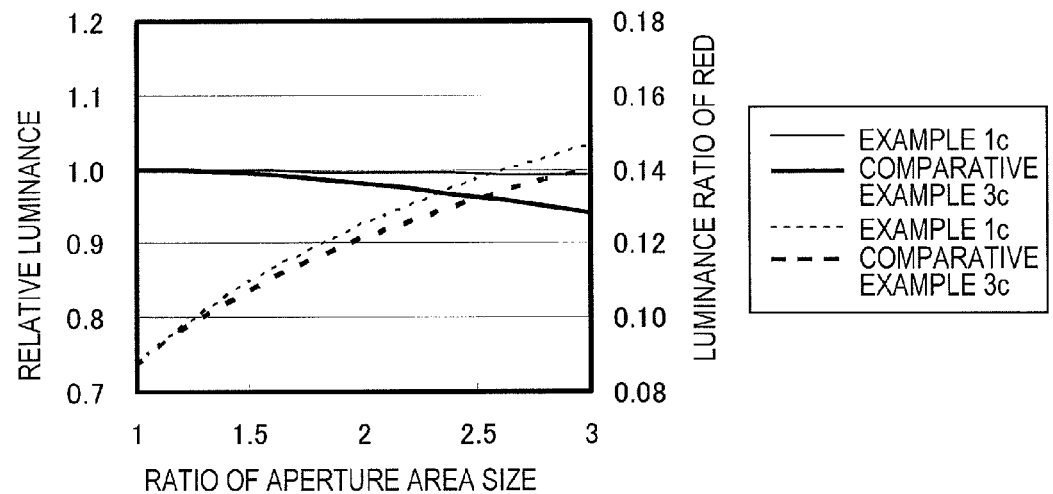
FIG. 13 is a graph showing how the relative luminance and the luminance ratio of the red sub pixel change in accordance with the change of the ratios of the aperture area sizes of the sub pixels in liquid crystal display devices in comparative example 3c and example 1c.

FIG. 13 shows how the relative luminance and the luminance ratio of the red sub pixel are changed in the liquid crystal display devices in comparative example 3c and example 1c. As described above, in the liquid crystal display devices in comparative example 3c and example 1c, the cyan color filter C3 is used.

When the color filter C3 is used, the main wavelength of the cyan sub pixel is relatively short, and the color purity of the cyan sub pixel is relatively low. In this case, when the ratio of the aperture area size of the blue sub pixel is increased, the light emission efficiency of the backlight is improved, the transmittance of the color filter layer is decreased, and the relative luminance is increased. In this case, the decrease component of relative luminance caused by the increase of the ratio of the aperture area size of the red sub pixel is larger than the increase component of relative luminance caused by the increase of the ratio of the aperture area size of the blue sub pixel. Therefore, in the liquid crystal display device in comparative example 3c, as the ratio of the aperture area size of each of the red and blue sub pixels is increased, the relative luminance is decreased.

By contrast, when the ratio of the aperture area size of the cyan sub pixel is increased, the light emission efficiency of the backlight is improved, the transmittance of the color filter layer is also increased, and the relative luminance is increased. In the liquid crystal display device in example 1c, the decrease component of relative luminance caused by the increase of the ratio of the aperture area size of the red sub pixel generally countervails against the increase component of relative luminance caused by the increase of the ratio of the aperture area size of the cyan sub pixel. Therefore, even when the ratio of the aperture area size of each of the red and cyan sub pixels is increased, the relative luminance is not decreased and is generally constant.

Figure 14:
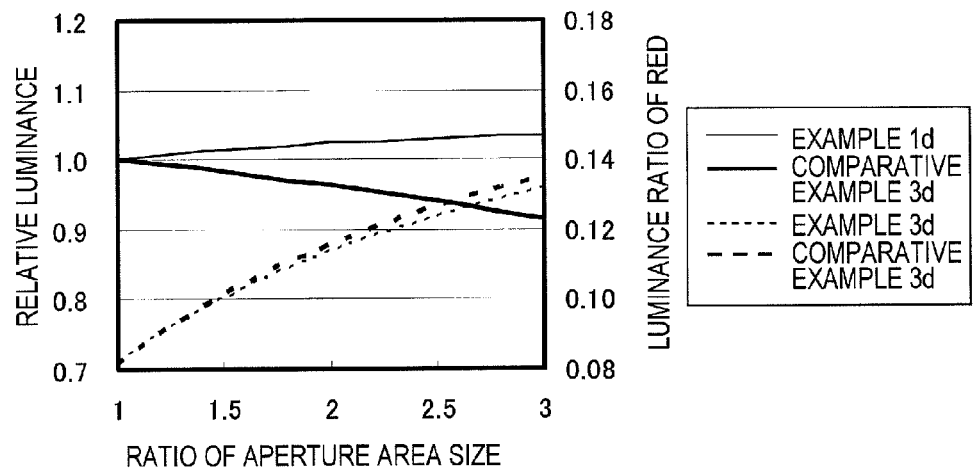
FIG. 14 is a graph showing how the relative luminance and the luminance ratio of the red sub pixel change in accordance with the change of the ratios of the aperture area sizes of the sub pixels in liquid crystal display devices in comparative example 3d and example 1d.

FIG. 14 shows how the relative luminance and the luminance ratio of the red sub pixel are changed in the liquid crystal display devices in comparative example 3d and example 1d. As described above, in the liquid crystal display devices in comparative example 3d and example 1d, the cyan color filter C4 is used.

When the color filter C4 is used, the main wavelength of the cyan sub pixel is relatively short, and the color purity of the cyan sub pixel is relatively low. In this case, when the ratio of the aperture area size of the blue sub pixel is increased, the light emission efficiency of the backlight is improved, the transmittance of the color filter layer is decreased, and the relative luminance is increased. However, the decrease component of relative luminance caused by the increase of the ratio of the aperture area size of the red sub pixel is larger than the increase component of relative luminance caused by the increase of the ratio of the aperture area size of the blue sub pixel. Therefore, in the liquid crystal display device in comparative example 3d, as the ratio of the aperture area size of each of the red and blue sub pixels is increased, the relative luminance is decreased.

By contrast, when the ratio of the aperture area size of the cyan sub pixel is increased, the light emission efficiency of the backlight is improved, the transmittance of the color filter layer is also increased, and the relative luminance is increased. In the liquid crystal display device in example 1d, the increase component of relative luminance caused by the increase of the ratio of the aperture area size of the cyan sub pixel is larger than the decrease component of relative luminance caused by the increase of the ratio of the aperture area size of the red sub pixel. Therefore, as the ratio of the aperture area size of each of the red and cyan sub pixels is increased, the relative luminance is increased.

Now, advantages of the liquid crystal display device 100B as compared with the liquid crystal display devices in comparative examples 1 through 3 will be described. In the following description, as the liquid crystal display device 100B, liquid crystal display devices in examples 1 through 5 will be described. In any of the liquid crystal display devices in comparative examples 1 through 3 and the liquid crystal display device in examples 1 through 5, each pixel includes red, green, blue, yellow and cyan sub pixels. In any of the liquid crystal display devices in comparative examples 1 through 3 and the liquid crystal display device in examples through 5 also, the color temperature is about 9900 K, specifically 9865 to 9910 K.

As described above, in the liquid crystal display device in comparative example 1, the red, green, blue, yellow and cyan sub pixels have a generally equal aperture area size to each other. By contrast, in the liquid crystal display device in comparative example 2, the aperture area size of the red sub pixel is larger than the aperture area size of each of the green, blue, yellow and cyan sub pixels. Here, the aperture area size of the red sub pixel is 1.8 times the aperture area size of each of the green, blue, yellow and cyan sub pixels. In the liquid crystal display device in comparative example 3, the aperture area size of each of the red sub pixel and the cyan sub pixel is larger than the aperture area size of each of the other sub pixels. Here, the aperture area size of each of the red and cyan sub pixels is 1.8 times the aperture area size of each of the green, yellow and blue sub pixels.

In the liquid crystal display devices in examples 1 through 5, the aperture area size of each of the red sub pixel and the blue sub pixel is larger than the aperture area size of each of the other sub pixels. In the liquid crystal display device in example 1, the aperture area size of each of the red sub pixel and the blue sub pixel is 1.8 times the aperture area size of each of the green, cyan and yellow sub pixels.

In the liquid crystal display device in example 2, the aperture area size of the red sub pixel is larger than the aperture area size of the blue sub pixel. The aperture area size of the red sub pixel is 2.0 times the aperture area size of each of the green, cyan and yellow sub pixels. The aperture area size of the blue sub pixel is 1.8 times the aperture area size of each of the green, blue and yellow sub pixels.

In the liquid crystal display device in example 3, the aperture area size of the blue sub pixel is larger than the aperture area size of the red sub pixel. The aperture area size of the blue sub pixel is 2.0 times the aperture area size of each of the green, cyan and yellow sub pixels. The aperture area size of the red sub pixel is 1.8 times the aperture area size of each of the green, cyan and yellow sub pixels.

In the liquid crystal display device in example 4, the aperture area size of the cyan sub pixel is smaller than the aperture area size of each of the green and yellow sub pixels. The aperture area size of each of the red and blue sub pixels is 1.8 times the aperture area size of each of the green and yellow sub pixels. The aperture area size of the cyan sub pixel is 0.8 times the aperture area size of each of the green and yellow sub pixels.

In the liquid crystal display device in example 5, the aperture area size of the cyan sub pixel is larger than the aperture area size of each of the green and yellow sub pixels. The aperture area size of each of the red and blue sub pixels is 1.8 times the aperture area size of each of the green and yellow sub pixels. The aperture area size of the cyan sub pixel is 1.2 times the aperture area size of each of the green and yellow sub pixels.

As the cyan color filter, the color filter C5 shown in FIG. 9(b) may be used. Hereinafter, with reference to Tables 33 through 40, liquid crystal display devices in comparative examples 1e through 3e and liquid crystal display devices in examples 1e through 5e using the color filter C5 as the cyan color filter will be described.

Tables 33 through 35 show the aperture area size, the chromaticity and the luminance ratio of each of the red (R), green (G), blue (B), cyan (C5) and yellow (Ye) sub pixels, the light emission efficiency of the backlight, the transmittance of the color filter layer, and the relative luminance of the liquid crystal display devices in comparative examples 1e through 3e, respectively.

TABLE 33

| | Aperture area size | x, y | Luminance ratio | Light emission efficiency | Transmittance | Relative luminance |
|---|---|---|---|---|---|---|
| R | 1.0 | 0.669, 0.323 | 8.2 | | | |
| G | 1.0 | 0.240, 0.634 | 20.0 | | | |
| B | 1.0 | 0.145, 0.048 | 6.3 | 100.0% | 38.1% | 100.0% |
| C5 | 1.0 | 0.215, 0.328 | 27.5 | | | |
| Ye | 1.0 | 0.479, 0.510 | 37.9 | | | |

TABLE 34

| | Aperture area size | x, y | Luminance ratio | Light emission efficiency | Transmittance | Relative luminance |
|---|---|---|---|---|---|---|
| R | 1.8 | 0.667, 0.322 | 11.4 | | | |
| G | 1.0 | 0.236, 0.635 | 20.0 | | | |
| B | 1.0 | 0.145, 0.048 | 6.3 | 102.4% | 34.8% | 93.5% |
| C5 | 1.0 | 0.207, 0.328 | 27.1 | | | |
| Ye | 1.0 | 0.457, 0.531 | 35.2 | | | |

TABLE 35

| | Aperture area size | x, y | Luminance ratio | Light emission efficiency | Transmittance | Relative luminance |
|---|---|---|---|---|---|---|
| R | 1.8 | 0.668, 0.323 | 11.1 | | | |
| G | 1.0 | 0.236, 0.632 | 15.7 | | | |
| B | 1.0 | 0.145, 0.047 | 5.2 | 98.1% | 37.0% | 95.2% |
| C5 | 1.8 | 0.210, 0.319 | 38.9 | | | |
| Ye | 1.0 | 0.477, 0.513 | 29.1 | | | |

In the liquid crystal display device in comparative example 2e, as compared with the liquid crystal display device in comparative example 1e, the aperture area size of the red sub pixel is increased. Thus, red, which has a high luminance ratio, can be reproduced. In the liquid crystal display device in comparative example 2e, as compared with the liquid crystal display device in comparative example 1e, the light emission efficiency of the backlight is improved, and the transmittance of the color filter layer is decreased. In this case, the decrease component of luminance caused by the decrease of the transmittance of the color filter layer is larger than the increase component of luminance caused by the improvement of the light emission efficiency of the backlight. As a result, the relative luminance is decreased. Therefore, in the liquid crystal display device in comparative example 2e, red, which has a high lightness, can be reproduced but a high luminance cannot be efficiently realized.

In the liquid crystal display device in comparative example 3e, as compared with the liquid crystal display device in comparative example 1e, the aperture area size of each of the red and cyan sub pixels is increased. When the aperture area size of each of the red and cyan sub pixels is thus increased, the main wavelength of the cyan sub pixel using the cyan color filter C5 is relatively long. Therefore, in order to suppress the change of the color temperature, the amount of the blue component, which has a relatively low light emission efficiency among the color components of the light emitted from the backlight, needs to be increased, and the light emission efficiency of the backlight is decreased. Since the aperture area size of each of the red and cyan sub pixels is increased, the transmittance of the color filter layer is decreased. As a result, the relative luminance is decreased. Therefore, in the liquid crystal display device in comparative example 3e, red, which has a high lightness, can be reproduced but a high luminance cannot be efficiently realized.

Table 36 shows the aperture area size, the chromaticity and the luminance ratio of each of the red (R), green (G), blue (B), cyan (C5) and yellow (Ye) sub pixels, the light emission efficiency of the backlight, the transmittance of the color filter layer, and the relative luminance of the liquid crystal display device in example 1e.

TABLE 36

| | Aperture area size | x, y | Luminance ratio | Light emission efficiency | Transmittance | Relative luminance |
|---|---|---|---|---|---|---|
| R | 1.8 | 0.670, 0.323 | 11.0 | | | |
| G | 1.0 | 0.252, 0.648 | 19.6 | | | |
| B | 1.8 | 0.145, 0.053 | 7.9 | 121.8% | 32.8% | 104.9% |
| C5 | 1.0 | 0.229, 0.392 | 25.8 | | | |
| Ye | 1.0 | 0.455, 0.536 | 35.7 | | | |

In the liquid crystal display device in comparative example 1e, as compared with the liquid crystal display device in comparative example 1e, the aperture area size of the red sub pixel is increased, and the luminance ratio thereof is raised. Thus, red, which has a high lightness, can be fully reproduced. In the liquid crystal display device in comparative example 1e, as compared with the liquid crystal display device in comparative example 2e, the aperture area size of the blue sub pixel is increased, the light emission efficiency of the backlight is improved, and the transmittance of the color filter layer is decreased. In this case, the increase component of luminance caused by the improvement of the light emission efficiency of the backlight is larger than the decrease component of luminance caused by the decrease of the transmittance of the color filter layer. As a result, the relative luminance is increased.

In the liquid crystal display device in example 1e, as compared with the liquid crystal display device in comparative example 3e, the aperture area size of the blue sub pixel, instead of the cyan sub pixel, is increased, the light emission efficiency of the backlight is improved, and the transmittance of the color filter layer is decreased. In this case, the increase component of luminance caused by the improvement of the light emission efficiency of the backlight is larger than the decrease component of luminance caused by the decrease of the transmittance of the color filter layer. As a result, the relative luminance is increased.

As understood from the comparison among Tables 34 through 36, in the liquid crystal display device in comparative example 3e, as compared with the liquid crystal display device in comparative example 2e, the aperture area size of the cyan sub pixel is increased. The chromaticity of the cyan sub pixel is relatively close to the chromaticity of the green sub pixel, and the main wavelength of the cyan sub pixel is relatively long. Therefore, in the liquid crystal display device in comparative example 3e, the light emission efficiency of the backlight is decreased as compared with the liquid crystal display device in comparative example 2e. When the aperture area size of the cyan sub pixel is thus increased, the transmittance of the cyan color filter C5 per unit area size is relatively high and the color purity of the cyan sub pixel is relatively low. Thus, in the liquid crystal display device in comparative example 3e, the transmittance of the color filter layer is increased as compared with the liquid crystal display device in comparative example 2e. In this case, the decrease component of luminance caused by the decrease of the light emission efficiency of the backlight is relatively large. Thus, the relative luminance is not increased much.

By contrast, in the liquid crystal display device in example 1e, as compared with the liquid crystal display device in comparative example 2e, the aperture area size of the blue sub pixel is increased, the light emission efficiency of the backlight is improved, and the transmittance of the color filter layer is decreased. In this case, the increase component of luminance caused by the improvement of the light emission efficiency of the backlight is larger than the decrease component of luminance caused by the decrease of the transmittance of the color filter layer. As a result, the relative luminance is significantly increased.

Tables 37 through 40 show the aperture area size, the chromaticity and the luminance ratio of each of the red (R), green (G), blue (B), cyan (C5) and yellow (Ye) sub pixels, the light emission efficiency of the backlight, the transmittance of the color filter layer, and the relative luminance of the liquid crystal display devices in examples 2e through 5e.

TABLE 37

| | Aperture area size | x | y | Luminance ratio | Light emission efficiency | Transmittance | Relative luminance |
|---|---|---|---|---|---|---|---|
| R | 2.0 | 0.670 | 0.323 | 11.5 | | | |
| G | 1.0 | 0.251 | 0.648 | 19.6 | | | |
| B | 1.8 | 0.145 | 0.053 | 7.9 | 122.7% | 32.2% | 103.8% |
| C5 | 1.0 | 0.228 | 0.392 | 25.8 | | | |
| Ye | 1.0 | 0.450 | 0.540 | 35.2 | | | |

TABLE 38

| | Aperture area size | x, y | Luminance ratio | Light emission efficiency | Transmittance | Relative luminance |
|---|---|---|---|---|---|---|
| R | 1.8 | 0.670, 0.323 | 10.9 | | | |
| G | 1.0 | 0.255, 0.650 | 19.5 | | | |
| B | 2.0 | 0.145, 0.054 | 8.3 | 125.6% | 32.2% | 106.2% |
| C5 | 1.0 | 0.233, 0.404 | 25.6 | | | |
| Ye | 1.0 | 0.454, 0.537 | 35.7 | | | |

TABLE 39

| | Aperture area size | x, y | Luminance ratio | Light emission efficiency | Transmittance | Relative luminance |
|---|---|---|---|---|---|---|
| R | 1.8 | 0.670, 0.323 | 11.0 | | | |
| G | 1.0 | 0.252, 0.649 | 20.9 | | | |
| B | 1.8 | 0.145, 0.053 | 8.3 | 124.5% | 32.1% | 105.0% |
| C5 | 0.8 | 0.229, 0.397 | 22.0 | | | |
| Ye | 1.0 | 0.449, 0.541 | 37.7 | | | |

TABLE 40

| | Aperture area size | x, y | Luminance ratio | Light emission efficiency | Transmittance | Relative luminance |
|---|---|---|---|---|---|---|
| R | 1.8 | 0.670, 0.323 | 10.9 | | | |
| G | 1.0 | 0.252, 0.647 | 18.4 | | | |
| B | 1.8 | 0.145, 0.052 | 7.6 | 119.5% | 33.5% | 105.0% |
| C5 | 1.2 | 0.230, 0.387 | 29.2 | | | |
| Ye | 1.0 | 0.459, 0.531 | 33.9 | | | |

In the liquid crystal display device in example 2e, the aperture area size of the red sub pixel is further increased, and the luminance ratio of the red sub pixel is further raised. In the liquid crystal display device in example 2e, as compared with the liquid crystal display device in example 1e, the light emission efficiency of the backlight is improved, and the transmittance of the color filter layer is decreased. In this case, the decrease component of luminance caused by the decrease of the transmittance of the color filter layer is larger than the increase component of luminance caused by the improvement of the light emission efficiency of the backlight. As a result, the relative luminance is decreased.

In the liquid crystal display device in example 3e, as compared with the liquid crystal display device in example 1e, the aperture area size of the blue sub pixel is increased. Thus, the light emission efficiency of the backlight is improved, and the transmittance of the color filter layer is decreased. In this case, the increase component of luminance caused by the improvement of the light emission efficiency of the back light is larger than the decrease component of luminance caused by the decrease of the transmittance of the color filter layer. As a result, the relative luminance is increased.

In the liquid crystal display device in example 4e, as compared with the liquid crystal display device in example 1e, the aperture area size of the cyan sub pixel is decreased, the light emission efficiency of the backlight is improved, and the transmittance of the color filter layer is decreased. In this case, the increase component of luminance caused by the improvement of the light emission efficiency of the backlight is larger than the decrease component of luminance caused by the decrease of the transmittance of the color filter layer. As a result, the relative luminance is slightly increased.

In the liquid crystal display device in example 5e, as compared with the liquid crystal display device in example 1e, the aperture area size of the cyan sub pixel is increased, the light emission efficiency of the backlight is decreased, and the transmittance of the color filter layer is increased. In this case, the increase component of luminance caused by the increase of the transmittance of the color filter layer is larger than the decrease component of luminance caused by the decrease of the light emission efficiency of the backlight. As a result, the relative luminance is slightly increased. In the liquid crystal display devices in examples 2e through 5e, as compared with the liquid crystal display devices in comparative examples 2e and 3e, the light emission efficiency of the backlight and the transmittance of the color filter layer are both maintained higher, and thus the relative luminance is higher.

Hereinafter, with reference to Tables 41 through 48, liquid crystal display devices in comparative examples 1f through 3f and liquid crystal display devices in examples 1f through 5f using the color filter C6 shown in FIG. 9(b) as the cyan color filter will be described.

Table 41 shows the aperture area size, the chromaticity and the luminance ratio of each of the red (R), green (G), blue (B), cyan (C6) and yellow (Ye) sub pixels, the light emission efficiency of the backlight, the transmittance of the color filter layer, and the relative luminance of the liquid crystal display device in comparative example 1f.

TABLE 41

| | Aperture area size | x, y | Luminance ratio | Light emission efficiency | Transmittance | Relative luminance |
|---|---|---|---|---|---|---|
| R | 1.0 | 0.670, 0.323 | 9.1 | | | |
| G | 1.0 | 0.249, 0.642 | 23.9 | | | |
| B | 1.0 | 0.145, 0.050 | 6.1 | 100.0% | 33.1% | 100.0% |
| C6 | 1.0 | 0.144, 0.213 | 15.4 | | | |
| Ye | 1.0 | 0.472, 0.518 | 45.4 | | | |

In the liquid crystal display device in comparative example 1f, as compared with a three primary color liquid crystal display device, the area size of each sub pixel is smaller. Thus, the luminance ratio of the red sub pixel is relatively low, and red, which has a high lightness, cannot be fully reproduced.

Table 42 shows the aperture area size, the chromaticity and the luminance ratio of each of the red (R), green (G), blue (B), cyan (C6) and yellow (Ye) sub pixels, the light emission efficiency of the backlight, the transmittance of the color filter layer, and the relative luminance of the liquid crystal display device in comparative example 2f.

TABLE 42

| | Aperture area size | x, y | Luminance ratio | Light emission efficiency | Transmittance | Relative luminance |
|---|---|---|---|---|---|---|
| R | 1.8 | 0.668, 0.323 | 12.4 | | | |
| G | 1.0 | 0.245, 0.644 | 23.9 | | | |
| B | 1.0 | 0.145, 0.051 | 6.1 | 103.6% | 30.4% | 94.9% |
| C6 | 1.0 | 0.143, 0.213 | 15.5 | | | |
| Ye | 1.0 | 0.448, 0.541 | 42.1 | | | |

In the liquid crystal display device in comparative example 2f, as the aperture area size of the red sub pixel is increased, the luminance ratio thereof is raised. Thus, red, which has a high lightness, can be fully reproduced. In the liquid crystal display device in comparative example 2f, as compared with the liquid crystal display device in comparative example 1f, the light emission efficiency of the backlight is improved, and the transmittance of the color filter layer is decreased. In this case, the decrease component of luminance caused by the decrease of the transmittance of the color filter layer is larger than the increase component of luminance caused by the improvement of the light emission efficiency of the backlight. As a result, the relative luminance is decreased. Therefore, in the liquid crystal display device in comparative example 2f, red, which has a high lightness, can be reproduced but a high luminance cannot be efficiently realized.

Table 43 shows the aperture area size, the chromaticity and the luminance ratio of each of the red (R), green (G), blue (B), cyan (C6) and yellow (Ye) sub pixels, the light emission efficiency of the backlight, the transmittance of the color filter layer, and the relative luminance of the liquid crystal display device in comparative example 3f.

TABLE 43

| | Aperture area size | x, y | Luminance ratio | Light emission efficiency | Transmittance | Relative luminance |
|---|---|---|---|---|---|---|
| R | 1.8 | 0.670, 0.323 | 12.8 | | | |
| G | 1.0 | 0.250, 0.645 | 20.6 | | | |
| B | 1.0 | 0.145, 0.051 | 5.0 | 104.1% | 30.1% | 94.5% |
| C6 | 1.8 | 0.145, 0.221 | 23.5 | | | |
| Ye | 1.0 | 0.464, 0.527 | 38.2 | | | |

In the liquid crystal display device in comparative example 3f, as compared with the liquid crystal display device in comparative example 1f, the aperture area size of each of the red and cyan sub pixels is increased, and the transmittance of the color filter layer is decreased. In the liquid crystal display device in comparative example 3f, as compared with the liquid crystal display device in comparative example 1f, the light emission efficiency of the backlight is increased. The decrease component of luminance caused by the decrease of the transmittance of the color filter layer is larger than the increase component of luminance caused by the improvement of the light emission efficiency of the backlight. As a result, the relative luminance is decreased. Therefore, in the liquid crystal display device in comparative example 3f, red, which has a high lightness, can be reproduced but a high luminance cannot be efficiently realized.

Table 44 shows the aperture area size, the chromaticity and the luminance ratio of each of the red (R), green (G), blue (B), cyan (C6) and yellow (Ye) sub pixels, the light emission efficiency of the backlight, the transmittance of the color filter layer, and the relative luminance of the liquid crystal display device in example 1f.

TABLE 44

| | Aperture area size | x, y | Luminance ratio | Light emission efficiency | Transmittance | Relative luminance |
|---|---|---|---|---|---|---|
| R | 1.8 | 0.670, 0.323 | 11.9 | | | |
| G | 1.0 | 0.258, 0.654 | 23.6 | | | |
| B | 1.8 | 0.145, 0.056 | 8.1 | 121.1% | 28.1% | 102.7% |
| C6 | 1.0 | 0.151, 0.262 | 13.8 | | | |
| Ye | 1.0 | 0.446, 0.545 | 42.6 | | | |

In the liquid crystal display device in example 1f, as compared with the liquid crystal display device in comparative example 1f, the aperture area size of the red sub pixel is increased, and the luminance ratio thereof is raised. Thus, red, which has a high lightness, can be fully reproduced. In the liquid crystal display device in example 1f, as compared with the liquid crystal display devices in comparative examples 2f and 3f, the light emission efficiency of the backlight is improved, and the transmittance of the color filter layer is decreased. In this case, the increase component of luminance caused by the improvement of the light emission efficiency of the backlight is larger than the decrease component of luminance caused by the decrease of the transmittance of the color filter layer. As a result, the relative luminance is increased.

Table 45 shows the aperture area size, the chromaticity and the luminance ratio of each of the red (R), green (G), blue (B), cyan (C6) and yellow (Ye) sub pixels, the light emission efficiency of the backlight, the transmittance of the color filter layer, and the relative luminance of the liquid crystal display device in example 2f.

TABLE 45

| | Aperture area size | x, y | Luminance ratio | Light emission efficiency | Transmittance | Relative luminance |
|---|---|---|---|---|---|---|
| R | 2.0 | 0.670, 0.323 | 12.5 | | | |
| G | 1.0 | 0.257, 0.654 | 23.5 | | | |
| B | 1.8 | 0.145, 0.056 | 8.1 | 122.3% | 27.6% | 101.9% |
| C6 | 1.0 | 0.151, 0.262 | 13.8 | | | |
| Ye | 1.0 | 0.441, 0.549 | 42.1 | | | |

In the liquid crystal display device in example 2f, as compared with the liquid crystal display device in example 1f, the aperture area size of the red sub pixel is further increased, and the luminance ratio of the red sub pixel is further raised. In the liquid crystal display device in example 2f, as compared with the liquid crystal display device in example 1f, the light emission efficiency of the backlight is improved, and the transmittance of the color filter layer is decreased. In this case, the decrease component of luminance caused by the decrease of the transmittance of the color filter layer is larger than the increase component of luminance caused by the improvement of the light emission efficiency of the backlight. As a result, the relative luminance is decreased.

Table 46 shows the aperture area size, the chromaticity and the luminance ratio of each of the red (R), green (G), blue (B), cyan (C6) and yellow (Ye) sub pixels, the light emission efficiency of the backlight, the transmittance of the color filter layer, and the relative luminance of the liquid crystal display device in example 3f.

TABLE 46

| | Aperture area size | x, y | Luminance ratio | Light emission efficiency | Transmittance | Relative luminance |
|---|---|---|---|---|---|---|
| R | 1.8 | 0.671, 0.323 | 11.8 | | | |
| G | 1.0 | 0.259, 0.655 | 23.5 | | | |
| B | 2.0 | 0.145, 0.058 | 8.5 | 124.5% | 27.5% | 103.4% |
| C6 | 1.0 | 0.153, 0.272 | 13.6 | | | |
| Ye | 1.0 | 0.445, 0.546 | 42.6 | | | |

In the liquid crystal display device in example 3f, as compared with the liquid crystal display device in example 1f, the aperture area size of the blue sub pixel is increased. Thus, the light emission efficiency of the backlight is improved, and the transmittance of the color filter layer is decreased. In this case, the increase component of luminance caused by the improvement of the light emission efficiency of the backlight is larger than the decrease component of luminance caused by the decrease of the transmittance of the color filter layer. As a result, the relative luminance is slightly increased.

Table 47 shows the aperture area size, the chromaticity and the luminance ratio of each of the red (R), green (G), blue (B), cyan (C6) and yellow (Ye) sub pixels, the light emission efficiency of the backlight, the transmittance of the color filter layer, and the relative luminance of the liquid crystal display device in example 4f.

TABLE 47

| | Aperture area size | x, y | Luminance ratio | Light emission efficiency | Transmittance | Relative luminance |
|---|---|---|---|---|---|---|
| R | 1.8 | 0.670, 0.323 | 11.8 | | | |
| G | 1.0 | 0.257, 0.654 | 24.5 | | | |
| B | 1.8 | 0.145, 0.056 | 8.4 | 121.9% | 28.2% | 103.6% |
| C6 | 0.8 | 0.151, 0.261 | 11.5 | | | |
| Ye | 1.0 | 0.442, 0.549 | 43.8 | | | |

In the liquid crystal display device in example 4f, as compared with the liquid crystal display device in example 1f, the aperture area size of the cyan sub pixel is decreased, the light emission efficiency of the backlight is improved, and the transmittance of the color filter layer is slightly increased. As a result, the relative luminance is increased.

Table 48 shows the aperture area size, the chromaticity and the luminance ratio of each of the red (R), green (G), blue (B), cyan (C6) and yellow (Ye) sub pixels, the light emission efficiency of the backlight, the transmittance of the color filter layer, and the relative luminance of the liquid crystal display device in example 5f.

TABLE 48

| | Aperture area size | x, y | Luminance ratio | Light emission efficiency | Transmittance | Relative luminance |
|---|---|---|---|---|---|---|
| R | 1.8 | 0.671, 0.323 | 12.0 | | | |
| G | 1.0 | 0.258, 0.654 | 22.7 | | | |
| B | 1.8 | 0.145, 0.056 | 7.7 | 120.4% | 28.1% | 101.9% |
| C6 | 1.2 | 0.151, 0.262 | 16.0 | | | |
| Ye | 1.0 | 0.449, 0.542 | 41.5 | | | |

In the liquid crystal display device in example 5f, as compared with the liquid crystal display device in example 1f, the aperture area size of the cyan sub pixel is increased, the light emission efficiency of the backlight is slightly decreased, and the transmittance of the color filter layer is generally equal. As a result, the relative luminance is slightly decreased. In the liquid crystal display devices in examples 2f through 5f, as compared with the liquid crystal display devices in comparative examples 2f and 3f, the light emission efficiency of the backlight and the transmittance of the color filter layer are both maintained higher, and thus the relative luminance is higher.

As the cyan color filter, the color filter C7 shown in FIG. 9(b) may be used. Hereinafter, with reference to Tables 49 through 56, liquid crystal display devices in comparative examples 1g through 3g and liquid crystal display devices in examples 1g through 5g using the color filter C7 as the cyan color filter will be described.

Tables 49 through 51 show the aperture area size, the chromaticity and the luminance ratio of each of the red (R), green (G), blue (B), cyan (C7) and yellow (Ye) sub pixels, the light emission efficiency of the backlight, the transmittance of the color filter layer, and the relative luminance of the liquid crystal display devices in comparative examples 1g, 2g and 3g, respectively.

TABLE 49

| | Aperture area size | x, y | Luminance ratio | Light emission efficiency | Transmittance | Relative luminance |
|---|---|---|---|---|---|---|
| R | 1.0 | 0.669, 0.323 | 8.9 | | | |
| G | 1.0 | 0.236, 0.630 | 21.2 | | | |
| B | 1.0 | 0.146, 0.047 | 7.2 | 100.0% | 35.5% | 100.0% |
| C7 | 1.0 | 0.200, 0.415 | 22.6 | | | |
| Ye | 1.0 | 0.482, 0.507 | 40.0 | | | |

TABLE 50

| | Aperture area size | x, y | Luminance ratio | Light emission efficiency | Transmittance | Relative luminance |
|---|---|---|---|---|---|---|
| R | 1.8 | 0.667, 0.322 | 12.2 | | | |
| G | 1.0 | 0.232, 0.632 | 21.2 | | | |
| B | 1.0 | 0.145, 0.047 | 7.2 | 102.2% | 32.5% | 93.7% |
| C7 | 1.0 | 0.195, 0.416 | 22.5 | | | |
| Ye | 1.0 | 0.458, 0.529 | 36.9 | | | |

TABLE 51

| | Aperture area size | x, y | Luminance ratio | Light emission efficiency | Transmittance | Relative luminance |
|---|---|---|---|---|---|---|
| R | 1.8 | 0.668, 0.322 | 12.5 | | | |
| G | 1.0 | 0.229, 0.626 | 17.0 | | | |
| B | 1.0 | 0.146, 0.046 | 6.3 | 95.5% | 33.3% | 89.6% |
| C7 | 1.8 | 0.193, 0.398 | 32.9 | | | |
| Ye | 1.0 | 0.480, 0.508 | 31.3 | | | |

In the liquid crystal display device in comparative example 2g, as compared with the liquid crystal display device in comparative example 1g, the aperture area size of the red sub pixel is increased. Thus, the light emission efficiency of the backlight is improved, and the transmittance of the color filter layer is decreased. In this case, the decrease component of luminance caused by the decrease of the transmittance of the color filter layer is larger than the increase component of luminance caused by the improvement of the light emission efficiency of the backlight. As a result, the relative luminance is decreased. Therefore, in the liquid crystal display device in comparative example 2g, red, which has a high lightness, can be reproduced but a high luminance cannot be efficiently realized.

In the liquid crystal display device in comparative example 3g, as compared with the liquid crystal display device in comparative example 1g, the aperture area size of each of the red and cyan sub pixels is increased, and the transmittance of the color filter layer and the light emission efficiency of the backlight are decreased. As a result, the relative luminance is significantly decreased. Therefore, in the liquid crystal display device in comparative example 3g, red, which has a high lightness, can be reproduced but a high luminance cannot be efficiently realized.

Table 52 shows the aperture area size, the chromaticity and the luminance ratio of each of the red (R), green (G), blue (B), cyan (C7) and yellow (Ye) sub pixels, the light emission efficiency of the backlight, the transmittance of the color filter layer, and the relative luminance of the liquid crystal display device in example 1g.

TABLE 52

|   | Aperture area size | x, y | Luminance ratio | Light emission efficiency | Transmittance | Relative luminance |
|---|---|---|---|---|---|---|
| R | 1.8 | 0.670, 0.323 | 11.6 | | | |
| G | 1.0 | 0.251, 0.647 | 20.7 | | | |
| B | 1.8 | 0.145, 0.052 | 8.6 | 124.7% | 31.0% | 109.0% |
| C7 | 1.0 | 0.218, 0.483 | 21.4 | | | |
| Ye | 1.0 | 0.455, 0.536 | 37.7 | | | |

In the liquid crystal display device in example 1g, as compared with the liquid crystal display device in comparative example 1g, the aperture area size of the red sub pixel is increased, and the luminance ratio thereof is raised. Thus, red, which has a high lightness, can be fully reproduced. In the liquid crystal display device in comparative example 1g, as compared with the liquid crystal display devices in comparative examples 2g and 3g, the light emission efficiency of the backlight is improved, and the transmittance of the color filter layer is decreased. In this case, the increase component of luminance caused by the improvement of the light emission efficiency of the backlight is larger than the decrease component of luminance caused by the decrease of the transmittance of the color filter layer. As a result, the relative luminance is increased.

Tables 53 through 56 show the aperture area size, the chromaticity and the luminance ratio of each of the red (R), green (G), blue (B), cyan (C7) and yellow (Ye) sub pixels, the light emission efficiency of the backlight, the transmittance of the color filter layer, and the relative luminance of the liquid crystal display devices in examples 2g through 5g, respectively.

TABLE 53

|   | Aperture area size | x, y | Luminance ratio | Light emission efficiency | Transmittance | Relative luminance |
|---|---|---|---|---|---|---|
| R | 2.0 | 0.669, 0.323 | 12.2 | | | |
| G | 1.0 | 0.250, 0.648 | 20.7 | | | |
| B | 1.8 | 0.145, 0.052 | 8.6 | 125.8% | 30.4% | 108.0% |
| C7 | 1.0 | 0.217, 0.484 | 21.4 | | | |
| Ye | 1.0 | 0.450, 0.540 | 37.1 | | | |

TABLE 54

|   | Aperture area size | x, y | Luminance ratio | Light emission efficiency | Transmittance | Relative luminance |
|---|---|---|---|---|---|---|
| R | 1.8 | 0.670, 0.323 | 11.5 | | | |
| G | 1.0 | 0.254, 0.650 | 20.6 | | | |
| B | 2.0 | 0.145, 0.053 | 8.9 | 129.1% | 30.5% | 110.9% |
| C7 | 1.0 | 0.222, 0.495 | 21.2 | | | |
| Ye | 1.0 | 0.454, 0.537 | 37.7 | | | |

TABLE 55

|   | Aperture area size | x, y | Luminance ratio | Light emission efficiency | Transmittance | Relative luminance |
|---|---|---|---|---|---|---|
| R | 1.8 | 0.670, 0.323 | 11.5 | | | |
| G | 1.0 | 0.252, 0.649 | 22.0 | | | |
| B | 1.8 | 0.145, 0.053 | 8.9 | 128.0% | 30.6% | 110.5% |
| C7 | 0.8 | 0.219, 0.489 | 18.1 | | | |
| Ye | 1.0 | 0.449, 0.541 | 39.5 | | | |

TABLE 56

|   | Aperture area size | x, y | Luminance ratio | Light emission efficiency | Transmittance | Relative luminance |
|---|---|---|---|---|---|---|
| R | 18 | 0.670, 0.323 | 11.7 | | | |
| G | 1.0 | 0.251, 0.646 | 19.6 | | | |
| B | 1.8 | 0.145, 0.052 | 8.4 | 122.1% | 31.3% | 107.8% |
| C7 | 1.2 | 0.217, 0.478 | 24.3 | | | |
| Ye | 1.0 | 0.460, 0.531 | 36.1 | | | |

In the liquid crystal display device in example 2g, the aperture area size of the red sub pixel is further increased, and the luminance ratio of the red sub pixel is further raised. In the liquid crystal display device in example 2g, as compared with the liquid crystal display device in example 1g, the light emission efficiency of the backlight is improved, and the transmittance of the color filter layer is decreased. In this case, the decrease component of luminance caused by the decrease of the transmittance of the color filter layer is larger than the increase component of luminance caused by the improvement of the light emission efficiency of the backlight. As a result, the relative luminance is decreased.

In the liquid crystal display device in example 3g, as compared with the liquid crystal display device in example 1g, the aperture area size of the blue sub pixel is increased. Thus, the light emission efficiency of the backlight is improved, and the transmittance of the color filter layer is decreased. In this case, the increase component of luminance caused by the improvement of the light emission efficiency of the backlight is larger than the decrease component of luminance caused by the decrease of the transmittance of the color filter layer. As a result, the relative luminance is increased.

In the liquid crystal display device in example 4g, as compared with the liquid crystal display device in example 1g, the aperture area size of the cyan sub pixel is decreased, the light emission efficiency of the backlight is improved, and the transmittance of the color filter layer is decreased. In this case, the increase component of luminance caused by the improvement of the light emission efficiency of the backlight is larger than the decrease component of luminance caused by the decrease of the transmittance of the color filter layer. As a result, the relative luminance is increased.

In the liquid crystal display device in example 5g, as compared with the liquid crystal display device in example 1g, the aperture area size of the cyan sub pixel is increased, the light emission efficiency of the backlight is decreased, and the transmittance of the color filter layer is increased. In this case, the decrease component of luminance caused by the decrease of the light emission efficiency of the backlight is larger than the increase component of luminance caused by the increase of the transmittance of the color filter layer. As a result, the relative luminance is decreased. In the liquid crystal display devices in examples 2g through 5g, as compared with the liquid crystal display devices in comparative examples 2g and 3g, the light emission efficiency of the backlight and the transmittance of the color filter layer are both maintained higher, and thus the relative luminance is higher.

As the cyan color filter, the color filter C8 shown in FIG. 9(b) may be used. Hereinafter, with reference to Tables 57 through 64, liquid crystal display devices in comparative examples 1h through 3h and liquid crystal display devices in examples 1h through 5h using the color filter C8 as the cyan color filter will be described.

Tables 57 through 59 show the aperture area size, the chromaticity and the luminance ratio of each of the red (R), green (G), blue (B), cyan (C8) and yellow (Ye) sub pixels, the light emission efficiency of the backlight, the transmittance of the color filter layer, and the relative luminance of the liquid crystal display devices in comparative examples 1h through 3h, respectively.

TABLE 57

| | Aperture area size | x, y | Luminance ratio | Light emission efficiency | Transmittance | Relative luminance |
|---|---|---|---|---|---|---|
| R | 1.0 | 0.669, 0.323 | 8.2 | | | |
| G | 1.0 | 0.237, 0.632 | 20.3 | | | |
| B | 1.0 | 0.145, 0.047 | 6.7 | 100.0% | 37.5% | 100.0% |
| C8 | 1.0 | 0.226, 0.362 | 26.8 | | | |
| Ye | 1.0 | 0.479, 0.510 | 38.0 | | | |

TABLE 58

| | Aperture area size | x, y | Luminance ratio | Light emission efficiency | Transmittance | Relative luminance |
|---|---|---|---|---|---|---|
| R | 1.8 | 0.667, 0.322 | 11.4 | | | |
| G | 1.0 | 0.233, 0.633 | 20.3 | | | |
| B | 1.0 | 0.145, 0.048 | 6.7 | 102.2% | 34.3% | 93.3% |
| C8 | 1.0 | 0.219, 0.363 | 26.5 | | | |
| Ye | 1.0 | 0.456, 0.532 | 35.2 | | | |

TABLE 59

| | Aperture area size | x, y | Luminance ratio | Light emission efficiency | Transmittance | Relative luminance |
|---|---|---|---|---|---|---|
| R | 1.8 | 0.668, 0.322 | 11.1 | | | |
| G | 1.0 | 0.232, 0.629 | 16.0 | | | |
| B | 1.0 | 0.145, 0.047 | 5.7 | 96.9% | 36.1% | 93.1% |
| C8 | 1.8 | 0.220, 0.348 | 38.0 | | | |
| Ye | 1.0 | 0.475, 0.513 | 29.2 | | | |

In the liquid crystal display device in comparative example 2h, as compared with the liquid crystal display device in comparative example 1h, the aperture area size of the red sub pixel is increased, the light emission efficiency of the backlight is improved, and the transmittance of the color filter layer is decreased. In this case, the decrease component of luminance caused by the decrease of the transmittance of the color filter layer is larger than the increase component of luminance caused by the improvement of the light emission efficiency of the backlight. As a result, the relative luminance is decreased. Therefore, in the liquid crystal display device in comparative example 2h, red, which has a high lightness, can be reproduced but a high luminance cannot be efficiently realized.

In the liquid crystal display device in comparative example 3h, as compared with the liquid crystal display device in comparative example 1h, the aperture area size of each of the red and cyan sub pixels is increased, and the light emission efficiency of the backlight and the transmittance of the color filter layer are decreased. As a result, the relative luminance is decreased. Therefore, in the liquid crystal display device in comparative example 3h, red, which has a high lightness, can be reproduced but a high luminance cannot be efficiently realized.

Table 60 shows the aperture area size, the chromaticity and the luminance ratio of each of the red (R), green (G), blue (B), cyan (C8) and yellow (Ye) sub pixels, the light emission efficiency of the backlight, the transmittance of the color filter layer, and the relative luminance of the liquid crystal display device in example 1h.

TABLE 60

| | Aperture area size | x, y | Luminance ratio | Light emission efficiency | Transmittance | Relative luminance |
|---|---|---|---|---|---|---|
| R | 1.8 | 0.670, 0.323 | 10.9 | | | |
| G | 1.0 | 0.251, 0.647 | 19.7 | | | |
| B | 1.8 | 0.145, 0.052 | 8.2 | 122.6% | 32.6% | 106.7% |
| C8 | 1.0 | 0.242, 0.432 | 25.5 | | | |
| Ye | 1.0 | 0.454, 0.536 | 35.7 | | | |

In the liquid crystal display device in example 1h, as compared with the liquid crystal display device in comparative example 1h, the aperture area size of the red sub pixel is increased, and the luminance ratio thereof is raised. Thus, red, which has a high lightness, can be fully reproduced. In the liquid crystal display device in example 1h, as compared with the liquid crystal display devices in comparative examples 2h and 3h, the light emission efficiency of the backlight is improved, and the transmittance of the color filter layer is decreased. In this case, the increase component of luminance caused by the improvement of the light emission efficiency of the backlight is larger than the decrease component of luminance caused by the decrease of the transmittance of the color filter layer. As a result, the relative luminance is increased.

Tables 61 through 64 show the aperture area size, the chromaticity and the luminance ratio of each of the red (R), green (G), blue (B), cyan (C8) and yellow (Ye) sub pixels, the light emission efficiency of the backlight, the transmittance of the color filter layer, and the relative luminance of the liquid crystal display devices in examples 2h through 5h, respectively.

TABLE 61

| | Aperture area size | x, y | Luminance ratio | Light emission efficiency | Transmittance | Relative luminance |
|---|---|---|---|---|---|---|
| R | 2.0 | 0.669, 0.323 | 11.5 | | | |
| G | 1.0 | 0.250, 0.648 | 19.7 | | | |
| B | 1.8 | 0.145, 0.052 | 8.2 | 123.6% | 32.0% | 105.5% |
| C8 | 0.8 | 0.241, 0.432 | 25.5 | | | |
| Ye | 1.0 | 0.449, 0.541 | 35.2 | | | |

TABLE 62

| | Aperture area size | x, y | Luminance ratio | Light emission efficiency | Transmittance | Relative luminance |
|---|---|---|---|---|---|---|
| R | 1.8 | 0.670, 0.323 | 10.8 | | | |
| G | 1.0 | 0.253, 0.649 | 19.6 | | | |
| B | 2.0 | 0.145, 0.053 | 8.5 | 126.6% | 32.1% | 108.3% |
| C8 | 1.0 | 0.246, 0.444 | 25.4 | | | |
| Ye | 1.0 | 0.453, 0.537 | 35.7 | | | |

TABLE 63

| | Aperture area size | x, y | Luminance ratio | Light emission efficiency | Transmittance | Relative luminance |
|---|---|---|---|---|---|---|
| R | 1.8 | 0.669, 0.323 | 11.0 | | | |
| G | 1.0 | 0.251, 0.649 | 21.0 | | | |
| B | 1.8 | 0.145, 0.053 | 8.5 | 125.6% | 32.0% | 107.0% |
| C8 | 0.8 | 0.243, 0.438 | 21.8 | | | |
| Ye | 1.0 | 0.449, 0.541 | 37.7 | | | |

TABLE 64

| | Aperture area size | x, y | Luminance ratio | Light emission efficiency | Transmittance | Relative luminance |
|---|---|---|---|---|---|---|
| R | 1.8 | 0.670, 0.323 | 10.8 | | | |
| G | 1.0 | 0.250, 0.646 | 18.5 | | | |
| B | 1.8 | 0.145, 0.052 | 7.9 | 120.1% | 33.2% | 106.3% |
| C8 | 1.2 | 0.242, 0.426 | 28.9 | | | |
| Ye | 1.0 | 0.458, 0.532 | 33.9 | | | |

In the liquid crystal display device in example 2h, the aperture area size of the red sub pixel is further increased, and the luminance ratio of the red sub pixel is further raised. In the liquid crystal display device in example 2h, as compared with the liquid crystal display device in example 1h, the light emission efficiency of the backlight is improved, and the transmittance of the color filter layer is decreased. In this case, the decrease component of luminance caused by the decrease of the transmittance of the color filter layer is larger than the increase component of luminance caused by the improvement of the light emission efficiency of the backlight. As a result, the relative luminance is decreased.

In the liquid crystal display device in example 3h, as compared with the liquid crystal display device in example 1h, the aperture area size of the blue sub pixel is increased. Thus, the light emission efficiency of the backlight is improved, and the transmittance of the color filter layer is decreased. In this case, the increase component of luminance caused by the improvement of the light emission efficiency of the backlight is larger than the decrease component of luminance caused by the decrease of the transmittance of the color filter layer. As a result, the relative luminance is increased.

In the liquid crystal display device in example 4h, as compared with the liquid crystal display device in example 1h, the aperture area size of the cyan sub pixel is decreased, the light emission efficiency of the backlight is improved, and the transmittance of the color filter layer is decreased. In this case, the increase component of luminance caused by the improvement of the light emission efficiency of the backlight is larger than the decrease component of luminance caused by the decrease of the transmittance of the color filter layer. As a result, the relative luminance is increased.

In the liquid crystal display device in example 5h, as compared with the liquid crystal display device in example 1h, the aperture area size of the cyan sub pixel is increased, the light emission efficiency of the backlight is decreased, and the transmittance of the color filter layer is increased. In this case, the decrease component of luminance caused by the decrease of the light emission efficiency of the backlight is larger than the increase component of luminance caused by the increase of the transmittance of the color filter layer. As a result, the relative luminance is slightly decreased. In the liquid crystal display devices in examples 2h through 5h, as compared with the liquid crystal display devices in comparative examples 2h and 3h, the light emission efficiency of the backlight and the transmittance of the color filter layer are both maintained higher, and thus the relative luminance is higher.

As the cyan color filter, the color filter C9 shown in FIG. 9(b) may be used. Hereinafter, with reference to Tables 65 through 72, liquid crystal display devices in comparative examples 1i through 3i and liquid crystal display devices in examples 1i through 3i using the color filter C9 as the cyan color filter will be described.

Tables 65 through 67 show the aperture area size, the chromaticity and the luminance ratio of each of the red (R), green (G), blue (B), cyan (C9) and yellow (Ye) sub pixels, the light emission efficiency of the backlight, the transmittance of the color filter layer, and the relative luminance of the liquid crystal display devices in comparative examples 1i through 3i, respectively.

TABLE 65

| | Aperture area size | x, y | Luminance ratio | Light emission efficiency | Transmittance | Relative luminance |
|---|---|---|---|---|---|---|
| R | 1.0 | 0.670, 0.323 | 8.8 | | | |
| G | 1.0 | 0.245, 0.638 | 21.9 | | | |
| B | 1.0 | 0.145, 0.049 | 6.2 | 100.0% | 35.4% | 100.0% |
| C9 | 1.0 | 0.177, 0.274 | 21.3 | | | |
| Ye | 1.0 | 0.477, 0.513 | 41.7 | | | |

TABLE 66

| | Aperture area size | x, y | Luminance ratio | Light emission efficiency | Transmittance | Relative luminance |
|---|---|---|---|---|---|---|
| R | 1.8 | 0.668, 0.322 | 12.0 | | | |
| G | 1.0 | 0.241, 0.640 | 21.9 | | | |
| B | 1.0 | 0.145, 0.049 | 6.2 | 103.1% | 32.4% | 94.4% |
| C9 | 1.0 | 0.172, 0.274 | 21.2 | | | |
| Ye | 1.0 | 0.454, 0.535 | 38.7 | | | |

TABLE 67

| | Aperture area size | x, y | Luminance ratio | Light emission efficiency | Transmittance | Relative luminance |
|---|---|---|---|---|---|---|
| R | 1.8 | 0.669, 0.323 | 12.2 | | | |
| G | 1.0 | 0.244, 0.639 | 17.9 | | | |
| B | 1.0 | 0.145, 0.049 | 5.0 | 101.1% | 33.3% | 95.1% |
| C9 | 1.8 | 0.176, 0.275 | 31.4 | | | |
| Ye | 1.0 | 0.471, 0.518 | 33.5 | | | |

TABLE 67-continued

In the liquid crystal display device in comparative example 2i, as compared with the liquid crystal display device in comparative example 1i, the aperture area size of the red sub pixel is increased. Thus, red, which has a high lightness, can be reproduced. In the liquid crystal display device in comparative example 2i, as compared with the liquid crystal display device in comparative example 1i, the light emission efficiency of the backlight is improved, and the transmittance of the color filter layer is decreased. In this case, the decrease component of luminance caused by the decrease of the transmittance of the color filter layer is larger than the increase component of luminance caused by the improvement of the light emission efficiency of the backlight. As a result, the relative luminance is decreased. Therefore, in the liquid crystal display device in comparative example 2i, red, which has a high lightness, can be reproduced but a high luminance cannot be efficiently realized.

In the liquid crystal display device in comparative example 3i, as compared with the liquid crystal display device in comparative example 1i, the aperture area size of each of the red and cyan sub pixels is increased, and the transmittance of the color filter layer is decreased. In the liquid crystal display device in comparative example 3i, as compared with the liquid crystal display device in comparative example 1i, the light emission efficiency of the backlight is increased. The decrease component of luminance caused by the decrease of the transmittance of the color filter layer is larger than the increase component of luminance caused by the improvement of the light emission efficiency of the backlight. As a result, the relative luminance is decreased. Therefore, in the liquid crystal display device in comparative example 3i, red, which has a high lightness, can be reproduced but a high luminance cannot be efficiently realized.

Table 68 shows the aperture area size, the chromaticity and the luminance ratio of each of the red (R), green (G), blue (B), cyan (C9) and yellow (Ye) sub pixels, the light emission efficiency of the backlight, the transmittance of the color filter layer, and the relative luminance of the liquid crystal display device in example 1i.

TABLE 68

| | Aperture area size | x, y | Luminance ratio | Light emission efficiency | Transmittance | Relative luminance |
|---|---|---|---|---|---|---|
| R | 1.8 | 0.670, 0.323 | 11.6 | | | |
| G | 1.0 | 0.255, 0.651 | 21.6 | | | |
| B | 1.8 | 0.145, 0.054 | 8.0 | 121.7% | 30.2% | 103.9% |
| C9 | 1.0 | 0.189, 0.332 | 19.6 | | | |
| Ye | 1.0 | 0.451, 0.540 | 39.3 | | | |

In the liquid crystal display device in example 1i, as compared with the liquid crystal display device in comparative example 1i, the aperture area size of the red sub pixel is increased, and the luminance ratio thereof is raised. Thus, red, which has a high lightness, can be fully reproduced. In the liquid crystal display device in example 1i, as compared with the liquid crystal display devices in comparative examples 2i and 3i, the light emission efficiency of the backlight is improved, and the transmittance of the color filter layer is decreased. In this case, the increase component of luminance caused by the improvement of the light emission efficiency of the backlight is larger than the decrease component of luminance caused by the decrease of the transmittance of the color filter layer. As a result, the relative luminance is increased.

Tables 69 through 72 show the aperture area size, the chromaticity and the luminance ratio of each of the red (R), green (G), blue (B), cyan (C9) and yellow (Ye) sub pixels, the light emission efficiency of the backlight, the transmittance of the color filter layer, and the relative luminance of the liquid crystal display devices in examples 2i through 5i, respectively.

TABLE 69

| | Aperture area size | x, y | Luminance ratio | Light emission efficiency | Transmittance | Relative luminance |
|---|---|---|---|---|---|---|
| R | 2.0 | 0.670, 0.323 | 12.1 | | | |
| G | 1.0 | 0.255, 0.652 | 21.6 | | | |
| B | 1.8 | 0.145, 0.055 | 8.0 | 122.8% | 29.7% | 102.9% |
| C9 | 1.0 | 0.189, 0.333 | 19.6 | | | |
| Ye | 1.0 | 0.446, 0.544 | 38.7 | | | |

TABLE 70

| | Aperture area size | x, y | Luminance ratio | Light emission efficiency | Transmittance | Relative luminance |
|---|---|---|---|---|---|---|
| R | 1.8 | 0.670, 0.323 | 11.5 | | | |
| G | 1.0 | 0.257, 0.653 | 21.5 | | | |
| B | 2.0 | 0.145, 0.056 | 8.3 | 125.2% | 29.6% | 104.8% |
| C9 | 1.0 | 0.193, 0.344 | 19.3 | | | |
| Ye | 1.0 | 0.450, 0.540 | 39.3 | | | |

TABLE 71

| | Aperture area size | x, y | Luminance ratio | Light emission efficiency | Transmittance | Relative luminance |
|---|---|---|---|---|---|---|
| R | 1.8 | 0.670, 0.323 | 11.5 | | | |
| G | 1.0 | 0.255, 0.652 | 22.8 | | | |
| B | 1.8 | 0.145, 0.055 | 8.3 | 123.5% | 29.9% | 104.4% |
| C9 | 0.8 | 0.189, 0.335 | 16.5 | | | |
| Ye | 1.0 | 0.446, 0.545 | 40.9 | | | |

TABLE 72

| | Aperture area size | x, y | Luminance ratio | Light emission efficiency | Transmittance | Relative luminance |
|---|---|---|---|---|---|---|
| R | 1.8 | 0.670, 0.323 | 11.6 | | | |
| G | 1.0 | 0.255, 0.651 | 20.5 | | | |
| B | 1.8 | 0.145, 0.054 | 7.7 | 120.2% | 30.5% | 103.5% |
| C9 | 1.2 | 0.190, 0.331 | 22.4 | | | |
| Ye | 1.0 | 0.455, 0.536 | 37.8 | | | |

In the liquid crystal display device in example 2i, the aperture area size of the red sub pixel is further increased, and the luminance ratio of the red sub pixel is further raised. In the liquid crystal display device in example 2i, as compared with the liquid crystal display device in example 1i, the light emission efficiency of the backlight is improved, and the transmittance of the color filter layer is decreased. In this case, the decrease component of luminance caused by the decrease of the transmittance of the color filter layer is larger than the increase component of luminance caused by the improvement of the light emission efficiency of the backlight. As a result, the relative luminance is decreased.

In the liquid crystal display device in example 3i, as compared with the liquid crystal display device in example 1i, the aperture area size of the blue sub pixel is increased. Thus, the light emission efficiency of the backlight is improved, and the transmittance of the color filter layer is decreased. In this case, the increase component of luminance caused by the improvement of the light emission efficiency of the backlight is larger than the decrease component of luminance caused by the decrease of the transmittance of the color filter layer. As a result, the relative luminance is increased.

In the liquid crystal display device in example 4i, as compared with the liquid crystal display device in example 1i, the aperture area size of the cyan sub pixel is decreased, the light emission efficiency of the backlight is improved, and the transmittance of the color filter layer is decreased. In this case, the increase component of luminance caused by the improvement of the light emission efficiency of the backlight is larger than the decrease component of luminance caused by the decrease of the transmittance of the color filter layer. As a result, the relative luminance is slightly increased.

In the liquid crystal display device in example 5i, as compared with the liquid crystal display device in example 1i, the aperture area size of the cyan sub pixel is increased, the light emission efficiency of the backlight is decreased, and the transmittance of the color filter layer is increased. In this case, the decrease component of luminance caused by the decrease of the light emission efficiency of the backlight is larger than the increase component of luminance caused by the increase of the transmittance of the color filter layer. As a result, the relative luminance is slightly decreased. In the liquid crystal display devices in examples 2i through 5i, as compared with the liquid crystal display devices in comparative examples 2i and 3i, the light emission efficiency of the backlight and the transmittance of the color filter layer are both maintained higher, and thus the relative luminance is higher.

As the cyan color filter, the color filter C10 shown in FIG. 9(b) may be used. Hereinafter, with reference to Tables 73 through 80, liquid crystal display devices in comparative examples 1j through 3j and liquid crystal display devices in examples 1j through 5j using the color filter C10 as the cyan color filter will be described.

Tables 73 through 75 show the aperture area size, the chromaticity and the luminance ratio of each of the red (R), green (G), blue (B), cyan (C10) and yellow (Ye) sub pixels, the light emission efficiency of the backlight, the transmittance of the color filter layer, and the relative luminance of the liquid crystal display devices in comparative examples 1j through 3j, respectively.

TABLE 73

|     | Aperture area size | x, y | Luminance ratio | Light emission efficiency | Transmittance | Relative luminance |
|-----|-----|-----|-----|-----|-----|-----|
| R   | 1.0 | 0.669, 0.323 | 9.3 | | | |
| G   | 1.0 | 0.241, 0.636 | 25.2 | | | |
| B   | 1.0 | 0.145, 0.048 | 7.5 | 100.0% | 31.2% | 100.0% |
| C10 | 1.0 | 0.129, 0.344 | 11.7 | | | |
| Ye  | 1.0 | 0.470, 0.520 | 46.4 | | | |

TABLE 74

|     | Aperture area size | x, y | Luminance ratio | Light emission efficiency | Transmittance | Relative luminance |
|-----|-----|-----|-----|-----|-----|-----|
| R   | 1.8 | 0.667, 0.322 | 12.5 | | | |
| G   | 1.0 | 0.237, 0.638 | 25.1 | | | |
| B   | 1.0 | 0.145, 0.049 | 7.6 | 102.8% | 28.5% | 93.9% |
| C10 | 1.0 | 0.128, 0.345 | 11.7 | | | |
| Ye  | 1.0 | 0.446, 0.542 | 43.0 | | | |

TABLE 75

|     | Aperture area size | x, y | Luminance ratio | Light emission efficiency | Transmittance | Relative luminance |
|-----|-----|-----|-----|-----|-----|-----|
| R   | 1.8 | 0.668, 0.322 | 13.2 | | | |
| G   | 1.0 | 0.237, 0.636 | 22.0 | | | |
| B   | 1.0 | 0.145, 0.048 | 6.8 | 99.2% | 27.5% | 87.4% |
| C10 | 1.8 | 0.128, 0.340 | 18.7 | | | |
| Ye  | 1.0 | 0.461, 0.527 | 39.3 | | | |

In the liquid crystal display device in comparative example 2j, as compared with the liquid crystal display device in comparative example 1j, the aperture area size of the red sub pixel is increased. Thus, red, which has a high lightness, can be reproduced. In the liquid crystal display device in comparative example 2j, as compared with the liquid crystal display device in comparative example 1j, the light emission efficiency of the backlight is improved, and the transmittance of the color filter layer is decreased. In this case, the decrease component of luminance caused by the decrease of the transmittance of the color filter layer is larger than the increase component of luminance caused by the improvement of the light emission efficiency of the backlight. As a result, the relative luminance is decreased. Therefore, in the liquid crystal display device in comparative example 2j, red, which has a high lightness, can be reproduced but a high luminance cannot be efficiently realized.

In the liquid crystal display device in comparative example 3j, as compared with the liquid crystal display device in comparative example 1j, the aperture area size of each of the red and cyan sub pixels is increased, and the transmittance of the color filter layer is decreased. The light emission efficiency of the backlight is also decreased. As a result, the relative luminance is significantly decreased. In the liquid crystal display device in comparative example 3j, red, which has a high lightness, can be reproduced but a high luminance cannot be efficiently realized.

Table 76 shows the aperture area size, the chromaticity and the luminance ratio of each of the red (R), green (G), blue (B), cyan (C10) and yellow (Ye) sub pixels, the light emission efficiency of the backlight, the transmittance of the color filter layer, and the relative luminance of the liquid crystal display device in example 1j.

TABLE 76

|     | Aperture area size | x, y | Luminance ratio | Light emission efficiency | Transmittance | Relative luminance |
|-----|-----|-----|-----|-----|-----|-----|
| R   | 1.8 | 0.670, 0.323 | 11.9 | | | |
| G   | 1.0 | 0.254, 0.652 | 24.8 | | | |
| B   | 1.8 | 0.145, 0.055 | 9.1 | 126.6% | 26.9% | 108.9% |
| C10 | 1.0 | 0.144, 0.400 | 10.1 | | | |
| Ye  | 1.0 | 0.442, 0.548 | 44.1 | | | |

In the liquid crystal display device in example 1j, as compared with the liquid crystal display device in comparative example 1j, the aperture area size of the red sub pixel is increased, and the luminance ratio thereof is raised. Thus, red, which has a high lightness, can be fully reproduced. In the liquid crystal display device in example 1j, as compared with the liquid crystal display devices in comparative examples 2j and 3j, the light emission efficiency of the backlight is improved, and the transmittance of the color filter layer is decreased. In this case, the increase component of luminance caused by the improvement of the light emission efficiency of the backlight is larger than the decrease component of luminance caused by the decrease of the transmittance of the color filter layer. As a result, the relative luminance is increased.

Tables 77 through 80 show the aperture area size, the chromaticity and the luminance ratio of each of the red (R), green (G), blue (B), cyan (C10) and yellow (Ye) sub pixels, the light emission efficiency of the backlight, the transmittance of the color filter layer, and the relative luminance of the liquid crystal display devices in examples 2j through 5j, respectively.

TABLE 77

| | Aperture area size | x, y | Luminance ratio | Light emission efficiency | Trans-mittance | Relative luminance |
|---|---|---|---|---|---|---|
| R | 2.0 | 0.669, 0.323 | 12.4 | | | |
| G | 1.0 | 0.254, 0.652 | 24.8 | | | |
| B | 1.8 | 0.145, 0.055 | 9.2 | 127.7% | 26.4% | 107.8% |
| C10 | 1.0 | 0.144, 0.400 | 10.1 | | | |
| Ye | 1.0 | 0.437, 0.553 | 43.5 | | | |

TABLE 78

| | Aperture area size | x, y | Luminance ratio | Light emission efficiency | Trans-mittance | Relative luminance |
|---|---|---|---|---|---|---|
| R | 1.8 | 0.670, 0.323 | 11.8 | | | |
| G | 1.0 | 0.257, 0.654 | 24.7 | | | |
| B | 2.0 | 0.145, 0.056 | 9.5 | 131.0% | 26.4% | 110.6% |
| C10 | 1.0 | 0.147, 0.410 | 9.8 | | | |
| Ye | 1.0 | 0.441, 0.549 | 44.1 | | | |

TABLE 79

| | Aperture area size | x, y | Luminance ratio | Light emission efficiency | Trans-mittance | Relative luminance |
|---|---|---|---|---|---|---|
| R | 1.8 | 0.670, 0.323 | 11.7 | | | |
| G | 1.0 | 0.254, 0.653 | 25.6 | | | |
| B | 1.8 | 0.145, 0.055 | 9.3 | 128.1% | 27.1% | 111.2% |
| C10 | 0.8 | 0.144, 0.402 | 8.3 | | | |
| Ye | 1.0 | 0.438, 0.552 | 45.1 | | | |

TABLE 80

| | Aperture area size | x, y | Luminance ratio | Light emission efficiency | Trans-mittance | Relative luminance |
|---|---|---|---|---|---|---|
| R | 1.8 | 0.670, 0.323 | 12.0 | | | |
| G | 1.0 | 0.254, 0.652 | 24.1 | | | |
| B | 1.8 | 0.145, 0.055 | 9.0 | 125.3% | 26.6% | 106.8% |
| C10 | 1.2 | 0.144, 0.399 | 11.8 | | | |
| Ye | 1.0 | 0.445, 0.546 | 43.1 | | | |

In the liquid crystal display device in example 2j, the aperture area size of the red sub pixel is further increased, and the luminance ratio of the red sub pixel is further raised. In the liquid crystal display device in example 2j, as compared with the liquid crystal display device in example 1j, the light emission efficiency of the backlight is improved, and the transmittance of the color filter layer is decreased. In this case, the decrease component of luminance caused by the decrease of the transmittance of the color filter layer is larger than the increase component of luminance caused by the improvement of the light emission efficiency of the backlight. As a result, the relative luminance is decreased.

In the liquid crystal display device in example 3j, as compared with the liquid crystal display device in example 1j, the aperture area size of the blue sub pixel is increased. Thus, the light emission efficiency of the backlight is improved, and the transmittance of the color filter layer is decreased. The increase component of luminance caused by the improvement of the light emission efficiency of the backlight is larger than the decrease component of luminance caused by the decrease of the transmittance of the color filter layer. As a result, the relative luminance is increased.

In the liquid crystal display device in example 4j, as compared with the liquid crystal display device in example 1j, the aperture area size of the cyan sub pixel is decreased, the light emission efficiency of the backlight is improved, and the transmittance of the color filter layer is also increased. As a result, the relative luminance is increased.

In the liquid crystal display device in example 5j, as compared with the liquid crystal display device in example 1j, the aperture area size of the cyan sub pixel is increased, and the light emission efficiency of the backlight and the transmittance of the color filter layer are decreased. As a result, the relative luminance is decreased. In the liquid crystal display devices in examples 2j through 5j, as compared with the liquid crystal display devices in comparative examples 2j and 3j, the light emission efficiency of the backlight and the transmittance of the color filter layer are both maintained higher, and thus the relative luminance is higher.

As the cyan color filter, the color filter C11 shown in FIG. 9(b) may be used. Hereinafter, with reference to Tables 81 through 88, liquid crystal display devices in comparative examples 1k through 3k and liquid crystal display devices in examples 1k through 5k using the color filter C11 as the cyan color filter will be described.

Tables 81 through 83 show the aperture area size, the chromaticity and the luminance ratio of each of the red (R), green (G), blue (B), cyan (C11) and yellow (Ye) sub pixels, the light emission efficiency of the backlight, the transmittance of the color filter layer, and the relative luminance of the liquid crystal display devices in comparative examples 1k through 3k, respectively.

TABLE 81

| | Aperture area size | x, y | Luminance ratio | Light emission efficiency | Trans-mittance | Relative luminance |
|---|---|---|---|---|---|---|
| R | 1.0 | 0.670, 0.323 | 8.9 | | | |
| G | 1.0 | 0.252, 0.647 | 26.7 | | | |
| B | 1.0 | 0.145, 0.052 | 6.2 | 100.0% | 30.8% | 100.0% |
| C11 | 1.0 | 0.133, 0.132 | 8.9 | | | |
| Ye | 1.0 | 0.460, 0.531 | 49.4 | | | |

TABLE 82

| | Aperture area size | x, y | Luminance ratio | Light emission efficiency | Transmittance | Relative luminance |
|---|---|---|---|---|---|---|
| R | 1.8 | 0.668, 0.322 | 12.0 | | | |
| G | 1.0 | 0.249, 0.649 | 26.7 | | | |
| B | 1.0 | 0.145, 0.052 | 6.2 | 103.9% | 28.1% | 94.7% |
| C11 | 1.0 | 0.132, 0.132 | 8.9 | | | |
| Ye | 1.0 | 0.437, 0.552 | 46.2 | | | |

TABLE 83

| | Aperture area size | x, y | Luminance ratio | Light emission efficiency | Transmittance | Relative luminance |
|---|---|---|---|---|---|---|
| R | 1.8 | 0.670, 0.323 | 12.3 | | | |
| G | 1.0 | 0.254, 0.652 | 24.7 | | | |
| B | 1.0 | 0.145, 0.055 | 5.1 | 108.9% | 26.9% | 93.7% |
| C11 | 1.8 | 0.133, 0.141 | 13.7 | | | |
| Ye | 1.0 | 0.445, 0.546 | 44.2 | | | |

In the liquid crystal display device in comparative example 2k, as compared with the liquid crystal display device in comparative example 1k, the aperture area size of the red sub pixel is increased. Thus, red, which has a high lightness, can be reproduced. In the liquid crystal display device in comparative example 2k, as compared with the liquid crystal display device in comparative example 1k, the light emission efficiency of the backlight is improved, and the transmittance of the color filter layer is decreased. In this case, the decrease component of luminance caused by the decrease of the transmittance of the color filter layer is larger than the increase component of luminance caused by the improvement of the light emission efficiency of the backlight. As a result, the relative luminance is decreased. Therefore, in the liquid crystal display device in comparative example 2k, red, which has a high lightness, can be reproduced but a high luminance cannot be efficiently realized.

In the liquid crystal display device in comparative example 3k, as compared with the liquid crystal display device in comparative example 1k, the aperture area size of each of the red and cyan sub pixels is increased, and the transmittance of the color filter layer is decreased. In the liquid crystal display device in comparative example 3k, as compared with the liquid crystal display device in comparative example 1k, the light emission efficiency of the backlight is increased. The decrease component of luminance caused by the decrease of the transmittance of the color filter layer is larger than the increase component of luminance caused by the improvement of the light emission efficiency of the backlight. As a result, the relative luminance is decreased. Therefore, in the liquid crystal display device in comparative example 3k, red, which has a high lightness, can be reproduced but a high luminance cannot be efficiently realized.

Table 84 shows the aperture area size, the chromaticity and the luminance ratio of each of the red (R), green (G), blue (B), cyan (C11) and yellow (Ye) sub pixels, the light emission efficiency of the backlight, the transmittance of the color filter layer, and the relative luminance of the liquid crystal display device in example 1k.

TABLE 84

| | Aperture area size | x, y | Luminance ratio | Light emission efficiency | Transmittance | Relative luminance |
|---|---|---|---|---|---|---|
| R | 1.8 | 0.670, 0.323 | 11.6 | | | |
| G | 1.0 | 0.259, 0.657 | 26.3 | | | |
| B | 1.8 | 0.144, 0.059 | 8.3 | 120.6% | 25.9% | 101.4% |
| C11 | 1.0 | 0.134, 0.157 | 7.3 | | | |
| Ye | 1.0 | 0.435, 0.556 | 46.5 | | | |

In the liquid crystal display device in example 1k, as compared with the liquid crystal display device in comparative example 1k, the aperture area size of the red sub pixel is increased, and the luminance ratio thereof is raised. Thus, red, which has a high lightness, can be fully reproduced. In the liquid crystal display device in example 1k, as compared with the liquid crystal display devices in comparative examples 2k and 3k, the light emission efficiency of the backlight is improved, and the transmittance of the color filter layer is decreased. In this case, the increase component of luminance caused by the improvement of the light emission efficiency of the backlight is larger than the decrease component of luminance caused by the decrease of the transmittance of the color filter layer. As a result, the relative luminance is increased.

Tables 85 through 88 show the aperture area size, the chromaticity and the luminance ratio of each of the red (R), green (G), blue (B), cyan (C11) and yellow (Ye) sub pixels, the light emission efficiency of the backlight, the transmittance of the color filter layer, and the relative luminance of the liquid crystal display devices in examples 2k through 5k, respectively.

TABLE 85

| | Aperture area size | x, y | Luminance ratio | Light emission efficiency | Transmittance | Relative luminance |
|---|---|---|---|---|---|---|
| R | 2.0 | 0.670, 0.323 | 12.2 | | | |
| G | 1.0 | 0.259, 0.657 | 26.2 | | | |
| B | 1.8 | 0.144, 0.059 | 8.3 | 121.7% | 25.4% | 100.3% |
| C11 | 1.0 | 0.134, 0.157 | 7.3 | | | |
| Ye | 1.0 | 0.431, 0.559 | 46.0 | | | |

TABLE 86

| | Aperture area size | x, y | Luminance ratio | Light emission efficiency | Transmittance | Relative luminance |
|---|---|---|---|---|---|---|
| R | 1.8 | 0.671, 0.323 | 11.6 | | | |
| G | 1.0 | 0.261, 0.658 | 26.2 | | | |
| B | 2.0 | 0.144, 0.060 | 8.7 | 123.7% | 25.4% | 101.8% |

TABLE 86-continued

| | Aperture area size | x, y | Luminance ratio | Light emission efficiency | Trans- mittance | Relative luminance |
|---|---|---|---|---|---|---|
| C11 | 1.0 | 0.135, 0.162 | 7.0 | | | |
| Ye | 1.0 | 0.435, 0.556 | 46.5 | | | |

TABLE 87

| | Aperture area size | x, y | Luminance ratio | Light emission efficiency | Trans- mittance | Relative luminance |
|---|---|---|---|---|---|---|
| R | 1.8 | 0.670, 0.323 | 11.5 | | | |
| G | 1.0 | 0.258, 0.657 | 26.8 | | | |
| B | 1.8 | 0.144, 0.058 | 8.6 | 120.0% | 26.3% | 102.3% |
| C11 | 0.8 | 0.134, 0.155 | 6.0 | | | |
| Ye | 1.0 | 0.434, 0.557 | 47.1 | | | |

TABLE 88

| | Aperture area size | x, y | Luminance ratio | Light emission efficiency | Trans- mittance | Relative luminance |
|---|---|---|---|---|---|---|
| R | 1.8 | 0.671, 0.323 | 11.7 | | | |
| G | 1.0 | 0.260, 0.657 | 25.8 | | | |
| B | 1.8 | 0.144, 0.059 | 8.0 | 121.1% | 25.5% | 100.3% |
| C11 | 1.2 | 0.135, 0.158 | 8.5 | | | |
| Ye | 1.0 | 0.437, 0.554 | 46.0 | | | |

In the liquid crystal display device in example 2k, the aperture area size of the red sub pixel is further increased, and the luminance ratio of the red sub pixel is further raised. In the liquid crystal display device in example 2k, as compared with the liquid crystal display device in example 1k, the light emission efficiency of the backlight is improved, and the transmittance of the color filter layer is decreased. In this case, the decrease component of luminance caused by the decrease of the transmittance of the color filter layer is larger than the increase component of luminance caused by the improvement of the light emission efficiency of the backlight. As a result, the relative luminance is decreased.

In the liquid crystal display device in example 3k, as compared with the liquid crystal display device in example 1k, the aperture area size of the blue sub pixel is increased, the light emission efficiency of the backlight is improved, and the transmittance of the color filter layer is decreased. In this state, the increase component of luminance caused by the improvement of the light emission efficiency of the backlight is larger than the decrease component of luminance caused by the decrease of the transmittance of the color filter layer. As a result, the relative luminance is increased.

In the liquid crystal display device in example 4k, as compared with the liquid crystal display device in example 1k, the aperture area size of the cyan sub pixel is decreased, the light emission efficiency of the backlight is decreased, and the transmittance of the color filter layer is increased. In this state, the increase component of luminance caused by the increase of the transmittance of the color filter layer is larger than the decrease component of luminance caused by the decrease of the light emission efficiency of the backlight. As a result, the relative luminance is increased.

In the liquid crystal display device in example 5k, as compared with the liquid crystal display device in example 1k, the aperture area size of the cyan sub pixel is increased, and the light emission efficiency of the backlight is improved, but the transmittance of the color filter layer are decreased. In this state, the decrease component of luminance caused by the decrease of the transmittance of the color filter layer is larger than the increase component of luminance caused by the improvement of the light emission efficiency of the backlight. As a result, the relative luminance is decreased. In the liquid crystal display devices in examples 2k through 5k, as compared with the liquid crystal display devices in comparative examples 2k and 3k, the light emission efficiency of the backlight and the transmittance of the color filter layer are both maintained higher, and thus the relative luminance is higher.

When the chromaticity of the cyan sub pixel is within the range B, it is preferable that the ratio of the aperture area size of the red sub pixel is 1.2 or greater and less than 2.0 and that the ratio of the aperture area size of the blue sub pixel is also 1.2 or greater and less than 2.0. The ratio of the aperture area size of the red or blue sub pixel may be normalized such that the average of the aperture area sizes of the other three sub pixels (i.e., the green, yellow and cyan sub pixels) is 1.0.

When the ratio of the aperture area size of the red sub pixel is 1.2 or greater, the luminance ratio of the red sub pixel can be increased by 10% or higher. Thus, red, which has a high lightness, can be reproduced. When the ratio of the aperture area size of the red sub pixel is 2.0 or greater, the luminance ratio of the red sub pixel is further increased. However, when the ratio of the aperture area size of the red or blue sub pixel is 2.0 or greater, the difference among the aperture area sizes of the sub pixels is large. Therefore, the coarseness or stripes are more liable to be visually recognized and thus the display quality may be reduced. In addition, when the ratio of the aperture area size of each of the red and blue sub pixels is 2.0 or greater, the relative luminance may be decreased.

Now, with reference to FIG. 15 through FIG. 21, the following will be described: regarding the liquid crystal display devices in comparative examples 3e through 3k, when the ratio of the aperture area size of each of the red and cyan sub pixels is changed with respect to the ratio of the aperture area size of each of the green, blue and yellow sub pixels, how the relative luminance and the luminance ratio of the red sub pixel are changed; and regarding the liquid crystal display devices in examples 1e through 1k, when the ratio of the aperture area size of each of the red and blue sub pixels is changed with respect to the ratio of the aperture area size of each of the green, cyan and yellow sub pixels, how the relative luminance and the luminance ratio of the red sub pixel are changed. In FIG. 15 through FIG. 21, the thin solid line and the thin dashed line respectively represent the relative luminance and the luminance ratio of the red sub pixel in the liquid crystal display devices in examples 1e through 1k. The thick solid line and the thick dashed line respectively represent the relative luminance and the luminance ratio of the red sub pixel in the liquid crystal display devices in comparative examples 3e through 3k.

Figure 15:
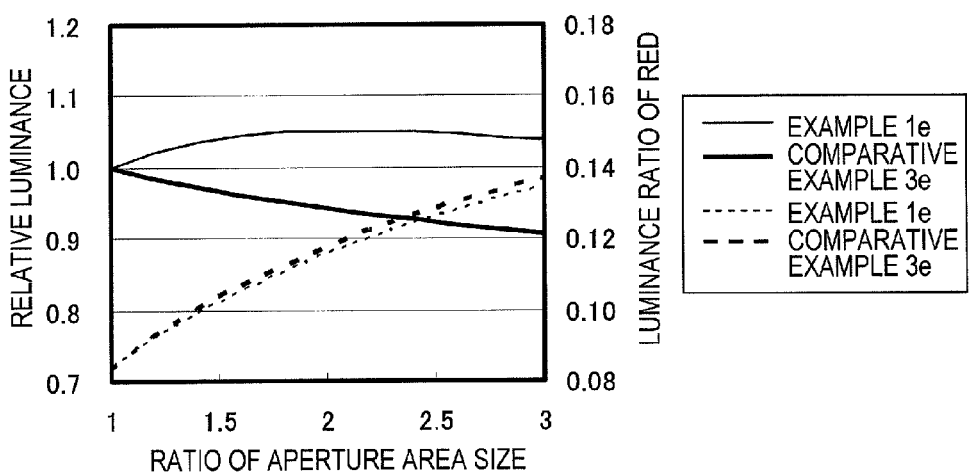
FIG. 15 is a graph showing how the relative luminance and the luminance ratio of the red sub pixel change in accordance with the change of the ratios of the aperture area sizes of the sub pixels in liquid crystal display devices in comparative example 3e and example 1e.

FIG. 15 shows how the relative luminance and the luminance ratio of the red sub pixel are changed in the liquid crystal display devices in comparative example 3e and example 1e. As described above, in the liquid crystal display devices in comparative example 3e and example 1e, the cyan color filter C5 is used.

When the color filter C5 is used, the main wavelength of the cyan sub pixel is relatively long, and the color purity of the cyan sub pixel is relatively low. Therefore, when the ratio of the aperture area size of the cyan sub pixel is increased, the light emission efficiency of the backlight is decreased, and the transmittance of the color filter layer is increased. In this case, the increase component of luminance caused by the increase of the transmittance of the color filter layer is larger than the decrease component of luminance caused by the decrease of the light emission efficiency of the backlight. As a result, the relative luminance is decreased. Therefore, in the liquid crystal display device in comparative example 3e, as the ratio of the aperture area size of each of the red and blue sub pixels is increased, the relative luminance is decreased.

By contrast, when the ratio of the aperture area size of the blue sub pixel is increased, the light emission efficiency of the backlight is improved, and the transmittance of the color filter layer is decreased. Until the ratio of the aperture area size of the blue sub pixel is increased to a certain level, the increase component of luminance caused by the improvement of the light emission efficiency of the backlight is larger than the decrease component of luminance caused by the decrease of the transmittance of the color filter layer. As a result, the relative luminance is increased. The increase component of relative luminance caused by the increase of the ratio of the aperture area size of the blue sub pixel is larger than the decrease component of relative luminance caused by the increase of the ratio of the aperture area size of the red sub pixel. In the liquid crystal display device in example 1e, until the ratio of the aperture area size of each of the blue sub pixels becomes 2.0, the relative luminance is increased. When this ratio exceeds 2.0, the relative luminance is decreased.

Figure 16:
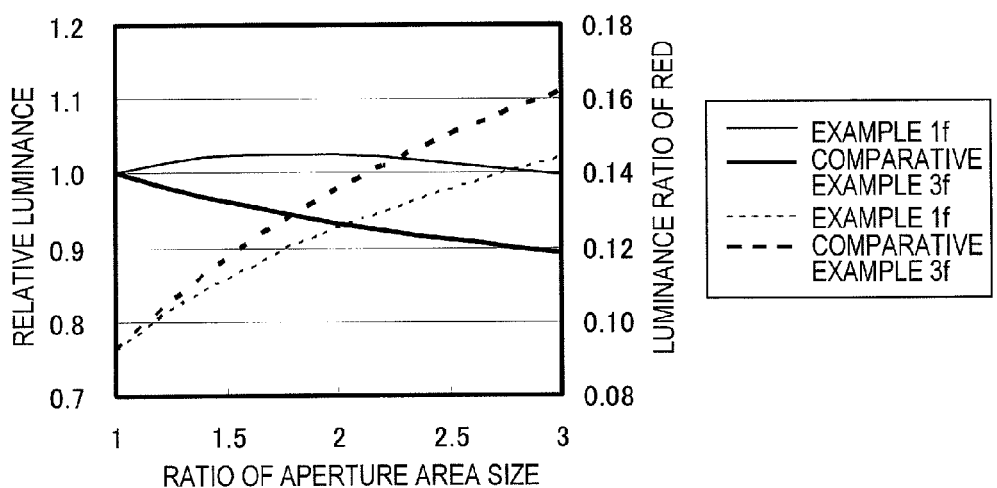
FIG. 16 is a graph showing how the relative luminance and the luminance ratio of the red sub pixel change in accordance with the change of the ratios of the aperture area sizes of the sub pixels in liquid crystal display devices in comparative example 3f and example 1f.

FIG. 16 shows how the relative luminance and the luminance ratio of the red sub pixel are changed in the liquid crystal display devices in comparative example 3f and example 1f. As described above, in the liquid crystal display devices in comparative example 3f and example 1f, the cyan color filter C6 is used.

When the color filter C6 is used, the main wavelength of the cyan sub pixel is relatively short, and the color purity of the cyan sub pixel is relatively high. Therefore, when the ratio of the aperture area size of the cyan sub pixel is increased, the light emission efficiency of the backlight is improved, and the transmittance of the color filter layer is decreased. In this case, the decrease component of luminance caused by the decrease of the transmittance of the color filter layer is larger than the increase component of luminance caused by the improvement of the light emission efficiency of the backlight. As a result, the relative luminance is decreased. Therefore, in the liquid crystal display device in comparative example 3f, as the ratio of the aperture area size of each of the red and cyan sub pixels is increased, the relative luminance is decreased.

By contrast, when the ratio of the aperture area size of the blue sub pixel is increased, the light emission efficiency of the backlight is improved, and the transmittance of the color filter layer is decreased. Until the ratio of the aperture area size of the blue sub pixel is increased to a certain level, the increase component of luminance caused by the improvement of the light emission efficiency of the backlight is larger than the decrease component of luminance caused by the decrease of the transmittance of the color filter layer. As a result, the relative luminance is increased. The increase component of relative luminance caused by the increase of the ratio of the aperture area size of the blue sub pixel is larger than the decrease component of relative luminance caused by the increase of the ratio of the aperture area size of the red sub pixel. In the liquid crystal display device in example 1f, until the ratio of the aperture area size of each of the red and blue sub pixels becomes 1.8, the relative luminance is increased. When this ratio exceeds 1.8, the relative luminance is decreased.

Figure 17:
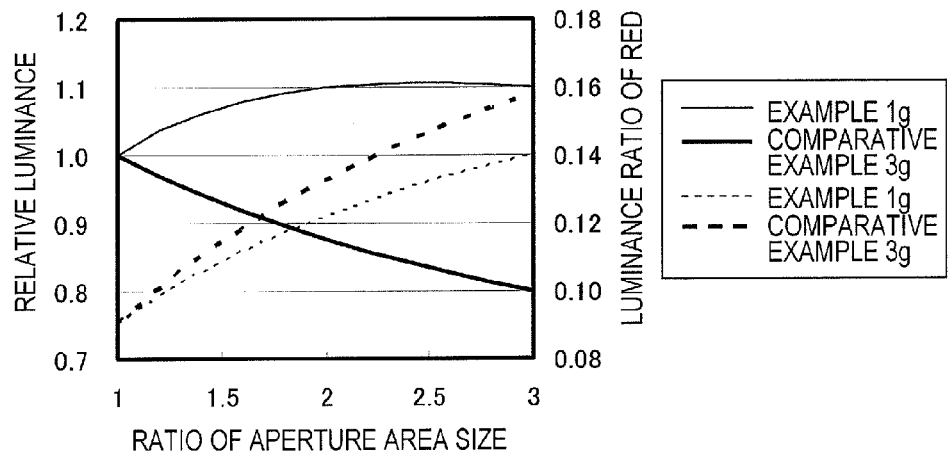
FIG. 17 is a graph showing how the relative luminance and the luminance ratio of the red sub pixel change in accordance with the change of the ratios of the aperture area sizes of the sub pixels in liquid crystal display devices in comparative example 3g and example 1g.

FIG. 17 shows how the relative luminance and the luminance ratio of the red sub pixel are changed in the liquid crystal display devices in comparative example 3g and example 1g. As described above, in the liquid crystal display devices in comparative example 3g and example 1g, the cyan color filter C7 is used.

When the color filter C7 is used, the main wavelength of the cyan sub pixel is relatively long, and the color purity of the cyan sub pixel is relatively low. Therefore, when the ratio of the aperture area size of the cyan sub pixel is increased, the light emission efficiency of the backlight is decreased, and the transmittance of the color filter layer is increased. In this case, the decrease component of luminance caused by the decrease of the light emission efficiency of the backlight is larger than the increase component of luminance caused by the increase of the transmittance of the color filter layer. As a result, the relative luminance is decreased. Therefore, in the liquid crystal display device in comparative example 3g, as the ratio of the aperture area size of each of the red and cyan sub pixels is increased, the relative luminance is decreased.

By contrast, when the ratio of the aperture area size of the blue sub pixel is increased, the light emission efficiency of the backlight is improved, and the transmittance of the color filter layer is decreased. Until the ratio of the aperture area size of the blue sub pixel is increased to a certain level, the increase component of luminance caused by the improvement of the light emission efficiency of the backlight is larger than the decrease component of luminance caused by the decrease of the transmittance of the color filter layer. As a result, the relative luminance is increased. The increase component of relative luminance caused by the increase of the ratio of the aperture area size of the blue sub pixel is larger than the decrease component of relative luminance caused by the increase of the ratio of the aperture area size of the red sub pixel. In the liquid crystal display device in example 1g, until the ratio of the aperture area size of each of the red and blue sub pixels becomes 2.4, the relative luminance is increased. When this ratio exceeds 2.4, the relative luminance is decreased.

Figure 18:
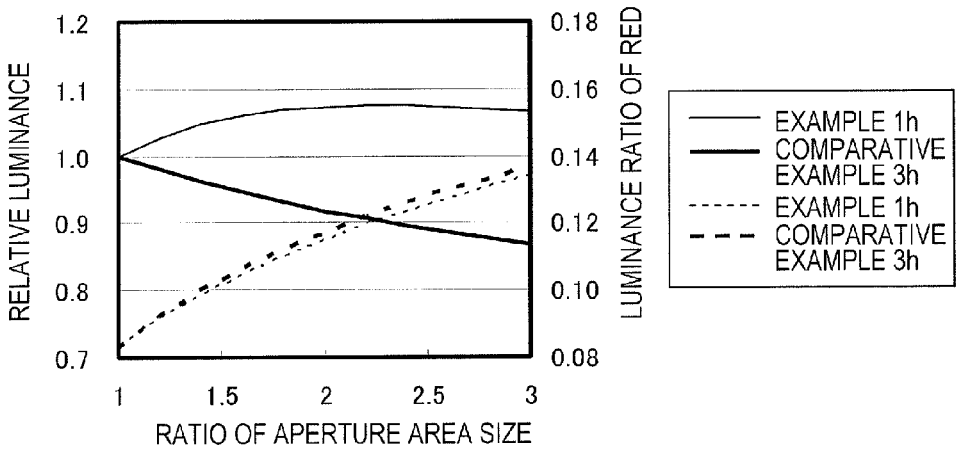
FIG. 18 is a graph showing how the relative luminance and the luminance ratio of the red sub pixel change in accordance with the change of the ratios of the aperture area sizes of the sub pixels in liquid crystal display devices in comparative example 3h and example 1h.

FIG. 18 shows how the relative luminance and the luminance ratio of the red sub pixel are changed in the liquid crystal display devices in comparative example 3h and example 1h. As described above, in the liquid crystal display devices in comparative example 3h and example 1h, the cyan color filter C8 is used.

When the color filter C8 is used, the main wavelength of the cyan sub pixel is relatively long, and the color purity of the cyan sub pixel is relatively low. Therefore, when the ratio of the aperture area size of the cyan sub pixel is increased, the light emission efficiency of the backlight is decreased, and the transmittance of the color filter layer is increased. In this case, the decrease component of luminance caused by the decrease of the light emission efficiency of the backlight is larger than the increase component of luminance caused by the increase of the transmittance of the color filter layer. As a result, the relative luminance is decreased. Therefore, in the liquid crystal display device in comparative example 3h, as the ratio of the aperture area size of each of the red and cyan sub pixels is increased, the relative luminance is decreased.

By contrast, when the ratio of the aperture area size of the blue sub pixel is increased, the light emission efficiency of the backlight is improved, and the transmittance of the color filter layer is decreased. Until the ratio of the aperture area size of the blue sub pixel is increased to a certain level, the increase component of luminance caused by the improvement of the light emission efficiency of the backlight is larger than the decrease component of luminance caused by the decrease of the transmittance of the color filter layer. As a result, the relative luminance is increased. The increase component of relative luminance caused by the increase of the ratio of the aperture area size of the blue sub pixel is larger than the decrease component of relative luminance caused by the increase of the ratio of the aperture area size of the red sub pixel. In the liquid crystal display device in example 1h, until the ratio of the aperture area size of each of the red and blue sub pixels becomes 2.2, the relative luminance is increased. When this ratio exceeds 2.2, the relative luminance is decreased.

Figure 19:
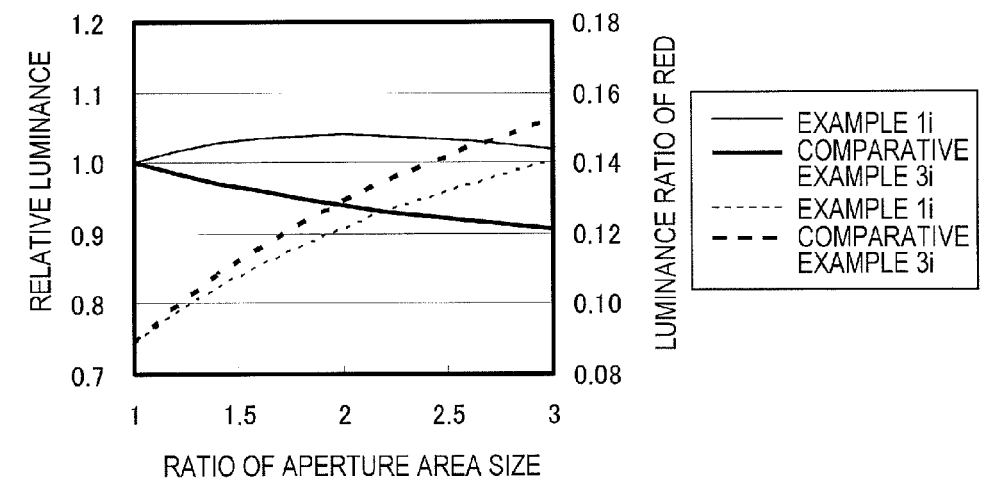
FIG. 19 is a graph showing how the relative luminance and the luminance ratio of the red sub pixel change in accordance with the change of the ratios of the aperture area sizes of the sub pixels in liquid crystal display devices in comparative example 3i and example 1i.

FIG. 19 shows how the relative luminance and the luminance ratio of the red sub pixel are changed in the liquid crystal display devices in comparative example 3i and example 1i. As described above, in the liquid crystal display devices in comparative example 3i and example 1i, the cyan color filter C9 is used.

When the color filter C9 is used, the main wavelength of the cyan sub pixel is relatively long but is shorter than that of the color filters C5, C7 and C8, and the color purity of the cyan sub pixel is relatively low. Therefore, when the ratio of the aperture area size of the cyan sub pixel is increased, the light emission efficiency of the backlight is improved, and the transmittance of the color filter layer is increased. As a result, the relative luminance is increased. In this case, the increase component of relative luminance caused by the increase of the ratio of the aperture area size of the cyan sub pixel is smaller than the decrease component of relative luminance caused by the increase of the ratio of the aperture area size of the red sub pixel. Therefore, in the liquid crystal display device in comparative example 3i, as the ratio of the aperture area size of each of the red and cyan sub pixels is increased, the relative luminance is decreased.

By contrast, when the ratio of the aperture area size of the blue sub pixel is increased, the light emission efficiency of the backlight is improved, and the transmittance of the color filter layer is decreased. Until the ratio of the aperture area size of the blue sub pixel is increased to a certain level, the increase component of luminance caused by the improvement of the light emission efficiency of the backlight is larger than the decrease component of luminance caused by the decrease of the transmittance of the color filter layer. As a result, the relative luminance is increased. The increase component of relative luminance caused by the increase of the ratio of the aperture area size of the blue sub pixel is larger than the decrease component of relative luminance caused by the increase of the ratio of the aperture area size of the red sub pixel. In the liquid crystal display device in example 1i, until the ratio of the aperture area size of each of the red and blue sub pixels becomes 2.0, the relative luminance is increased. When this ratio exceeds 2.0, the relative luminance is decreased.

Figure 20:
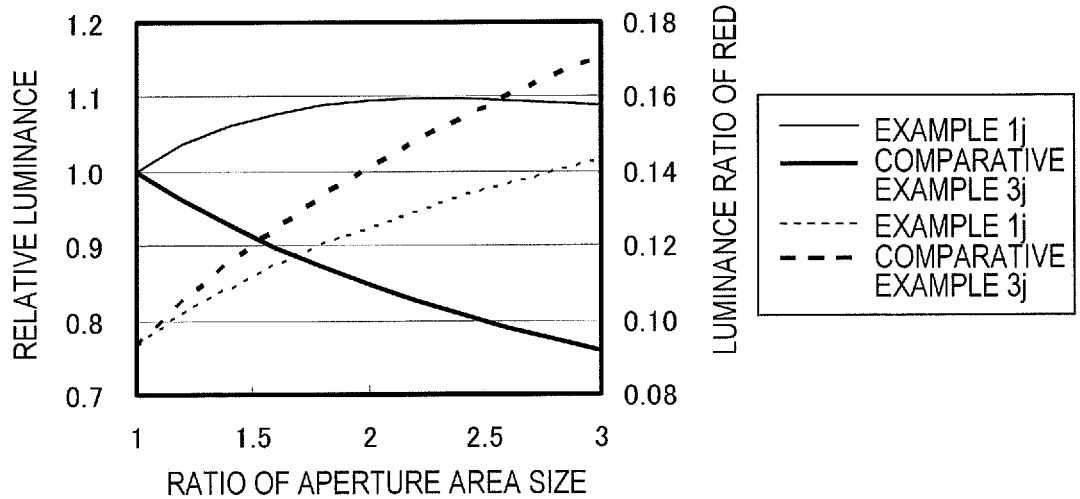
FIG. 20 is a graph showing how the relative luminance and the luminance ratio of the red sub pixel change in accordance with the change of the ratios of the aperture area sizes of the sub pixels in liquid crystal display devices in comparative example 3j and example 1j.

FIG. 20 shows how the relative luminance and the luminance ratio of the red sub pixel are changed in the liquid crystal display devices in comparative example 3j and example 1j. As described above, in the liquid crystal display devices in comparative example 3j and example 1j, the cyan color filter C10 is used.

When the color filter C10 is used, the main wavelength of the cyan sub pixel is relatively long, and the color purity of the cyan sub pixel is relatively high. Therefore, when the ratio of the aperture area size of the cyan sub pixel is increased, the light emission efficiency of the backlight is decreased, and the transmittance of the color filter layer is decreased. As a result, the relative luminance is decreased. Therefore, in the liquid crystal display device in comparative example 3j, as the ratio of the aperture area size of each of the red and cyan sub pixels is increased, the relative luminance is decreased.

By contrast, when the ratio of the aperture area size of the blue sub pixel is increased, the light emission efficiency of the backlight is improved, and the transmittance of the color filter layer is decreased. Until the ratio of the aperture area size of the blue sub pixel is increased to a certain level, the increase component of luminance caused by the improvement of the light emission efficiency of the backlight is larger than the decrease component of luminance caused by the decrease of the transmittance of the color filter layer. As a result, the relative luminance is increased. The increase component of relative luminance caused by the increase of the ratio of the aperture area size of the blue sub pixel is larger than the decrease component of relative luminance caused by the increase of the ratio of the aperture area size of the red sub pixel. In the liquid crystal display device in example 1j, until the ratio of the aperture area size of each of the red and blue sub pixels becomes 2.1, the relative luminance is increased. When this ratio exceeds 2.1, the relative luminance is decreased.

Figure 21:
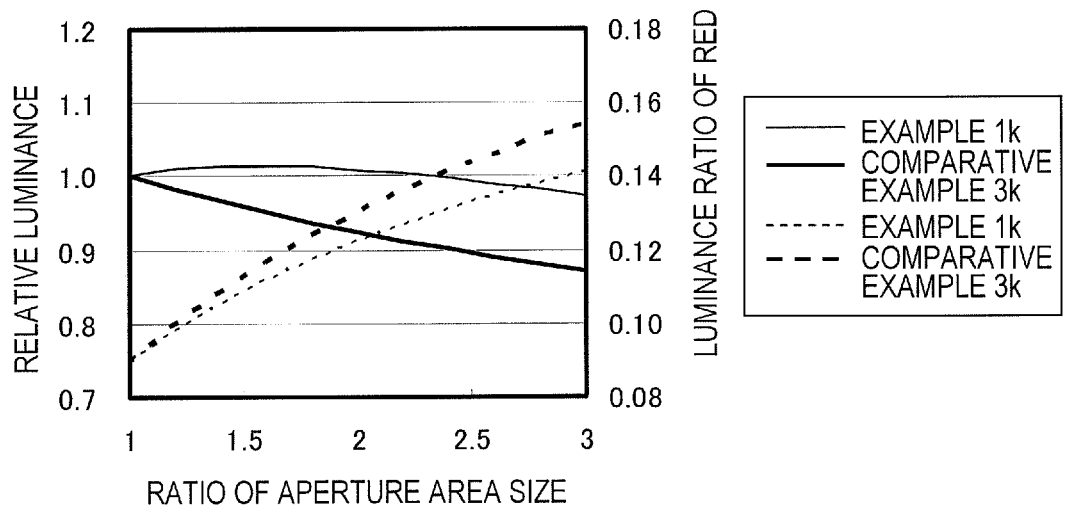
FIG. 21 is a graph showing how the relative luminance and the luminance ratio of the red sub pixel change in accordance with the change of the ratios of the aperture area sizes of the sub pixels in liquid crystal display devices in comparative example 3k and example 1k.

FIG. 21 shows how the relative luminance and the luminance ratio of the red sub pixel are changed in the liquid crystal display devices in comparative example 3k and example 1k. As described above, in the liquid crystal display devices in comparative example 3k and example 1k, the cyan color filter C11 is used.

When the color filter C11 is used, the main wavelength of the cyan sub pixel is relatively short, and the color purity of the cyan sub pixel is relatively high. Therefore, when the ratio of the aperture area size of the cyan sub pixel is increased, the light emission efficiency of the backlight is improved, and the transmittance of the color filter layer is decreased. Until the ratio of the aperture area size of the cyan sub pixel is increased to a certain level, the decrease component of luminance caused by the decrease of the transmittance of the color filter layer is larger than the increase component of luminance caused by the improvement of the light emission efficiency of the backlight. As a result, the relative luminance is decreased. Therefore, in the liquid crystal display device in comparative example 3k, as the ratio of the aperture area size of each of the red and cyan sub pixels is increased, the relative luminance is decreased.

By contrast, when the ratio of the aperture area size of the blue sub pixel is increased, the light emission efficiency of the backlight is improved, and the transmittance of the color filter layer is decreased. Until the ratio of the aperture area size of the blue sub pixel is increased to a certain level, the increase component of luminance caused by the improvement of the light emission efficiency of the backlight is larger than the decrease component of luminance caused by the decrease of the transmittance of the color filter layer. As a result, the relative luminance is increased. The increase component of relative luminance caused by the increase of the ratio of the aperture area size of the blue sub pixel is larger than the decrease component of relative luminance caused by the increase of the ratio of the aperture area size of the red sub pixel. In the liquid crystal display device in example 1k, until the ratio of the aperture area size of each of the red and blue sub pixels becomes 1.8, the relative luminance is increased. When this ratio exceeds 1.8, the relative luminance is decreased.

In this manner, when the chromaticity of the cyan sub pixel is within the range B, until the ratio of the aperture area size of each of the red and blue sub pixels becomes at least 1.8, the relative luminance is increased. Until the ratio of the aperture area size of each of the red and blue sub pixels becomes at least 2.0, the relative luminance is higher than that when this ratio is 1.0. Therefore, it is preferable that the ratio of the aperture area size of the red sub pixel is 1.2 or greater and less than 2.0 and that the ratio of the aperture area size of the blue sub pixel is also 1.2 or greater and less than 2.0.

Figure 3:
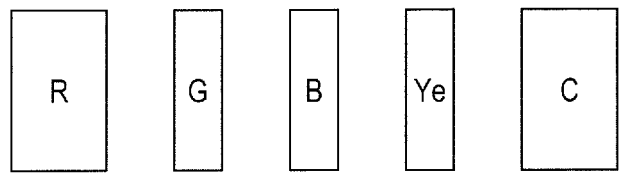
FIG. 3(a) is a schematic view of a liquid crystal panel of the liquid crystal display device shown in FIG. 1 when the chromaticity of a cyan sub pixel represents a certain value.
FIG. 3(b) is a schematic view of a liquid crystal panel of the liquid crystal display device shown in FIG. 1 when the chromaticity of the cyan sub pixel represents another value.
Figure 3:
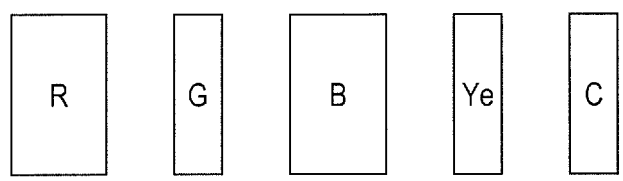
Figure 3:
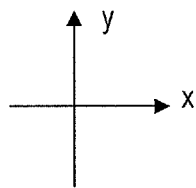
Figure 22:
FIG. 22(a) is a schematic view of another liquid crystal panel when the chromaticity of the cyan sub pixel is within the range A.
FIG. 22(b) is a schematic view of still another liquid crystal panel when the chromaticity of the cyan sub pixel is within the range B.
Figure 22:
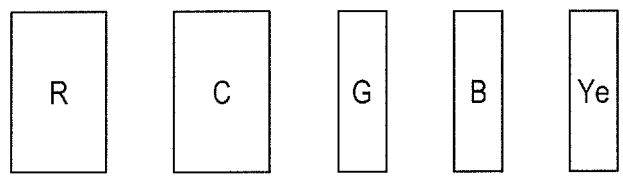
Figure 22:
Figure 22:
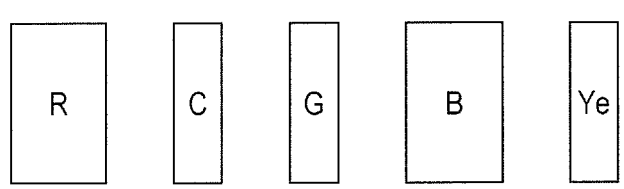

In FIG. 3, the red, green, blue, yellow and cyan sub pixels included in one pixel are arrayed in this order, but the present invention is not limited. It is preferable that the blue sub pixel adjoins the yellow sub pixel in the same pixel. In the case where the sub pixels included in one pixel are arrayed in one direction, it is preferable that the green sub pixel is located at the center. Regarding the luminance ratio, it is preferable that the high-low relativity of the luminance ratio between adjoining sub pixels varies alternately. From the above, it is preferable that the sub pixels are arrayed in the order of red, cyan, green, blue and yellow as shown in FIG. 22(a) and FIG. 22(b).

Figure 23:
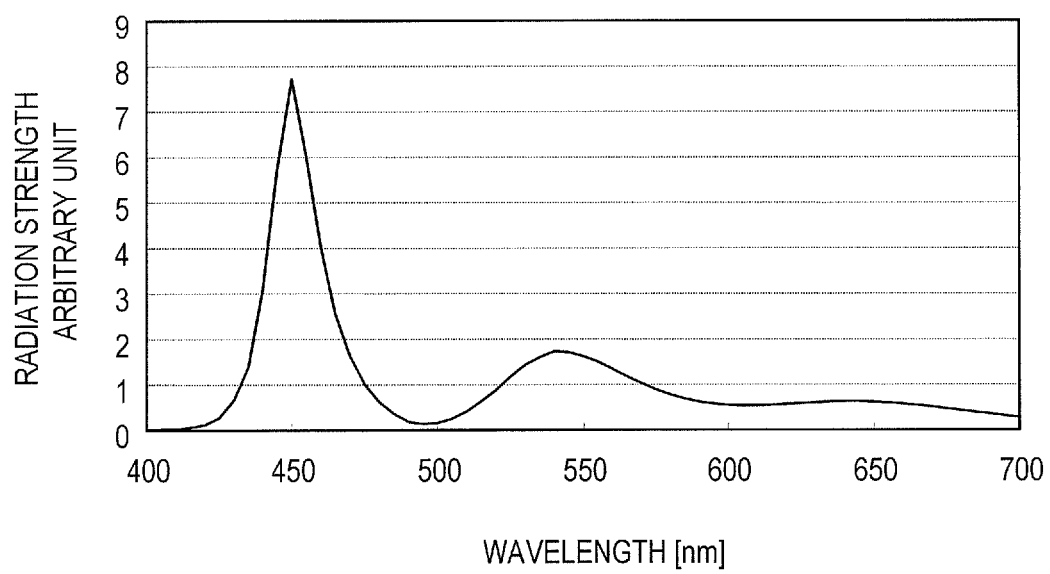
FIG. 23 is a graph showing another emission spectrum of the backlight of the liquid crystal display device shown in FIG. 1.

In the above description, a CCFL is used as the backlight 300, but the present invention is not limited to this. An LED may be used as the backlight 300. For example, as the backlight 300, an LED of a type including a blue light emitting element and red and green phosphors may be used. FIG. 23 shows an emission spectrum obtained when an LED of a type including a blue light emitting element and red and green phosphors is used as the backlight 300. In this spectrum, the peak of the radiation strength corresponding to blue is higher than the radiation strengths corresponding to green and red, and the peak of the radiation strength corresponding to green is higher than the radiation strength corresponding to red. Alternatively, as the backlight 300, an LED of a type including a blue light emitting element and a yellow phosphor may be used, or an LED of a type including red, green and blue light emitting elements may be used.

As described above, the main wavelength of the cyan sub pixel is 470 nm or longer and 520 nm or shorter. The main wavelength of the blue sub pixel is shortest, and the main wavelength becomes longer in the order of the cyan sub pixel, the green sub pixel, the yellow sub pixel, and the red sub pixel. For example, it is preferable that the main wavelength of the red sub pixel is 605 nm or longer and 635 nm or shorter, the main wavelength of the green sub pixel is 520 nm or longer and 550 nm or shorter, and the main wavelength of the blue sub pixel is 470 nm or shorter. It is preferable that the main wavelength of the yellow sub pixel is 565 nm or longer and 580 nm or shorter.

It is also preferable that the color purity of red is 90%, the color purity of green is 65% or higher and 80% or lower, and the color purity of blue is 90% or higher and 95% or lower. It is preferable that the color purity of yellow is 85% or higher and 95% or lower.

The liquid crystal panel 200 may be of a VA (Vertical Alignment) mode, of an IPS (In-Plane-Switching) mode, or of a TN (Twisted Nematic) mode.

Embodiment 2

In the above description, in a five primary color display device, each pixel includes five sub pixels. The present invention is not limited to this. Each pixel may include two sub pixels of the same color. Namely, in a five primary color display device, each pixel may includes six or more sub pixels. In the above description, the sub pixels included in one pixel are arrayed in one line, but the present invention is not limited to this. The sub pixels included in one pixel may be arrayed in two rows×three columns.

Figure 24:
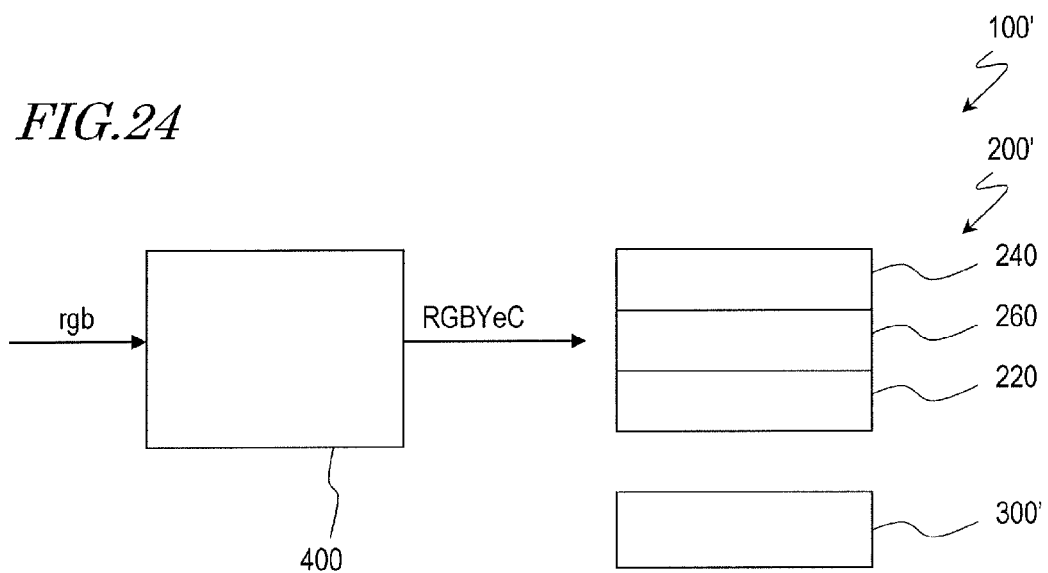
FIG. 24 is a schematic view showing a liquid crystal display device in Embodiment 2 according to the present invention.

FIG. 24 shows a schematic view of a liquid crystal display device in Embodiment 2 according to the present invention. A liquid crystal display device 100' in this embodiment includes a liquid crystal panel 200', a backlight 300', and a multiple primary color conversion section 400. In the liquid crystal panel 200', each pixel provides display with five primary colors, namely, red, green, blue, yellow and cyan, but includes six or more sub pixels. In the liquid crystal display device 100', the relationship among the aperture area sizes of the sub pixels is determined in accordance with the chromaticity of the cyan sub pixel. By setting the relationship among the aperture area sizes of the sub pixels in this manner, a high luminance can be efficiently realized.

Figure 25:
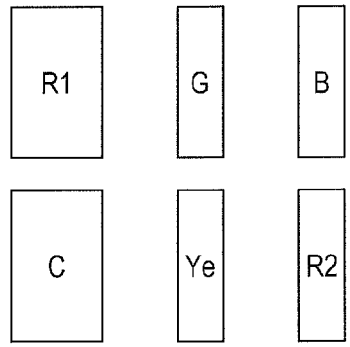
FIG. 25(a) is a schematic view of a liquid crystal panel of the liquid crystal display device shown in FIG. 1 when the chromaticity of the cyan sub pixel represents a certain value.
FIG. 25(b) is a schematic view of the liquid crystal panel of a liquid crystal display device shown in FIG. 1 when the chromaticity of the cyan sub pixel represents another value.
Figure 25:
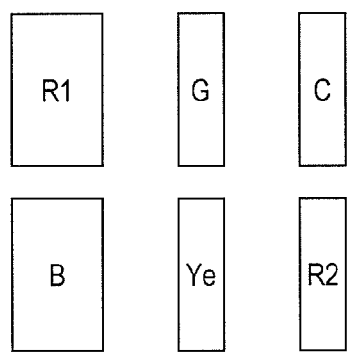
Figure 25:
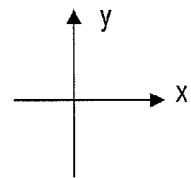

In the liquid crystal display device 100' in this embodiment, when the chromaticity of the cyan sub pixel represents a certain value, as shown in FIG. 25(a), the aperture area size of each of the red and cyan sub pixels is larger than the aperture area size of each of the green, blue and yellow sub pixels. Specifically, each sub pixel has a generally equal length (distance in the y direction). However, regarding the width (distance in the x direction), the width of each of one red (R1) sub pixel and the cyan (C) sub pixel is larger than the width of each of another red (R2) sub pixel, the green (G) sub pixel, the blue (B) sub pixel, and the yellow (Ye) sub pixel. Therefore, the aperture area size of the red sub pixel is largest, and the aperture area size of the cyan sub pixel is second largest.

By contrast, when the chromaticity of the cyan sub pixel represents another value, as shown in FIG. 25(b), the aperture area size of each of the red and blue sub pixels is larger than the aperture area size of each of the green, cyan and yellow sub pixels. Specifically, each sub pixel has a generally equal length (distance in the y direction). However, regarding the width (distance in the x direction), the width of each of one red (R1) sub pixel and the blue (B) sub pixel is larger than the width of each of another red (R2) sub pixel, the green (G) sub pixel, the cyan (C) sub pixel, and the yellow (Ye) sub pixel. Therefore, the aperture area size of the red sub pixel is largest, and the aperture area size of the blue sub pixel is second largest. The one red (R1) sub pixel and the another red (R2) sub pixel may be produced in the same manner so as to have the same transmission spectrum, but alternatively may be produced in different manners so as to have different transmission spectra.

In FIG. 25(a) and FIG. 25(b), the sub pixel having the largest aperture area size is of red, but may be of cyan or blue. In this case also, two cyan or blue sub pixels may be produced in the same manner so as to have the same transmission spectrum, but alternatively may be produced in different manners so as to have different transmission spectra.

In the liquid crystal display devices 200 and 200' described above, each sub pixel exhibits one transmittance, but the present invention is not limited to this. Each sub pixel may include a plurality of areas exhibiting different transmittances so as to have improved viewing angle characteristics.

INDUSTRIAL APPLICABILITY

According to the present invention, a five primary color liquid crystal display device for improving the display quality and efficiently realizing a high luminance can be provided.

| REFERENCE SIGNS LIST | |
|---|---|
| 100 | Liquid crystal display device |
| 200 | Liquid crystal panel |
| 300 | Backlight |
| 400 | Multiple primary color conversion section |

The invention claimed is:

1. A liquid crystal display device comprising a pixel including a plurality of sub pixels; wherein:

the plurality of sub pixels include a red sub pixel, a green sub pixel, a blue sub pixel, a yellow sub pixel and a cyan sub pixel; and one of the blue sub pixel and the cyan sub pixel has an aperture area size which is larger than an aperture area size of any of the other of the blue and cyan sub pixels, the green sub pixel and the yellow sub pixel; and the aperture area size of the red sub pixel is larger than the aperture area size of any of the other of the blue and cyan sub pixels, the green sub pixel, and the yellow sub pixel.

2. The liquid crystal display device of claim 1, wherein:

when a chromaticity of the cyan sub pixel represented by x, y is within a first range which is enclosed by a chromaticity of a white point, a chromaticity of a main wavelength of 490 nm and a color purity of 40%, a chromaticity of a main wavelength of 485 nm and a color purity of 60%, and a chromaticity of a main wavelength of 470 nm and a color purity of 100% and is outside a color reproduction range defined by the EBU format, the aperture area size of each of the red sub pixel and the cyan sub pixel is larger than the aperture area size of any of the green sub pixel, the blue sub pixel and the yellow sub pixel; and when the chromaticity of the cyan sub pixel represented by x, y is within a second range which corresponds to a main wavelength of 470 nm or longer and 520 nm or shorter, is outside the first range and is outside the color reproduction range defined by the EBU format, the aperture area size of each of the red sub pixel and the blue sub pixel is larger than the aperture area size of any of the green sub pixel, the cyan sub pixel and the yellow sub pixel.

3. The liquid crystal display device of claim 2, wherein the chromaticity of the white point is (0.3333, 0.3333).

* * * * *